United States Patent
Choi et al.

(10) Patent No.: US 11,695,930 B2
(45) Date of Patent: Jul. 4, 2023

(54) IMAGE ENCODING METHOD AND APPARATUS, AND IMAGE DECODING METHOD AND APPARATUS

(71) Applicant: SAMSUNG ELECTRONICS CO., LTD., Suwon-si (KR)

(72) Inventors: Na-rae Choi, Seoul (KR); Bo-ra Jin, Yongin-si (KR); Min-woo Park, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/651,809

(22) PCT Filed: Sep. 27, 2018

(86) PCT No.: PCT/KR2018/011390
§ 371 (c)(1),
(2) Date: Mar. 27, 2020

(87) PCT Pub. No.: WO2019/066472
PCT Pub. Date: Apr. 4, 2019

(65) Prior Publication Data
US 2020/0252614 A1    Aug. 6, 2020

Related U.S. Application Data

(60) Provisional application No. 62/564,681, filed on Sep. 28, 2017.

(51) Int. Cl.
*H04N 7/12* (2006.01)
*H04N 19/132* (2014.01)
(Continued)

(52) U.S. Cl.
CPC ......... *H04N 19/132* (2014.11); *H04N 19/105* (2014.11); *H04N 19/117* (2014.11);
(Continued)

(58) Field of Classification Search
CPC ........................... H04N 19/105; H04N 19/159
See application file for complete search history.

(56) References Cited

U.S. PATENT DOCUMENTS

| | | |
|---|---|---|
| 9,930,366 B2 | 3/2018 | Zheng et al. |
| 10,609,410 B2 | 3/2020 | Jeon et al. |

(Continued)

FOREIGN PATENT DOCUMENTS

| | | |
|---|---|---|
| CN | 103460700 A | 12/2013 |
| KR | 10-2013-0119494 A | 10/2013 |

(Continued)

OTHER PUBLICATIONS

Communication dated Apr. 28, 2021 by the Intellectual Property Office of India in counterpart Indian Patent Application No. 202027012693.

(Continued)

*Primary Examiner* — Y Lee
(74) *Attorney, Agent, or Firm* — Sughrue Mion, PLLC

(57) ABSTRACT

Provided is an image decoding method including: generating an intra prediction value of a current sample based on a position of the current sample in a current block and an intra prediction mode of the current block; determining, based on the position of the current sample in the current block, a sample value of at least one filtering reference sample to be filtered and a first weight with respect to the filtering reference sample and a second weight with respect to the intra prediction value of the current sample; generating a filtered prediction sample value of the current sample based on the determined sample value of the filtering reference sample to be filtered, the intra prediction value of the current sample, the first weight with respect to the filtering reference sample, and the second weight with respect to the intra prediction value of the current sample; and generating a prediction block of the current block, the prediction block (Continued)

including the filtered prediction sample value of the current sample.

10 Claims, 36 Drawing Sheets

(51) Int. Cl.
   *H04N 19/105* (2014.01)
   *H04N 19/117* (2014.01)
   *H04N 19/159* (2014.01)
   *H04N 19/176* (2014.01)
   *H04N 19/189* (2014.01)
   *H04N 19/635* (2014.01)

(52) U.S. Cl.
   CPC ......... *H04N 19/159* (2014.11); *H04N 19/176* (2014.11); *H04N 19/189* (2014.11); *H04N 19/635* (2014.11)

(56) References Cited

U.S. PATENT DOCUMENTS

| | | |
|---|---|---|
| 2007/0047651 A1 | 3/2007 | Kim et al. |
| 2018/0309988 A1 | 10/2018 | Alshina et al. |
| 2020/0059653 A1 | 2/2020 | Jeong et al. |
| 2022/0150549 A1 | 5/2022 | Kim et al. |

FOREIGN PATENT DOCUMENTS

| | | | |
|---|---|---|---|
| KR | 10-2015-0140848 A | 12/2015 | |
| KR | 10-1587927 B1 | 1/2016 | |
| KR | 10-2017-0078683 A | 7/2017 | |
| WO | 2017058635 A1 | 4/2017 | |
| WO | 2017090993 A1 | 6/2017 | |

OTHER PUBLICATIONS

International Search Report and Written Opinion (PCT/ISA/210 and PCT/ISA/237), dated Jan. 8, 2019 by International Searching Authority in International Application No. PCT/KR2018/011390.
Said, A. et al., "Position dependent intra prediction combination", Qualcomm Incorporated, International Organisation for Standardisation, Coding of Moving Pictures and Audio, ISO/IEC JTC1/SC29/WG11, MPEG2015/M37502, Oct. 2015, XP030065870. (4 pages total).
Communication dated Oct. 28, 2020 by the European Patent Office in oonterpart European Patent Application No. 18863355.6.
Geert Van der Auwera et al., "CE3: Simplified PDPC (Test 2.4.1)", Joint Video Experts Team (JVET) of ITU-T SG 16 WP 3 and ISO/IEC JTC 1/SC 29/WG 11, Document: JVET-K0063-v2, Jul. 2018, 8 pages total.
Communication dated Aug. 3, 2021 issued by the Japanese Intellectual Property Office in counterpart Japanese Application No. 2020-516891.
Communication dated Apr. 27, 2022 issued the National Intellectual Property Administration, PRC in counterpart Chinese Application No. 201880063708.8.
Communication dated Mar. 15, 2022 issued by the Intellectual Property Office of Japan in counterpart Japanese Application No. 2020-516891.
Communication dated Oct. 4, 2022, issued by the Japan Patent Office in counterpart Japanese Patent Application No. 2020-516891.
Li et al., "EE6: Multiple line-based intra prediction," Joint Video Exploration Team (JVET) of ITU-T SG 16 WP 3 and ISO/IEC JTC 1/SC 29A/WG 11, Document: JVET-D0149, Oct. 2016, Total 5 pages.
Communication issued by the Korean Patent Office dated Dec. 22, 2022 in corresponding Korean Application No. 10-2022-7013104.
Communication dated Dec. 30, 2022 by National Intellectual Property Administration, PRC in corresponding Chinese Application No. 201880063708.8.

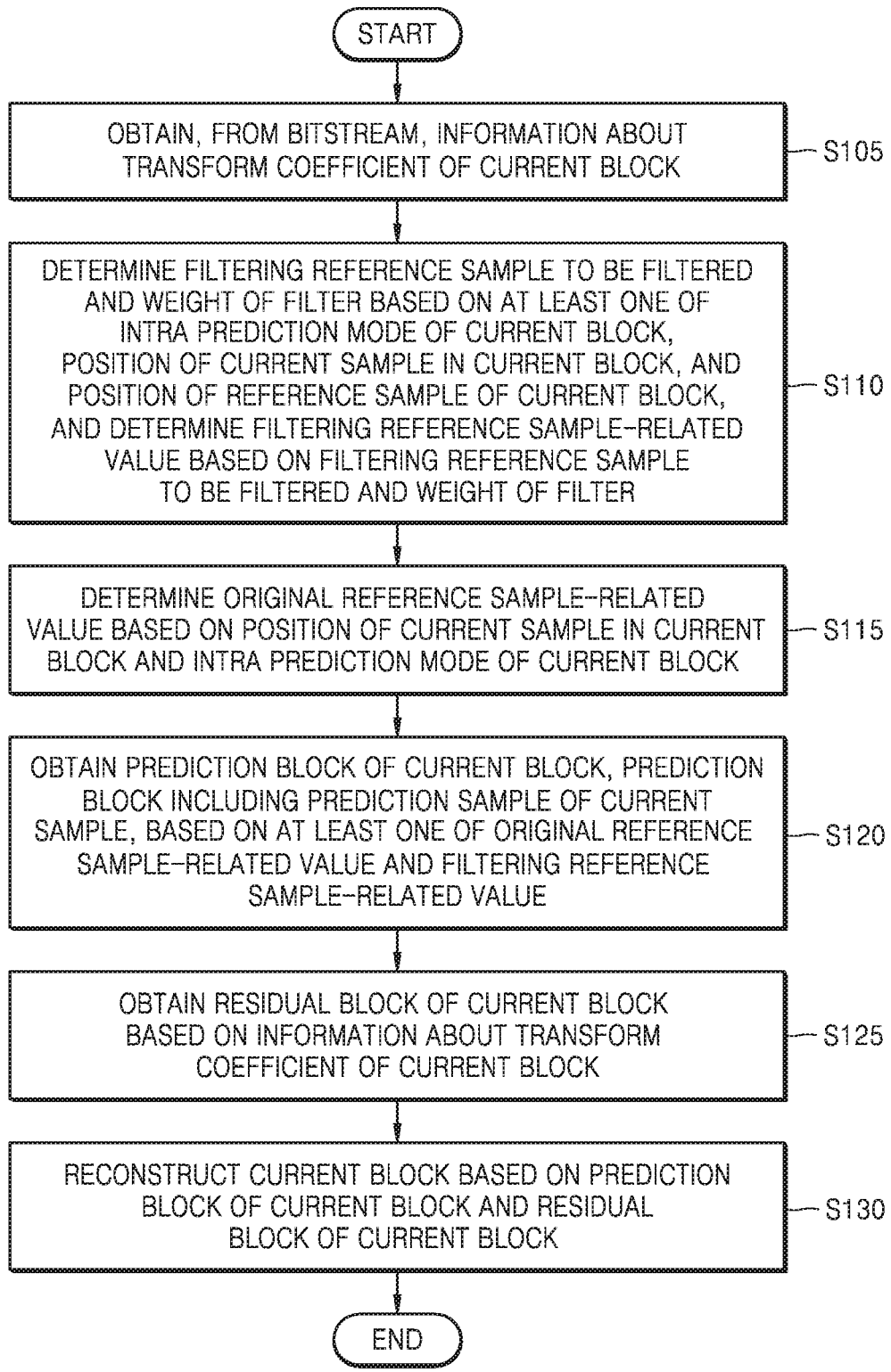

FIG. 4
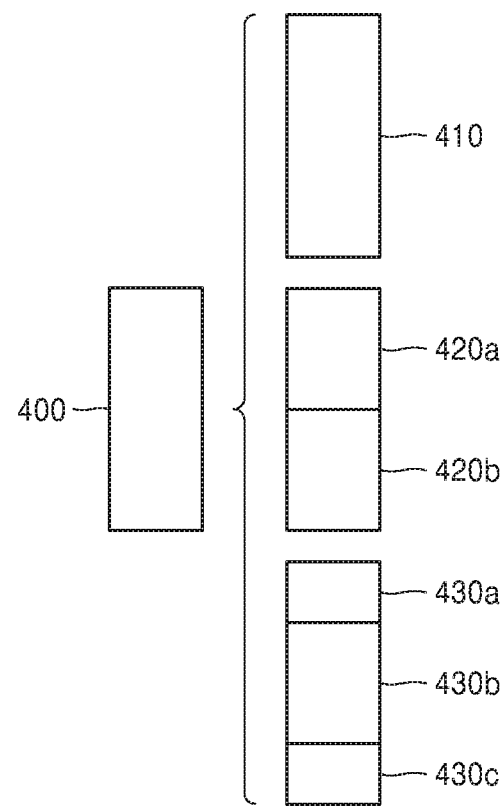
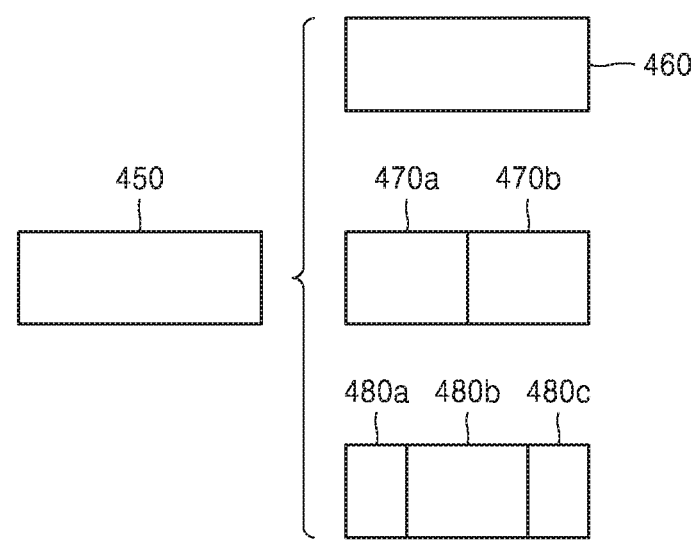

FIG. 13

| BLOCK SHAPE / DEPTH | 0: SQUARE | 1: NS_VER | 2: NS_HOR |
|---|---|---|---|
| DEPTH D | 1300 ☐ | 1310 ▯ | 1320 ▭ |
| DEPTH D+1 | 1302 ☐ | 1312 ▯ | 1322 ▭ |
| DEPTH D+2 | 1304 ☐ | 1314 ▯ | 1324 ▭ |
| ... | ... | ... | ... |

FIG. 23

|     | i=0 | i=1 | i=2 | i=3 |     |
|-----|-----|-----|-----|-----|-----|
|     | 1   | 1   | 1   | 1   | j=3 |
|     | 1   | 1   | 1   | 1   | j=2 |
|     | 2   | 1   | 3   | 3   | j=1 |
|     | 1   | 5   | 5   | 5   | j=0 |

2320 ($C_{a_j'}[i,j]$)

|     |     | i=3 | i=2 | i=1 | i=0 | i=0 | i=1 | i=2 | i=3 |
|-----|-----|-----|-----|-----|-----|-----|-----|-----|-----|
| j=0 |     | 1   | 1   | 2   | 1   | 2   | 9   | 10  | 10  |
| j=1 |     | 1   | 1   | 1   | 5   | 9   | 6   | 12  | 12  |
| j=2 |     | 1   | 1   | 3   | 5   | 10  | 12  | 14  | 14  |
| j=3 |     | 1   | 1   | 3   | 5   | 10  | 12  | 14  | 14  |

2310 ($C_{a_i'}[i,j]$)

2300

2330 ($C_{p_{ij}}[i,j]$)

IMAGE ENCODING METHOD AND APPARATUS, AND IMAGE DECODING METHOD AND APPARATUS

TECHNICAL FIELD

A method and apparatus according to an embodiment may encode or decode an image by using a coding unit in various shapes included in the image. The method and apparatus according to an embodiment include a method and apparatus for intra prediction.

BACKGROUND ART

As hardware for reproducing and storing high resolution or high quality image content is being developed and supplied, the need for a codec for effectively encoding or decoding the high resolution or high quality image content is increasing. Encoded image content may be reproduced by being decoded. Recently, methods of effectively compressing high resolution or high quality image content have been implemented. For example, an efficient image compressing method through a process of arbitrarily processing an image to be encoded has been implemented.

Various data units may be used to compress an image, and an inclusion relationship may exist between these data units. To determine a size of a data unit used for image compressing, the data unit may be split according to various methods. After an optimized data unit is determined according to the characteristics of the image, encoding and decoding of the image may be performed.

DESCRIPTION OF EMBODIMENTS

Solution to Problem

According to an embodiment, an image decoding method includes: obtaining, from a bitstream, information about a transform coefficient of a current block; generating an intra prediction value of a current sample based on a position of the current sample in the current block and an intra prediction mode of the current block; determining, based on the position of the current sample in the current block, a sample value of at least one filtering reference sample to be filtered and a first weight with respect to the filtering reference sample and a second weight with respect to the intra prediction value of the current sample, and generating a filtered prediction sample value of the current sample based on the determined sample value of the filtering reference sample to be filtered, the intra prediction value of the current sample, the first weight with respect to the filtering reference sample, and the second weight with respect to the intra prediction value of the current sample; generating a prediction block of the current block, the prediction block including the filtered prediction sample value of the current sample; obtaining a residual block of the current block based on the obtained information about the transform coefficient of the current block; and reconstructing the current block based on the prediction block of the current block and the residual block of the current block.

The generating of the intra prediction value of the current sample based on the position of the current sample in the current block and the intra prediction mode of the current block may include: determining an original reference sample corresponding to the current sample based on the position of the current sample and the intra prediction mode of the current block; and generating the intra prediction value of the current sample based on a sample value of the original reference sample.

The first weight with respect to the filtering reference sample may be determined based on a distance between the filtering reference sample and the current sample.

The greater the distance between the filtering reference sample and the current sample, the smaller may be the first weight with respect to the filtering reference sample.

The filtering reference sample may include at least one of an original reference sample located in a horizontal direction of the current sample and an original reference sample located in a vertical direction of the current sample.

When the intra prediction mode of the current block is an angular mode, the filtering reference sample may include at least one of adjacent samples on the left and on the top of the current sample located on a line passing by the current sample, and the line may be in a prediction direction indicated by the angular mode and an opposite direction to the prediction direction.

The determining, based on the position of the current sample in the current block, of a sample value of at least one filtering reference sample to be filtered and a first weight with respect to the filtering reference sample and a second weight with respect to an intra prediction value of the current sample, and generating a filtered prediction sample value of the current sample based on the determined sample value of the (filtering reference sample to be filtered, the intra prediction value of the current sample, the first weight with respect to the filtering reference sample, and the second weight with respect to the intra prediction value of the current sample may include: determining at least one second intra prediction mode; and by using the determined at least one second intra prediction mode, determining, based on the position of the current sample in the current block, a sample value of at least one filtering reference sample to be filtered and a first weight with respect to the filtering reference sample and a second weight with respect to the intra prediction value of the current sample, and generating a filtered prediction sample value of the current sample based on the determined sample value of the (filtering reference sample to be filtered, the intra prediction value of the current sample, the first weight with respect to the filtering reference sample, and the second weight with respect to the intra prediction value of the current sample.

The at least one second intra prediction mode may be determined in units of pictures or in units of blocks.

The at least one second intra prediction mode may be determined to be at least one of the intra prediction mode, an intra prediction mode indicating an opposite direction to a prediction direction indicated by the intra prediction mode, a horizontal mode, and a vertical mode.

The first weight and the second weight may be normalized values.

The determining, based on the position of the current sample in the current block, a sample value of at least one filtering reference sample to be filtered and a first weight with respect to the filtering reference sample and a second weight with respect to the intra prediction value of the current sample, and generating a filtered prediction sample value of the current sample based on the determined sample value of the filtering reference sample to be filtered, the intra prediction value of the current sample, the first weight with respect to the filtering reference sample, and the second weight with respect to the intra prediction value of the current sample may include: when the intra prediction mode is a predetermined intra prediction mode, determining, based on the position of the current sample in the current block, a sample value of at least one filtering reference sample to be filtered and a first weight with respect to the filtering reference sample and a second weight with respect to the intra prediction value of the current sample, and generating a filtered prediction sample value of the current sample based on the determined sample value of the filtering reference sample to be filtered, the intra prediction value of the current sample, the first weight with respect to the filtering reference sample, and the second weight with respect to the intra prediction value of the current sample.

According to an embodiment, an image encoding method includes: generating an intra prediction value of a current sample based on a position of the current sample in a current block and an intra prediction mode of the current block; determining, based on the position of the current sample in the current block, a sample value of at least one filtering reference sample to be filtered and a first weight with respect to the filtering reference sample and a second weight with respect to the intra prediction value of the current sample, and generating a filtered prediction sample value of the current sample based on the determined sample value of the filtering reference sample to be filtered, the intra prediction value of the current sample, the first weight with respect to the filtering reference sample, and the second weight with respect to the intra prediction value of the current sample; generating a prediction block of the current block, the prediction block including the filtered prediction sample value of the current sample; and encoding information about a transform coefficient of the current block based on the prediction block of the current block.

According to an embodiment, an image decoding apparatus includes a processor configured to: obtain, from a bitstream, information about a transform coefficient of a current block; generate an intra prediction value of the current sample based on the position of the current sample in the current block and an intra prediction mode of the current block; determine, based on the position of the current sample in the current block, a sample value of at least one filtering reference sample to be filtered and a first weight with respect to the filtering reference sample and a second weight with respect to the intra prediction value of the current sample, and generate a filtered prediction sample value of the current sample based on the determined sample value of the filtering reference sample to be filtered, the intra prediction value of the current sample, the first weight with respect to the filtering reference sample, and the second weight with respect to the intra prediction value of the current sample; generate a prediction block of the current block, the prediction block including the filtered prediction sample value of the current sample; obtain a residual block of the current block based on the obtained information about the transform coefficient of the current block; and reconstruct the current block based on the prediction block of the current block and the residual block of the current block.

A computer program for the image decoding method according to an embodiment of the present disclosure may be recorded on a computer-readable recording medium.

BRIEF DESCRIPTION OF DRAWINGS

FIG. 1B is a flowchart of an image decoding method according to various embodiments.

FIG. 4 illustrates a process, performed by an image decoding apparatus, of determining at least one coding unit by splitting a non-square current coding unit, according to an embodiment.

FIG. 13 illustrates a process of determining a depth of a coding unit as a shape and size of the coding unit change, when the coding unit is recursively split such that a plurality of coding units are determined, according to an embodiment.

FIG. 23 is a diagram for describing a process, performed by an image decoding apparatus, of performing weighted prediction by using a prediction value generated by performing intra prediction using an original reference sample and reconstructed reference samples of a left adjacent line and an upper adjacent line.

BEST MODE

Figure 1A:
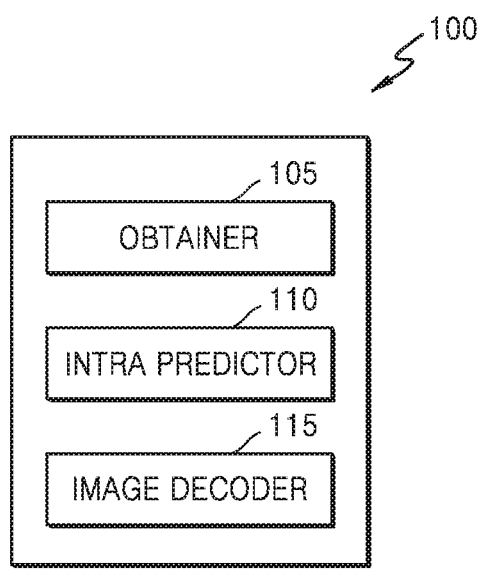
FIG. 1A is a block diagram of an image decoding apparatus according to various embodiments.

According to various embodiments, an image decoding method includes: obtaining, from a bitstream, information about a transform coefficient of a current block; generating an intra prediction value of a current sample based on a position of the current sample in the current block and an intra prediction mode of the current block; determining, based on the position of the current sample in the current block, a sample value of at least one filtering reference sample to be filtered and a first weight with respect to the filtering reference sample and a second weight with respect to the intra prediction value of the current sample, and generating a filtered prediction sample value of the current sample based on the determined sample value of the filtering reference sample to be filtered, the intra prediction value of the current sample, the first weight with respect to the filtering reference sample, and the second weight with respect to the intra prediction value of the current sample; generating a prediction block of the current block, the prediction block including the filtered prediction sample value of the current sample; obtaining a residual block of the current block based on the obtained information about the transform coefficient of the current block; and reconstructing the current block based on the prediction block of the current block and the residual block of the current block.

According to various embodiments, an image encoding method includes: generating an intra prediction value of a current sample based on a position of the current sample in a current block and an intra prediction mode of the current block; determining, based on the position of the current sample in the current block, a sample value of at least one filtering reference sample to be filtered and a first weight with respect to the filtering reference sample and a second weight with respect to the intra prediction value of the current sample, and generating a filtered prediction sample value of the current sample based on the determined sample value of the filtering reference sample to be filtered, the intra prediction value of the current sample, the first weight with respect to the filtering reference sample, and the second weight with respect to the intra prediction value of the current sample; generating a prediction block of the current block, the prediction block including the filtered prediction sample value of the current sample; and encoding information about a transform coefficient of the current block based on the prediction block of the current block.

According to various embodiments, an image decoding apparatus includes a processor configured to: obtain, from a bitstream, information about a transform coefficient of a current block; generate an intra prediction value of the current sample based on the position of the current sample in the current block and an intra prediction mode of the current block; determine, based on the position of the current sample in the current block, a sample value of at least one filtering reference sample to be filtered and a first weight with respect to the filtering reference sample and a second weight with respect to the intra prediction value of the current sample, and generate a filtered prediction sample value of the current sample based on the determined sample value of the filtering reference sample to be filtered, the intra prediction value of the current sample, the first weight with respect to the filtering reference sample, and the second weight with respect to the intra prediction value of the current sample; generate a prediction block of the current block, the prediction block including the filtered prediction sample value of the current sample; obtain a residual block of the current block based on the obtained information about the transform coefficient of the current block; and reconstruct the current block based on the prediction block of the current block and the residual block of the current block.

A program for implementing the method according to various embodiments may be included in a computer-readable recording medium.

MODE OF DISCLOSURE

The advantages and features of embodiments disclosed and methods of achieving the advantages and features will be described more fully with reference to the accompanying drawings, in which the embodiments provided below shown. The present disclosure may, however, be embodied in many different forms and should not be construed as being limited to the embodiments set forth herein; rather these embodiments are provided so that this disclosure will be thorough and complete, and will fully convey the concept of the disclosure to one of ordinary skill in the art.

Hereinafter, the terms used in the specification will be briefly described, and then the embodiments disclosed will be described in detail.

The terms used in this specification are those general terms currently widely used in the art in consideration of functions in regard to the disclosure, but the terms may vary according to the intention of those of ordinary skill in the art, precedents, or new technology in the art. Also, specified terms may be selected by the applicant, and in this case, the detailed meaning thereof will be described in the detailed description of the disclosure. Thus, the terms used in the specification should be understood not as simple names but based on the meaning of the terms and the overall description of the disclosure.

An expression used in the singular encompasses the expression of the plural, unless it explicitly specifies the singular.

Throughout the specification, it will also be understood that when a component "includes" an element, unless there is another opposite description thereto, it should be understood that the component does not exclude another element but may further include another element.

In addition, terms such as a " . . . unit" used in the specification refer to a software or hardware component, and a " . . . unit" performs certain functions. However, a " . . . unit" is not limited to software or hardware. A " . . . unit" may be configured in an addressable storage medium or to reproduce one or more processors. Thus, for example, a " . . . unit" includes components such as software components, object-oriented software components, class components, task components, processes, functions, attributes, procedures, subroutines, segments of program codes, drivers, firmware, microcodes, circuits, data, databases, data structures, tables, arrays, and variables. Functions provided in the components and the " . . . units" may be combined with a smaller number of components and " . . . units" or separated from additional components and " . . . units."

According to an embodiment of the present disclosure, a " . . . unit" may be implemented by a processor and a memory. The term "processor" should be interpreted broadly to include general-purpose processors, central processing units (CPUs), microprocessors, digital signal processors (DSPs), controllers, microcontrollers, state machines, and the like. In some circumstances, a "processor" may refer to an application specific semiconductor (ASIC), a programmable logic device (PLD), a field programmable gate array (FPGA), or the like. The term "processor" may refer to a combination of processing devices such as, for example, a combination of a DSP and a microprocessor, a combination of a plurality of microprocessors, a combination of one or more microprocessors in conjunction with a DSP core, or a combination of any other such configuration.

The term "memory" should be interpreted broadly to include any electronic component capable of storing electronic information. The term "memory" may refer to various types of processor-readable media such as random access memory (RAM), read-only memory (ROM), non-volatile random access memory (NVRAM), programmable read-only memory (PROM), erase-programmable read-only memory (EPROM), electrically erasable PROM (EEPROM), flash memory, magnetic or optical data storage, registers, and the like. When a processor can read information from and/or write information to a memory, the memory is said to be in electronic communication with the processor. A memory integrated in a processor is in electronic communication with the processor.

Hereinafter, an 'image' may refer to a still image such as a static image of a video or a moving image, that is, a motion image such as a video itself.

Hereinafter, a 'sample' means data to be processed as data allocated to a sampling position of an image. For example, pixel values of a spatial domain and transform coefficients on a transform region may be samples. A unit including at least one sample described above may be defined as a block.

Hereinafter, embodiments will be described in detail with reference to the accompanying drawings so that those of skill in the art may easily implement the embodiments. Also, elements not related to description are omitted in the drawings for clear description of the present disclosure.

Hereinafter, with reference to FIGS. 1 to 29, an image encoding apparatus and an image decoding apparatus, and an image encoding method and an image decoding method, according to an embodiment, will be described. A method of determining a data unit of an image according to an embodiment will be described with reference to FIGS. 3 through 16. An encoding or decoding method and apparatus for determining a filtering reference sample to be filtered and a weight of a filter, and adaptively performing intra prediction based on the filtering reference sample and the weight of the filter, according to an embodiment, will be described with reference to FIGS. 1, 2, and 17 through 29.

Hereinafter, an encoding/decoding method and apparatus for adaptively performing intra prediction based on various shapes of coding units, according to an embodiment of the present disclosure, will be described with reference to FIGS. 1 and 2.

FIG. 1A is a block diagram of an image decoding apparatus according to various embodiments.

An image decoding apparatus 100 according to various embodiments may include an obtainer 105, an intra predictor 110, and an image decoder 115.

The obtainer 105, the intra predictor 110, and the image decoder 115 may include at least one processor. In addition, the obtainer 105, the intra predictor 110, and the image decoder 115 may include a memory storing instructions to be executed by the at least one processor. The image decoder 115 may be implemented as a separate hardware from the obtainer 105 and the intra predictor 110 or may include the obtainer 105 and the intra predictor 110.

The obtainer 105 may obtain, from a bitstream, information about a transform coefficient of a current block. The obtainer 105 may obtain, from a bitstream, information about a prediction mode of the current block and information about an intra prediction mode of the current block.

The information about a prediction mode of the current block obtained by the obtainer 105 may include information indicating an intra mode or an inter prediction mode. Information about an intra prediction of the current block may be information about an intra prediction mode applied to the current block from among a plurality of intra prediction modes. For example, an intra prediction mode may be one of a DC mode, a planar mode, and at least one angular mode having a prediction direction. An angular mode may include a horizontal mode, a vertical mode, and a diagonal mode, and a mode having a predetermined direction except for a horizontal direction, a vertical direction, and a diagonal direction. For example, there may be 65 or 33 angular modes.

The intra predictor 110 may be activated when a prediction mode of the current block is an intra prediction mode.

The intra predictor 110 may determine an original reference sample-related value based on a position of a current sample in the current block and an intra prediction mode of the current block. That is, the intra predictor 110 may determine at least one original reference sample from among reference samples, based on the position of the current sample in the current block and the intra prediction mode of the current block, and determine an original reference sample-related value based on the determined at least one original reference sample. Original reference sample refers to samples of a neighboring block of a current block, and the original reference sample may include a sample of a block adjacent to a left side of the current block or a sample of a block adjacent to an upper portion of the current block. For example, an original reference sample may include a sample on a predetermined line in a vertical direction adjacent to the left of the current block or a sample on a predetermined line in a horizontal direction adjacent to the upper portion of the current block. However, the original reference sample is not limited to include a sample of a block adjacent to the left of the current block or a sample of a block adjacent to the upper portion of the current block, but may also include a sample of a block adjacent to the upper portion of the current block or a sample of a block adjacent to the right of the current block.

The intra predictor 110 may determine an intra prediction value with respect to the current sample based on the position of the current sample in the current block and the intra prediction mode of the current block. The intra predictor 110 may determine an original reference sample corresponding to the current sample based on the position of the current sample and the intra prediction mode of the current block. The intra predictor 110 may generate an intra prediction value of the current sample based on a sample value of the original reference sample. The intra predictor 110 may determine at least one filtering reference sample to be filtered and a weight of a filter based on at least one of an intra prediction mode of a current block, a position of a current sample in the current block, and a position of a reference sample of the current block, and may determine a filtering reference sample-related value based on the filtering reference sample and the weight of the filter.

For example, when an intra prediction mode of a current block is one of a planar mode, a DC mode, a horizontal mode, and a vertical mode, the intra predictor 110 may determine, as a filtering reference sample, at least one of a sample adjacent to a top left corner of the current block, a sample that is adjacent to the current block and is in a top direction of the current block, and a sample that is adjacent to the current block and is located in a left direction of the current block.

When an intra prediction mode of a current block is an angular mode including an diagonal mode, the intra predictor 110 may determine, as a filtering reference sample, at least one of an adjacent sample on the left and on the top of the current block, which is located on a line passing by a current sample in the current block and a sample adjacent to a top left corner of the current block. Here, the line may be in a prediction direction indicated by an angular mode or an opposite direction thereto.

The intra predictor 110 may determine the number of tabs of a filter to be applied to a filtering reference sample based on at least one of an intra prediction mode of a current block and a size of the current block.

In addition, the intra predictor 110 may also determine a weight of a filter to be applied to a filtering reference sample based on a size of a current block, without being limited to determining a weight of a filter to be applied to a filtering reference sample based on at least one of an intra prediction mode of a current block, a position of a current sample in the current block, and a position of a reference sample.

The intra predictor 110 may determine some of samples within a reference line adjacent to a current block, as a filtering reference sample, based on a horizontal direction component and a vertical direction component of a prediction direction specified by an intra prediction mode.

When an intra prediction mode of a current block is a predetermined intra prediction mode, the intra predictor 110 may determine a filtering reference sample-related value based on a filtering reference sample to be filtered and a weight of a filter, based on at least of the intra prediction mode of the current block, a position of a current sample in the current block, and a position of a reference sample in the current block.

The intra predictor 110 may determine at least one intra prediction mode, and determine a filtering reference sample to be filtered and a weight of a filter based on at least one of a position of a current sample in a current block and a position of a reference sample of the current block, by using the determined at least one intra prediction mode. The intra predictor 110 may determine a filtering reference sample-related value based on the filtering reference sample and the weight of the filter.

Here, at least one intra prediction mode may be determined for each picture unit or in units of blocks. At least one intra prediction mode may be an intra prediction mode determined based on an intra prediction mode of a current block or may be a predetermined intra prediction mode. The predetermined intra prediction mode may be at least one of a horizontal mode and a vertical mode.

The intra predictor 110 may obtain a prediction block of a current block, the prediction block including a prediction sample of the current block, based on at least one of an original reference sample-related value and a filtering reference sample-related value. For example, the intra predictor 110 may determine whether to perform intra prediction on a current sample by using both the original reference sample-related value and the filtering reference sample-related value, or may determine one of the original reference sample-related value and the filtering reference sample-related value, and determine whether to perform intra prediction on a current sample based on the determined value. The intra predictor 110 may obtain a prediction block of the current block, the prediction block including a prediction sample of the current sample, based on the above determination.

The intra predictor 110 may determine a sample value of at least one filtering reference sample to be filtered, a first weight with respect to the filtering reference sample, and a second weight with respect to an intra prediction value of a current sample, based on the position of the current sample in the current block. The first weight with respect to the filtering reference sample may be determined based on a distance between the filtering reference sample and the current sample. For example, the first weight may be determined based on a distance between the filtering reference sample and the current sample, compared to a size of the current block. Here, the size of the current block may refer to a height or width of the current block. The first weight may be the smaller, the greater the distance between the filtering reference sample and the current sample. The second weight may also be determined in a similar manner to the first weight. The first weight and the second weight may be normalized values.

Here, the filtering reference sample may include at least one of an original reference sample located in a horizontal direction of the current sample and an original reference sample located in a vertical direction of the current sample. When an intra prediction mode of a current block is an angular mode, a filtering reference sample may include at least one of adjacent samples on the left and on the top of the current block, which are located on a line passing by the current sample. Here, the line may be in a prediction direction indicated by the angular mode or an opposite direction thereto.

The intra predictor 110 may generate a filtered prediction sample value of a current sample based on a sample value of a filtering reference sample to be filtered, an intra prediction value of the current sample, a first weight with respect to the filtering reference sample, and a second weight with respect to the intra prediction value of the current sample. For example, only when an intra prediction mode of a current block is a predetermined intra prediction mode, the intra predictor 110 may generate a filtered prediction sample value of a current sample based on a sample value of a filtering reference sample to be filtered, an intra prediction value of the current sample, a first weight with respect to the filtering reference sample, and a second weight with respect to the intra prediction value of the current sample.

For example, the intra predictor 110 may determine at least one second intra prediction mode, and may determine, by using the at least one second intra prediction mode, a sample value of at least one filtering reference sample to be filtered and a first weight with respect to the filtering reference sample and a second weight with respect to an intra prediction value of the current sample based on a position of a current sample in a current block, and generate a filtered prediction sample value of the current sample based on the determined sample value of the filtering reference sample to be filtered, the intra prediction value of the current sample, the first weight with respect to the filtering reference sample, and the second weight with respect to the intra prediction value of the current sample. Here, at least one second intra prediction mode may be determined for each picture unit or in units of blocks. At least one second intra prediction mode may be determined to be at least one of an intra prediction mode of a current block, an intra prediction mode indicating an opposite direction to a prediction direction indicated by the intra prediction mode of the current block, a horizontal mode, and a vertical mode.

The intra predictor 110 may generate a prediction block of a current block, the prediction block including a filtered prediction sample value of the current block.

The intra predictor 110 may obtain a prediction sample of a current block by performing filtering based on a first weight with respect to an original reference sample-related value and a second weight with respect to a filtering reference sample-related value, and the original reference sample-related value, and the filtering reference sample-related value.

The intra predictor 110 may determine a smaller second weight with respect to a filtering reference sample-related value, the greater a distance from a filtering reference sample to a current sample.

The image decoder 115 may obtain a residual block of a current block based on information about a transform coefficient of the current block. That is, the image decoder 115 may obtain, from a bitstream, a residual sample about a residual block of a current block by performing inverse quantization and inverse transformation based on information about a transform coefficient of the current block.

The image decoder 115 may reconstruct the current block based on a prediction block of the current block and the residual block of the current block. The image decoder 115 may generate a reconstruction sample in the current block by using a sample value of a prediction sample in the prediction block of the current block and a sample value of a residual sample in the residual block of the current block, and generate a reconstruction block of the current block based on the reconstruction sample.

Meanwhile, the image decoding apparatus 100 may obtain, from a bitstream, flag information indicating whether intra prediction is adaptively performed based on a filtering reference sample and a weight of a filter, and may determine, based on the flag information, whether to adaptively perform intra prediction based on the filtering reference sample and the weight of the filter. Here, the flag information may be obtained for each block, particularly, for each coding tree unit.

Also, the image decoding apparatus 100 may obtain flag information that commonly applies to a luminance component and chrominance component.

Alternatively, the image decoding apparatus 100 may obtain flag information that applies to each of a luminance component or a chrominance component.

Alternatively, the image decoding apparatus 100 may not obtain flag information from a bitstream but may determine whether to adaptively perform intra prediction based on a filtering reference sample and a weight of a filter. For example, when a prediction mode of a current block is a predetermined intra prediction mode, the image decoding apparatus 100 may determine to adaptively perform intra prediction based on a filtering reference sample and a weight of a filter.

Alternatively, the image decoding apparatus 100 may not obtain flag information from a bitstream but may determine whether to adaptively perform intra prediction based on a filtering reference sample and a weight of a filter, by using information of a neighboring block. For example, the image decoding apparatus 100 may determine whether to adaptively perform intra prediction based on a filtering reference sample and a weight of a filter with respect to a current block based on flag information of a neighboring block of a current block, the neighboring block indicating whether intra prediction is adaptively performed, based on the filtering reference sample and the weight of the filter with respect to the neighboring block of the current block.

Alternatively, the image decoding apparatus 100 may determine whether to adaptively perform intra prediction, based on the filtering reference sample and the weight of the filter based on a size of the current block. For example, when a size of a current block is a predetermined first block size, the image decoding apparatus 100 may adaptively perform intra prediction based on a filtering reference sample and a weight of a filter, and when a size of a current block is a predetermined second block size, the image decoding apparatus 100 may not adaptively perform intra prediction based on a filtering reference sample and a weight of a filter but may perform intra prediction according to the related art.

The image decoding apparatus 100 may perform intra prediction by combining encoding/decoding tools of intra prediction that are similar to encoding/decoding tools of adaptive intra prediction based on a filtering reference sample and a weight of a filter. Alternatively, the image decoding apparatus 100 may assign a priority to a plurality of encoding/decoding tools of intra prediction and perform intra prediction based on the priorities among the encoding/decoding tools. That is, when an encoding/decoding tool having a high priority is used, an encoding/decoding tool having a low priority may not be used; when an encoding/decoding tool having a high priority is not used, an encoding/decoding tool having a low priority may be used.

FIG. 1B is a flowchart of an image decoding method according to various embodiments.

In operation S105, the image decoding apparatus 100 may obtain information about a transform coefficient of a current block.

In operation S110, the image decoding apparatus 100 may determine at least one filtering reference sample to be filtered and a weight of a filter based on at least one of an intra prediction mode of the current block, a position of a current sample in the current block, and a position of a reference sample of the current block, and may determine a filtering reference sample-related value based on the filtering reference sample to be filtered and the weight of the filter.

In operation S115, the image decoding apparatus 100 may determine an original reference sample-related value based on the position of the current sample in the current block and the intra prediction mode of the current block.

In operation S120, the image decoding apparatus 100 may obtain a prediction block of the current block, the prediction block including a prediction sample of the current sample, based on at least one of the original reference sample-related value and the filtering reference sample-related value.

In operation S125, the image decoding apparatus 100 may obtain a residual block of the current block based on the information about the transform coefficient of the current block.

In operation S130, the image decoding apparatus 100 may reconstruct the current block based on the prediction block of the current block and the residual block of the current block.

Figure 1C:
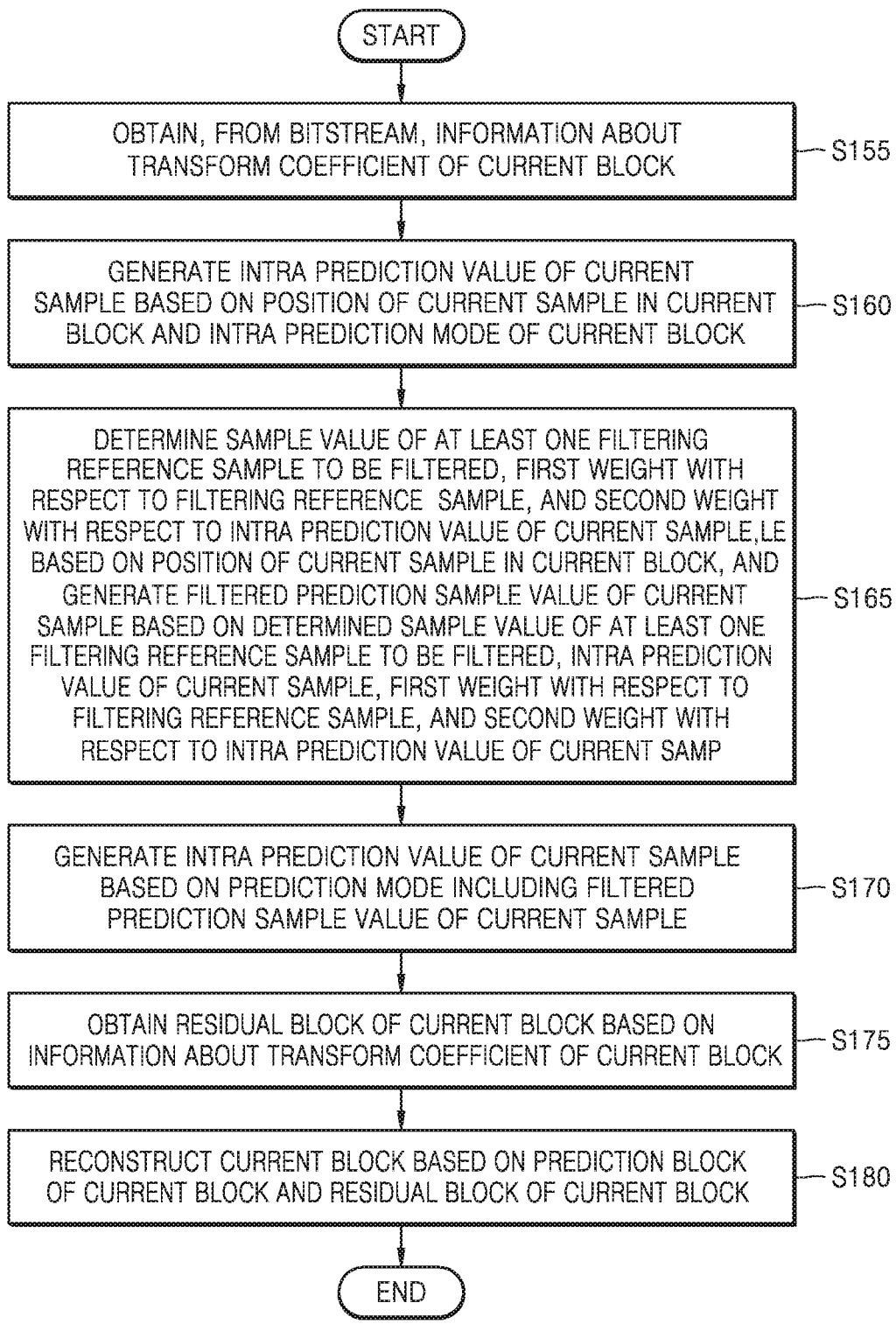
FIG. 1C is a flowchart of an image decoding method according to various embodiments.

FIG. 1C is a flowchart of an image decoding method according to various embodiments.

In operation S155, the image decoding apparatus 100 may obtain information about a transform coefficient of a current block.

In operation S160, the image decoding apparatus 100 may generate an intra prediction value with respect to a current sample based on a position of the current sample in the current block and an intra prediction mode of the current block.

In operation S165, the image decoding apparatus 100 may determine a sample value of at least one filtering reference sample to be filtered and a first weight with respect to the filtering reference sample and a second weight with respect to an intra prediction value of the current sample based on a position of the current sample in the current block, and generate a filtered prediction sample value of the current sample based on the sample value of the filtering reference sample to be filtered, the intra prediction value of the current sample, the first weight with respect to the filtering reference sample, and the second weight with respect to the intra prediction value of the current sample.

In operation S170, the image decoding apparatus 100 may generate a prediction block of the current block, the prediction block including the filtered prediction sample value of the current sample.

In operation S175, the image decoding apparatus 100 may obtain a residual block of the current block based on the information about the transform coefficient of the current block.

In operation S180, the image decoding apparatus 100 may reconstruct the current block based on the prediction block of the current block and the residual block of the current block.

Figure 1D:
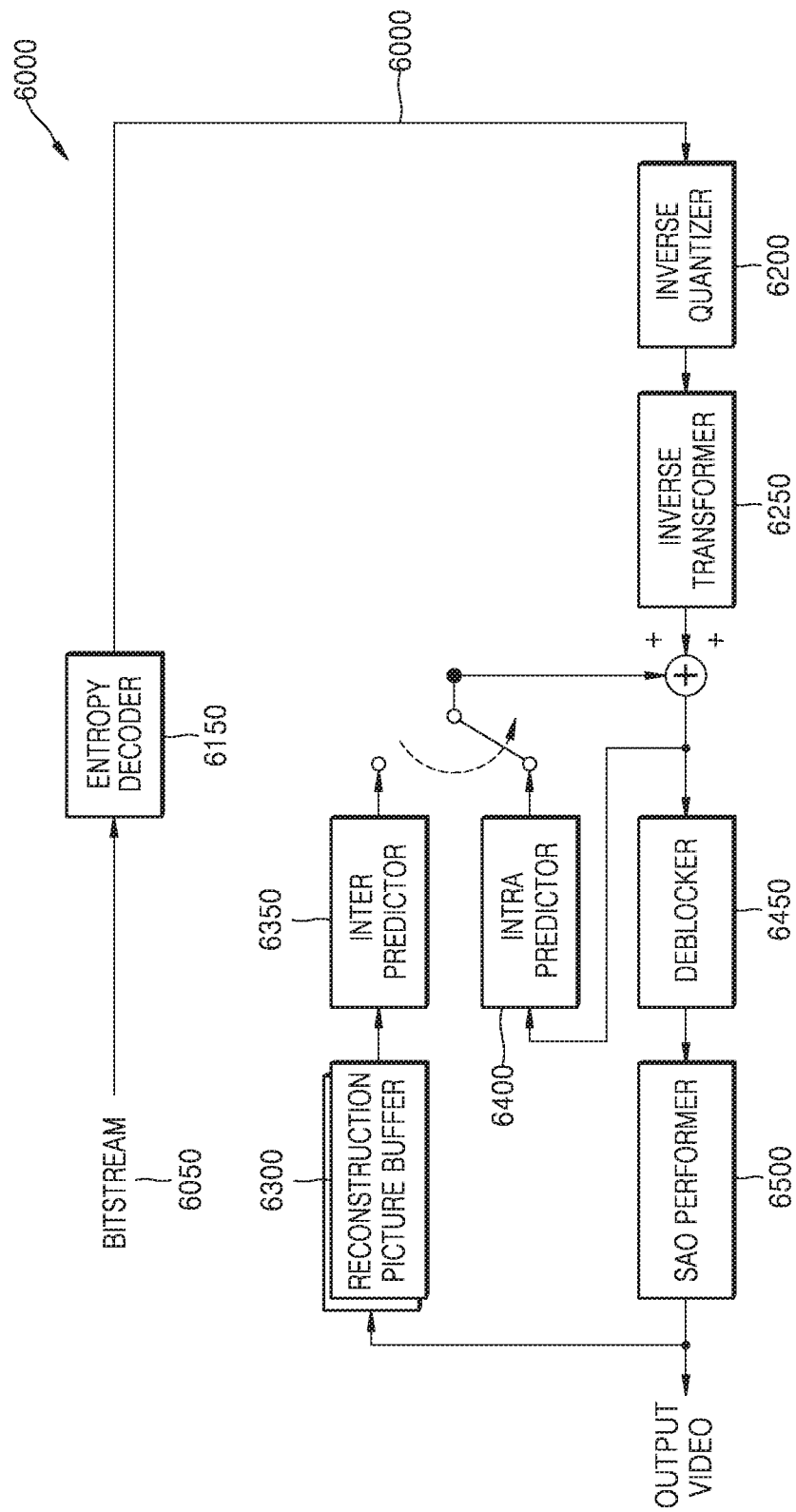
FIG. 1D is a block diagram of an image decoder according to various embodiments.

FIG. 1D is a block diagram of an image decoder 6000 according to various embodiments.

The image decoder 6000 according to various embodiments performs operations that are performed by the image decoder 115 of the image decoding apparatus 100 to encode image data.

Referring to FIG. 1D, an entropy decoder 6150 parses, from a bitstream 6050, encoded image data to be decoded and encoding information needed for decoding. Encoded image data is a quantized transform coefficient, and an inverse quantizer 6200 and an inverse transformer 6250 reconstruct residue data from the quantized transform coefficient.

An intra predictor 6400 performs intra prediction on each block. The intra predictor 6400 of FIG. 1D may correspond to the intra predictor 110 of FIG. 1A.

An inter predictor 6350 performs inter prediction by using a reference image obtained from a reconstruction picture buffer 6300. As prediction data and residue data with respect to each block generated in the intra predictor 6400 or the inter predictor 6350 are added, data of a spatial domain with respect to a block of a current image may be reconstructed, and a deblocker 6450 and a SAO performer 6500 may perform loop filtering on the reconstructed data of the spatial domain to output a filtered reconstruction image 6600. In addition, reconstruction images stored in the reconstruction picture buffer 6300 may be output as a reference image.

In order for a decoder (not shown) of the image decoding apparatus 100 to decode image data, the stepwise operations of the image decoder 6000 according to various embodiments may be performed on each block.

Figure 2A:
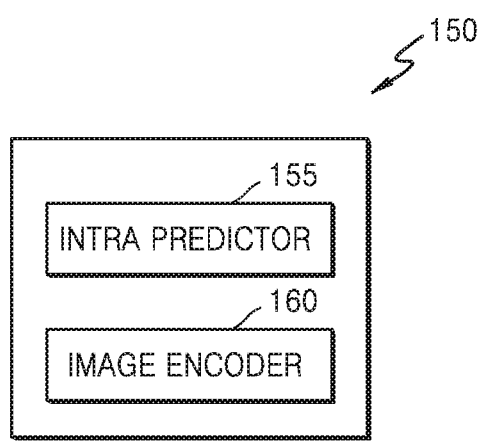
FIG. 2A is a block diagram of an image encoding apparatus according to various embodiments.

FIG. 2A is a block diagram of an image encoding apparatus according to various embodiments.

An image encoding apparatus 150 according to various embodiments may include an intra predictor 155 and an image encoder 160.

The intra predictor 155 and the image encoder 160 may include at least one processor. In addition, intra predictor 155 and the image encoder 160 may include a memory storing instructions to be executed by the at least one processor. The image encoding apparatus 150 may be implemented as separate hardware from the intra predictor 155 and the image encoder 160 or may include the intra predictor 155 and the image encoder 160.

The intra predictor 155 may determine a filtering reference sample to be filtered and a weight of a filter based on at least one of an intra prediction mode of a current block, a position of a current sample in the current block, and a position of a reference sample of the current block, and may determine a filtering reference sample-related value based on the filtering reference sample to be filtered and the weight of the filter. The intra predictor 155 may determine an original reference sample-related value based on the position of the current sample in the current block and the intra prediction mode of the current block.

The intra predictor 155 may generate a prediction block of the current block, the prediction block including a prediction sample of the current sample, based on at least one of the original reference sample-related value and the filtering reference sample-related value.

Alternatively, the intra predictor 155 may determine an intra prediction value of the current sample based on the position of the current sample in the current block and the intra prediction mode of the current block. The intra predictor 155 may determine a sample value of at least one filtering reference sample to be filtered, and a first weight with respect to the filtering reference sample, and a second weight with respect to the intra prediction value of the current sample, based on the position of the current sample in the current block. The intra predictor 155 may generate a filtered prediction sample value of the current sample based on the sample value of the filtering reference sample to be filtered, the intra prediction value of the current sample, the first weight with respect to the filtering reference sample, and the second weight with respect to the intra prediction value of the current sample. The intra predictor 155 may generate a prediction block of the current block, the prediction block including the filtered prediction sample value of the current sample.

The image encoder 160 may encode information about a transform coefficient of the current block based on the prediction block of the current block. That is, the image encoder 160 may generate a residual block of the current block based on an original block of the current block and the prediction block of the current block, and transform and quantize the residual block of the current block to encode the information about the transform coefficient of the current block. The image encoder 160 may encode information about a prediction mode of the current block and information about the intra prediction mode of the current block.

The image encoder 160 may generate a bitstream including the information about the transform coefficient of the current block and output the bitstream.

Figure 2B:
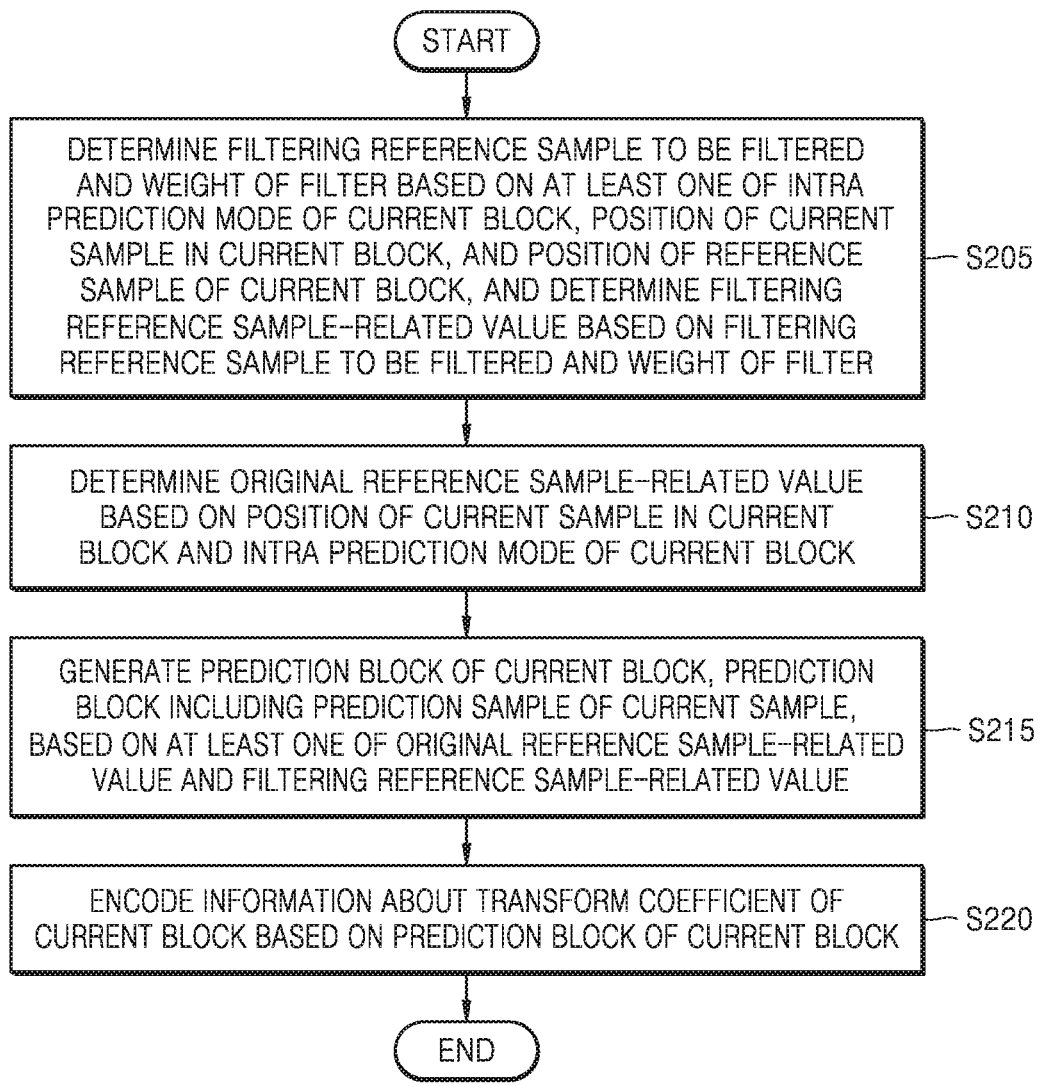
FIG. 2B is a flowchart of an image encoding method according to various embodiments.

FIG. 2B is a flowchart of an image encoding method according to various embodiments.

In operation S205, the image encoding apparatus 150 may determine at least one filtering reference sample to be filtered and a weight of a filter based on at least one of an intra prediction mode of a current block, a position of a current sample in the current block, and a position of a reference sample of the current block, and may determine a filtering reference sample-related value based on the filtering reference sample to be filtered and the weight of the filter.

In operation S210, the image encoding apparatus 150 may determine an original reference sample-related value based on the position of the current sample in the current block and the intra prediction mode of the current block.

In operation S215, the image encoding apparatus 150 may generate a prediction block of the current block, the prediction block including a prediction sample of the current sample, based on at least one of the original reference sample-related value and the filtering reference sample-related value.

In operation S220, the image encoding apparatus 150 may encode information about a transform coefficient of the current block based on the prediction block of the current block.

Figure 2C:
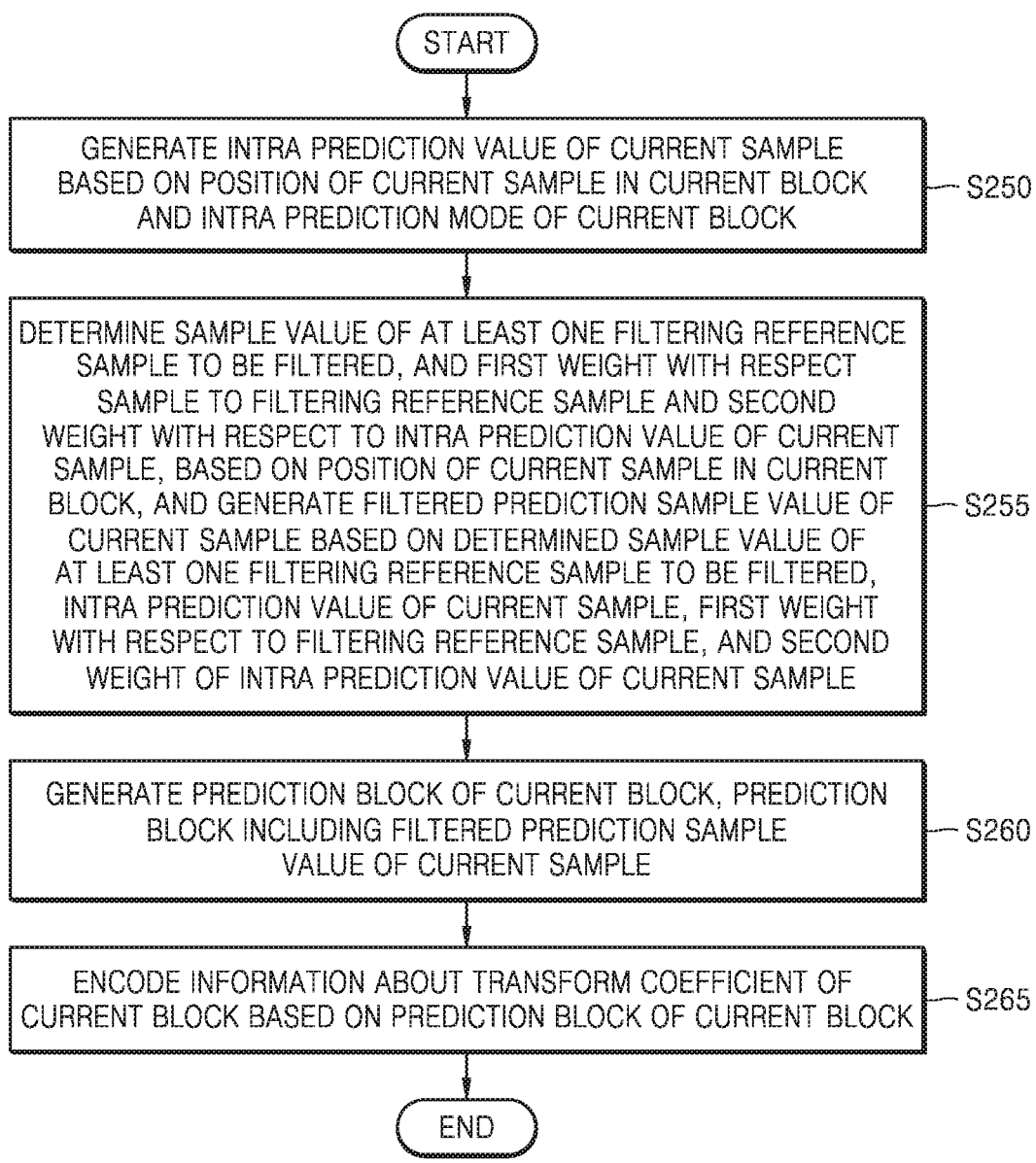
FIG. 2C is a flowchart of an image encoding method according to various embodiments.

FIG. 2C is a flowchart of an image encoding method according to various embodiments.

In operation S250, the image encoding apparatus 150 may generate an intra prediction value of a current sample based on the position of the current sample in the current block and an intra prediction mode of the current block.

In operation S255, the image encoding apparatus 150 may determine a sample value of at least one filtering reference sample to be filtered, and a first weight with respect to the filtering reference sample and a second weight with respect to the intra prediction value of the current sample, based on the position of the current sample in the current block, and generate a filtered prediction sample value of the current sample based on the determined sample value of the filtering reference sample to be filtered, the intra prediction value of the current sample, the first weight with respect to the filtering reference sample, and the second weight with respect to the intra prediction value of the current sample.

In operation S260, the image encoding apparatus 150 may generate a prediction block of the current block, the prediction block including the filtered prediction sample value of the current sample.

In operation S265, the image encoding apparatus 150 may encode information about a transform coefficient of the current block based on the prediction block of the current block.

Figure 2D:
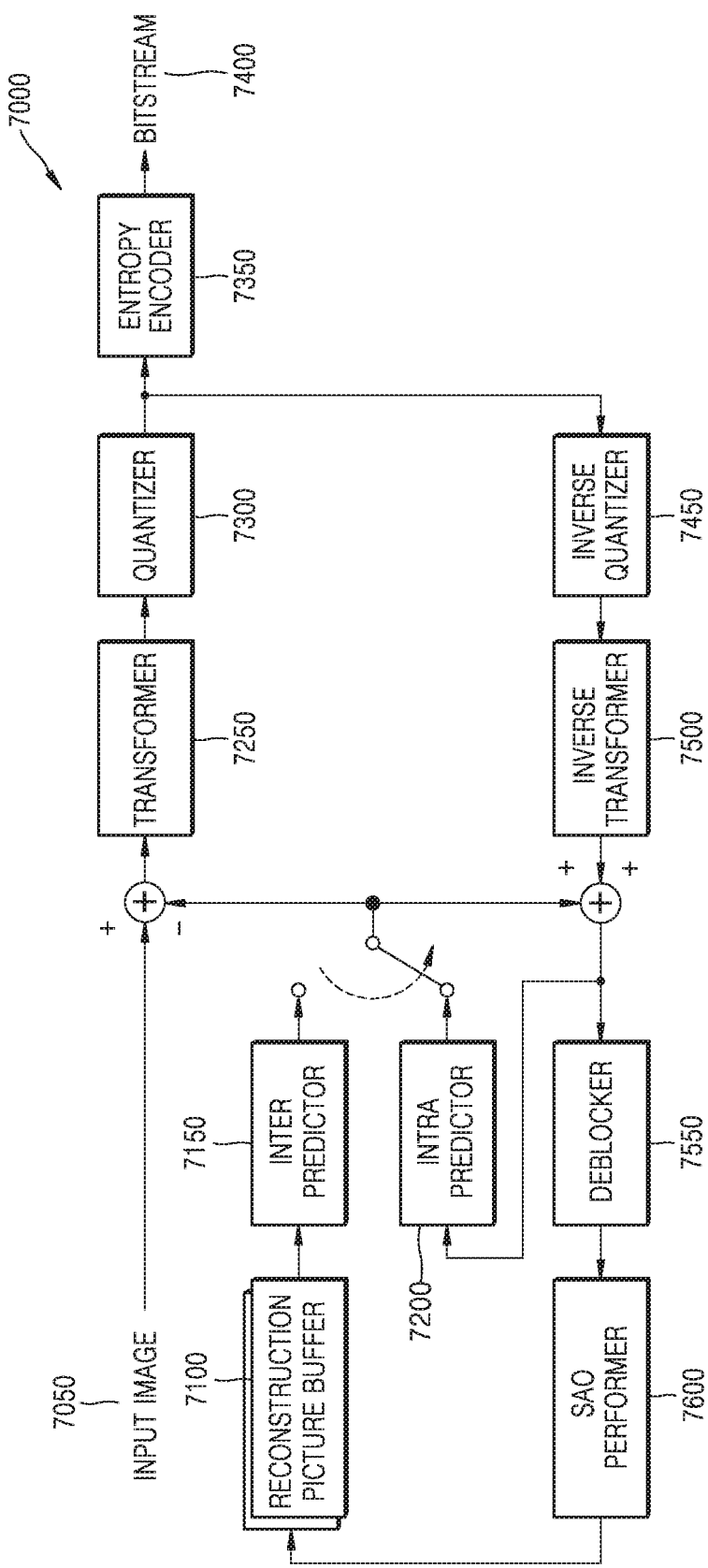
FIG. 2D is a block diagram of an image encoder according to various embodiments.

FIG. 2D is a block diagram of an image encoder according to various embodiments.

An image encoder 7000 according to various embodiments performs operations that are performed by the image encoder 160 of the image encoding apparatus 150 to encode image data.

That is, an intra predictor 7200 performs intra prediction on each block of a current image 7050, and an inter predictor 7150 performs inter prediction on each block by using a reference image obtained from the current image 7050 and a reconstruction picture buffer 7100.

Residue data may be generated by taking, from data about an encoded block of the current image 7050, prediction data about each block output from the intra predictor 7200 or the inter predictor 7150, and a transformer 7250 and a quantizer 7300 may perform transformation and quantization on the residue data to output a quantized transform coefficient for each block. The intra predictor 7200 of FIG. 2D may correspond to the intra predictor 155 of FIG. 2A.

An inverse quantizer 7450 and an inverse transformer 7500 may perform inverse quantization and inverse transformation on the quantized transform coefficient to reconstruct residue data of a spatial domain. The reconstructed residue data of the spatial domain may be added to prediction data about each block output from the intra predictor 7200 or the intra prediction to be reconstructed to data of a spatial domain with respect to a block of the current image 7050. A deblocker 7550 and an SAO performer perform in-loop filtering on the reconstructed data of the spatial domain to generate a filtered reconstruction image. The generated reconstruction image is stored in the reconstruction picture buffer 7100. Reconstruction images stored in the reconstruction picture buffer 7100 may be used as a reference image for inter prediction of other images. An entropy encoder 7350 may entropy-encode a quantized transform coefficient, and the entropy-encoded coefficient may be output to a bitstream 7400.

In order for the image encoder 7000 according to various embodiments to be applied to the image encoding apparatus

150, step-wise operations of the image encoder 7000 according to various embodiments may be performed on each block.

Hereinafter, splitting of a coding unit according to an embodiment of the present disclosure will be described in detail.

First, one picture may be split into one or more slices. One slice may be a sequence of one or more coding tree units (CTUs). A concept contrasted with a CTU is a coding tree block (CTB).

A CTB refers to an N×N block including N×N samples (N is an integer). Each color component may be split into one or more CTBs.

When a picture has three sample arrays (sample arrays for Y, Cr, and Cb components), a coding tree unit (CTU) is a unit including a coding tree block of a luma sample and two coding tree blocks of chroma samples corresponding thereto, and syntax structures used in encoding the luma sample and the chroma samples. When a picture is a monochrome image, a coding tree unit is a unit including a coding tree block of a monochrome sample and syntax structures used to encode monochrome samples. When a picture is a picture encoded to a color plane separated into color components, a coding tree unit is a unit including syntax structures used to encode the picture and samples of the picture.

One coding tree block (CTB) may be split into an M×N coding blocks including M×N samples (M and N are integers).

When a picture has sample arrays for Y, Cr, and Cb components, a coding unit (CU) is a unit including a coding block of a luma sample and two coding blocks of chroma samples corresponding thereto, and syntax structures used in encoding the luma sample and the chroma samples. When a picture is a monochrome image, a code unit is a unit including a coding block of a monochrome sample and syntax structures used to encode monochrome samples. When a picture is a picture encoded to a color plane separated into color components, a coding unit is a unit including syntax structures used to encode the picture and samples of the picture.

As described above, a coding tree block and a coding tree unit are concepts that are distinguished from each other, and a coding block and a coding unit are concepts that are distinguished from each other. That is, a coding (tree) unit refers to a data structure including a coding (tree) block including a sample and a syntax structure corresponding thereto. However, one of ordinary skill in the art may understand that a coding (tree) unit or a coding (tree) block refers to a block of a predetermined size including a predetermined number of samples. Thus, a coding tree block and a coding tree unit or a coding block and a coding unit will be described below in the specification without distinguishing between them unless otherwise noted.

An image may be split into a coding tree unit (CTU). A size of a coding tree unit may be determined based on information obtained from a bitstream. A shape of a coding tree unit may be a square of an equal size. However, the disclosure is not limited thereto.

For example, information about a maximum size of a luma coding block may be obtained from a bitstream. For example, a maximum size of a luma coding block indicated by information about the maximum size of the luma coding block may be one of 16×16, 32×32, 64×64, 128×128, and 256×256.

For example, information about a maximum size of a luma coding block that can be split into two and a luma block size difference may be obtained from a bitstream. The information about a luma block size difference may indicate a size difference between a luma coding tree unit and a luma coding tree block that can be split into two. Therefore, by combining the information about the maximum size of the luma coding block that can be split into two and the information about the luma block size difference, the information being obtained from a bitstream, a size of the luma coding tree unit may be determined. By using a size of a luma coding tree unit, a size of a chroma coding tree unit may also be determined. For example, when a Y:Cb:Cr ratio is 4:2:0 according to a color format, a size of a chroma block may be half a size of a luma block, and similarly, a size of a chroma coding tree unit may be half a size of a luma coding tree unit.

According to an embodiment, as information about a maximum size of a luma coding block that can be binary-split is obtained from a bitstream, the maximum size of the luma coding block that can be binary-split may be variably determined. In contrast, a maximum size of a luma coding block that can be ternary-split may be fixed. For example, a maximum size of a luma coding block that can be ternary-split in an I slice may be 32×32, and a maximum size of a luma coding block that can be ternary-split in a P slice or a B slice may be 64×64.

In addition, a coding tree unit may be hierarchically split into coding units based on split shape mode information obtained from a bitstream. As the split shape mode information, at least one of information indicating whether quad split is performed, information indicating whether multi-split is performed, split direction information, and split type information may be obtained from a bitstream.

For example, the information indicating whether quad split is performed may indicate whether a current coding unit is to be quad-split (QUAD_SPLIT) or not quad-split.

When a current coding unit is not quad-split, the information indicating whether multi-split is performed may indicate whether the current coding unit is no longer split (NO_SPLIT) or binary-/ternary-split.

When the current coding unit is binary-split or ternary-split, the split direction information indicates that the current coding unit is split in one of a horizontal direction or a vertical direction.

When the current coding unit is split in a horizontal or vertical direction, the split type information indicates that the current coding unit is binary-split or ternary-split.

According to the split direction information and the split type information, a split mode of the current coding unit may be determined. A split mode corresponding to binary split of a current coding unit in a horizontal direction may be determined to be a binary horizontal split (SPLIT_BT_HOR); a split mode corresponding to ternary split of a current coding unit in a horizontal direction may be determined to be a ternary horizontal split (SPLIT_TT_HOR); a split mode corresponding to binary split of a current coding unit in a vertical direction may be determined to be a binary vertical split (SPLIT_BT_VER); and a split mode corresponding to ternary split of a current coding unit in a vertical direction may be determined to be a ternary vertical split (SPLIT_TT_VER).

The image decoding apparatus 100 may obtain split shape mode information from a bin string from a bitstream. A shape of a bitstream received by the image decoding apparatus 100 may include a fixed length binary code, a unary code, a truncated unary code, a preset binary code or the like. A bin string is binary representation of information. A bin string may consist of at least one bit. The image decoding apparatus 100 may obtain split shape mode information corresponding to a bin string, based on a splitting rule. The image decoding apparatus 100 may determine whether to quad-split a coding unit, whether not to split a coding unit, or a splitting direction and a splitting type, based on one bin string.

A coding unit may be equal to or smaller than a coding tree unit. For example, a coding tree unit is also a coding unit having a maximum size, and thus is a type of coding unit. When split shape mode information about a coding tree unit indicates that the coding tree unit is not split, a coding unit determined from the coding tree unit has an equal size to that of the coding tree unit. When split shape mode information about a coding tree unit indicates that the coding tree unit is split, the coding tree unit may be split into coding units. Also, when split shape mode information about a coding unit indicates that the coding tree unit is split, coding units may be split into smaller coding units. However, image splitting is not limited thereto, and a coding tree unit and a coding unit may not be distinguished. Splitting of a coding unit will be described in more detail with reference to FIGS. 3 through 16.

Also, one or more prediction blocks for prediction may be determined from a coding unit. A prediction block may be equal to or smaller than a coding unit. Also, one or more transform blocks for transformation may be determined from a coding unit. A transform block may be equal to or smaller than a coding unit.

A shape and size of a transform block and of a prediction block may not be related to each other.

According to another embodiment, prediction may be performed by using a coding unit as a prediction block. Also, transformation may be performed by using a coding unit as a transform block.

Splitting of a coding unit will be described in more detail with reference to FIGS. 3 through 16. A current block and a neighboring block according to the present disclosure may indicate one of a coding tree unit, a coding unit, a prediction block, and a transform block. Also, a current block or a current coding unit is a block on which currently decoding or encoding is performed or a block on which currently splitting is performed. A neighboring block may be a block that is reconstructed before a current block. A neighboring block may be spatially or temporally adjacent to a current block. A neighboring block may be located on bottom left, left, top left, top, top right, right, and bottom right of a current block.

Figure 3:
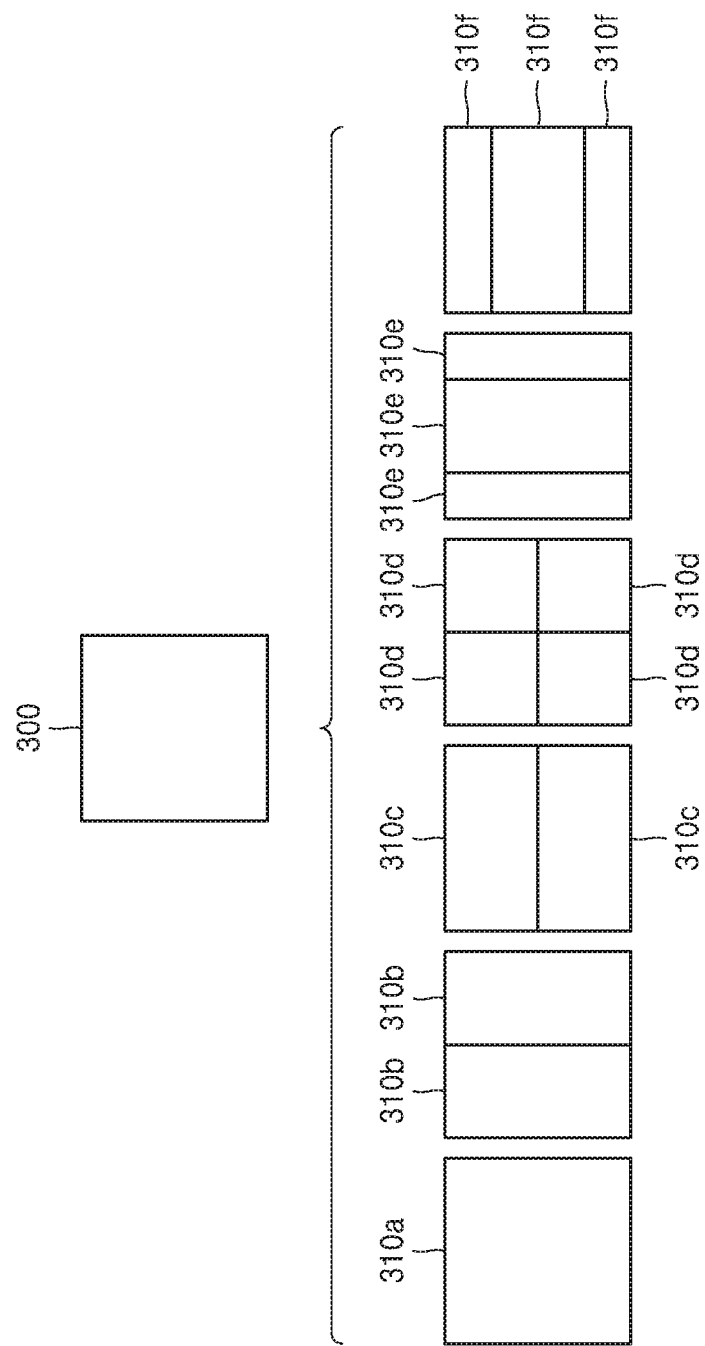
FIG. 3 illustrates a process, performed by an image decoding apparatus, of determining at least one coding unit by splitting a current coding unit, according to an embodiment.

FIG. 3 illustrates a process, performed by the image decoding apparatus 100, of determining at least one coding unit by splitting a current coding unit, according to an embodiment.

A block shape may include 4N×4N, 4N×2N, 2N×4N, 4N×N, N×4N, 32N×N, N×32N, 16N×N, N×16N, 8N×N or N×8N. Here, N may be a positive integer. Block shape information is information indicating at least one of a shape, a direction, a ratio between a width and a height, and a size of a coding unit.

A shape of a coding unit may include a square and a non-square. When lengths of a width and a height of a coding unit are equal (that is, when a block shape of the coding unit is 4N×4N), the image decoding apparatus 100 may determine block shape information of the coding unit to be a square. The image decoding apparatus 100 may determine a shape of a coding unit to be a non-square.

When a width and a height of a coding unit have different lengths (that is, when a block shape of the coding unit is 4N×2N, 2N×4N, 4N×N, N×4N, 32N×N, N×32N, 16N×N, N×16N, 8N×N, or N×8N), the image decoding apparatus 100 may determine block shape information of the coding unit to be a non-square. When a shape of a coding unit is non-square, the image decoding apparatus 100 may determine a ratio of a width and a height of block shape information of the coding unit to be at least one of 1:2, 2:1, 1:4, 4:1, 1:8, 8:1, 1:16, 16:1, 1:32, and 32:1. In addition, the image decoding apparatus 100 may determine whether the coding unit is in a horizontal or vertical direction based on the lengths of the width and the height of the coding unit. In addition, the image decoding apparatus 100 may determine a size of the coding unit based on at least one of the length of the width, the length of the height, or the area of the coding unit.

According to an embodiment, the image decoding apparatus 100 may determine a shape of a coding unit by using block shape information, and may determine a splitting method of the coding unit by using split shape mode information. That is, a coding unit splitting method indicated by the split shape mode information may be determined based on a block shape indicated by the block shape information used by the image decoding apparatus 100.

The image decoding apparatus 100 may obtain split shape mode information from a bitstream. However, the present disclosure is not limited thereto, and the image decoding apparatus 100 and the image encoding apparatus 150 may determine previously agreed split shape mode information based on block shape information. The image decoding apparatus 100 may determine previously agreed split shape mode information with respect to a coding tree unit or a minimum coding unit. For example, the image decoding apparatus 100 may determine split shape mode information with respect to a coding tree unit, as quad split. Also, the image decoding apparatus 100 may determine split shape mode information with respect to a minimum coding unit, as "no split." In detail, the image decoding apparatus 100 may determine a size of a coding tree unit to be 256×256. The image decoding apparatus 100 may determine previously agreed split shape mode information as quad-split. Quad-split is a split shape mode in which a width and a height of a coding unit are both split into two. The image decoding apparatus 100 may obtain a coding unit having a 128×128 size from a coding tree unit having a 256×256 size based on split shape mode information. In addition, the image decoding apparatus 100 may determine a size of a minimum coding unit to be 4×4. The image decoding apparatus 100 may obtain split shape mode information indicating "no split" with respect to a minimum coding unit.

According to an embodiment, the image decoding apparatus 100 may use block shape information indicating that a current coding unit has a square shape. For example, the image decoding apparatus 100 may determine whether not to split a square coding unit, whether to vertically split the square coding unit, whether to horizontally split the square coding unit, or whether to split the square coding unit into four coding units, based on the split shape mode information. Referring to FIG. 3, when the block shape information of a current coding unit 300 indicates a square shape, an image decoder 115 may determine that a coding unit 310a having the same size as the current coding unit 300 is not split, based on the split shape mode information indicating not to perform splitting, or may determine coding units 310b, 310c, 310d, 310e, and 310f split based on the split shape mode information indicating a predetermined splitting method.

Referring to FIG. 3, according to an embodiment, the image decoding apparatus 100 may determine two coding units 310b obtained by splitting the current coding unit 300 in a vertical direction, based on the split shape mode information indicating to perform splitting in a vertical direction. The image decoding apparatus 100 may determine two coding units 310c obtained by splitting the current coding unit 300 in a horizontal direction, based on the split shape mode information indicating to perform splitting in a horizontal direction. The image decoding apparatus 100 may determine four coding units 310d obtained by splitting the current coding unit 300 in vertical and horizontal directions, based on the split shape mode information indicating to perform splitting in vertical and horizontal directions. According to an embodiment, the image decoding apparatus 100 may determine three coding units 310e obtained by splitting the current coding unit 300 in a vertical direction, based on the split shape mode information indicating to perform ternary-splitting in a vertical direction. The image decoding apparatus 100 may determine three coding units 310f obtained by splitting the current coding unit 300 in a horizontal direction, based on the split shape mode information indicating to perform ternary-splitting in a horizontal direction. However, splitting methods of the square coding unit are not limited to the above-described methods, and the split shape mode information may indicate various methods. Predetermined splitting methods of splitting the square coding unit will be described in detail below in relation to various embodiments.

FIG. 4 illustrates a process, performed by the image decoding apparatus 100, of determining at least one coding unit by splitting a non-square current coding unit, according to an embodiment.

Figure 11:
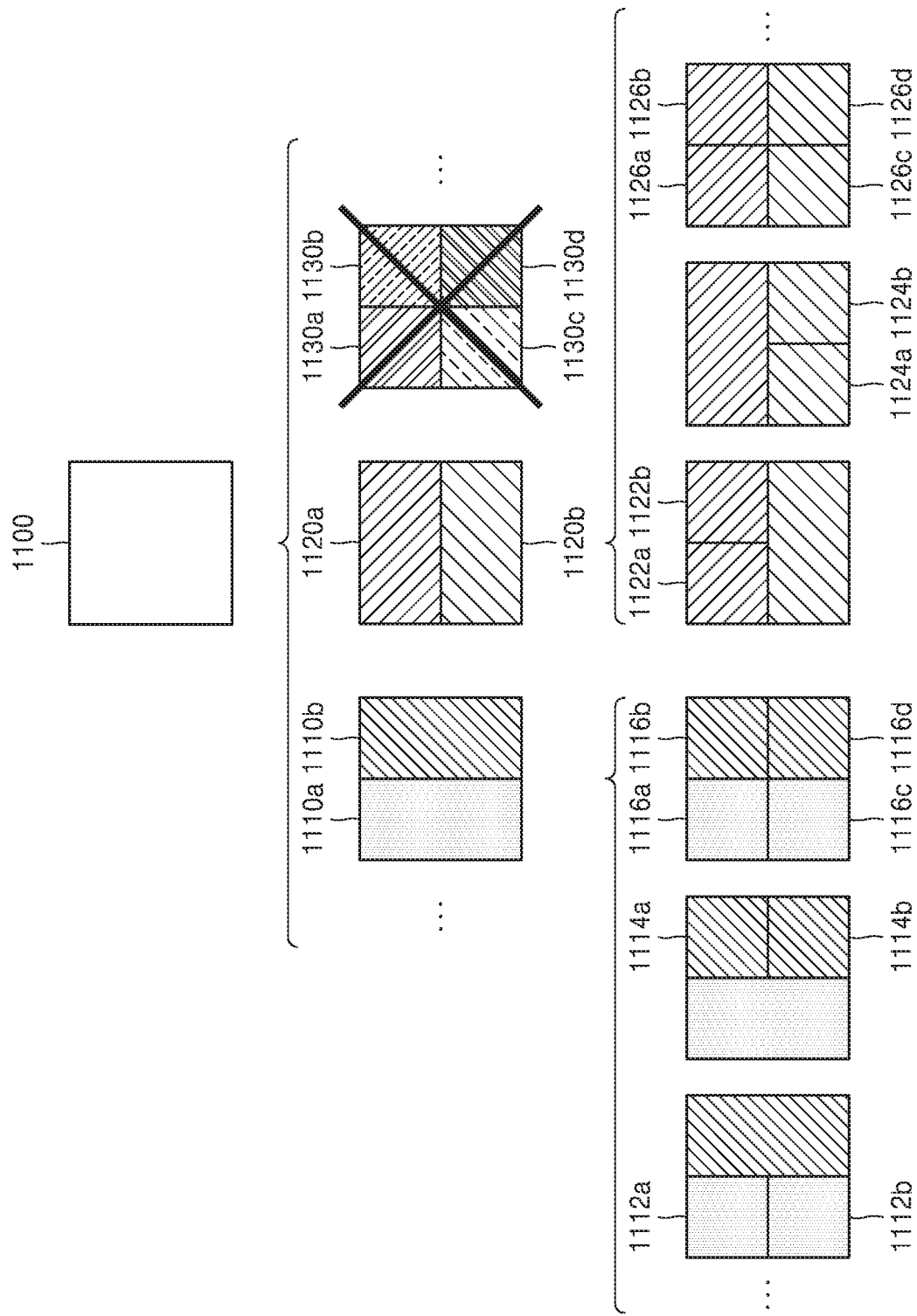
FIG. 11 illustrates a process, performed by an image decoding apparatus, of splitting a square coding unit when split shape mode information indicates that the square coding unit is not to be split into four square coding units, according to an embodiment.

According to an embodiment, the image decoding apparatus 100 may use block shape information indicating that a current coding unit has a non-square shape. The image decoding apparatus 100 may determine whether not to split the non-square current coding unit or whether to split the non-square current coding unit by using a predetermined splitting method, based on split shape mode information. Referring to FIG. 11, when block shape information of a current coding unit 400 or 450 indicates a non-square shape, the image decoding apparatus 100 may determine a coding unit 410 or 460 having the same size as the current coding unit 400 or 450, based on split shape mode information indicating not to perform splitting, or determine coding units 420a, 420b, 430a to 430c, 470a, 470b, or 480a to 480c split based on split shape mode information indicating a predetermined splitting method. Predetermined splitting methods of splitting a non-square coding unit will be described in detail below in relation to various embodiments.

According to an embodiment, the image decoding apparatus 100 may determine a splitting method of a coding unit by using the split shape mode information, and in this case, the split shape mode information may indicate the number of one or more coding units generated by splitting a coding unit. Referring to FIG. 4, when the split shape mode information indicates to split the current coding unit 400 or 450 into two coding units, the image decoding apparatus 100 may determine two coding units 420a and 420b, or 470a and 470b included in the current coding unit 400 or 450, by splitting the current coding unit 400 or 450 based on the split shape mode information.

According to an embodiment, when the image decoding apparatus 100 splits the non-square current coding unit 400 or 450 based on the split shape mode information, the location of a long side of the non-square current coding unit 400 or 450 may be considered. For example, the image decoding apparatus 100 may determine a plurality of coding units by splitting a long side of the current coding unit 400 or 450, in consideration of the shape of the current coding unit 400 or 450.

According to an embodiment, when the split shape mode information indicates to split a coding unit into an odd number of blocks, the image decoding apparatus 100 may determine an odd number of coding units included in the current coding unit 400 or 450. For example, when the split shape mode information indicates to split the current coding unit 400 or 450 into three coding units, the image decoding apparatus 100 may split the current coding unit 400 or 450 into three coding units 430a, 430b, and 430c, or 480a, 480b, and 480c.

According to an embodiment, a ratio between a width and a height of the current coding unit 400 or 450 may be 4:1 or 1:4. When the ratio between the width and the height is 4:1, because a length of the width is greater than a length of the height, the block shape information may be a horizontal direction. When the ratio between the width and the height is 1:4, because a length of the width is shorter than a length of the height, the block shape information may be a vertical direction. The image decoding apparatus 100 may determine to split a current coding unit into an odd number of blocks based on the split shape mode information. Also, the image decoding apparatus 100 may determine a splitting direction of the current coding unit 400 or 450 based on the block shape information of the current coding unit 400 or 450. For example, when the current coding unit 400 is in a vertical direction, the image decoding apparatus 100 may determine coding units 430a, 430b, and 430c by splitting the current coding unit 400 in a horizontal direction. For example, when the current coding unit 450 is in a horizontal direction, the image decoding apparatus 100 may determine coding units 480a, 480b, and 480c by splitting the current coding unit 450 in a vertical direction.

According to an embodiment, the image decoding apparatus 100 may determine an odd number of coding units included in the current coding unit 400 or 450, and not all the determined coding units may have the same size. For example, a predetermined coding unit 430b or 480b from among the determined odd number of coding units 430a, 430b, and 430c, or 480a, 480b, and 480c may have a size different from the size of the other coding units 430a and 430c, or 480a and 480c. That is, coding units which may be determined by splitting the current coding unit 400 or 450 may have multiple sizes, and in some cases, all of the odd number of coding units 430a, 430b, and 430c, or 480a, 480b, and 480c may have different sizes.

According to an embodiment, when the split shape mode information indicates to split a coding unit into an odd number of blocks, the image decoding apparatus 100 may determine an odd number of coding units included in the current coding unit 400 or 450, and may put a predetermined restriction on at least one coding unit from among the odd number of coding units generated by splitting the coding unit. Referring to FIG. 4, the image decoding apparatus 100 may allow a decoding method of the coding unit 430b or 480b to be different from that of the other coding units 430a and 430c, or 480a and 480c, wherein the coding unit 430b or 480b is at a center location from among the three coding units 430a, 430b, and 430c, or 480a, 480b, and 480c generated by splitting the current coding unit 400 or 450. For example, the image decoding apparatus 100 may restrict the coding unit 430b or 480b at the center location to be no longer split or to be split only a predetermined number of times, unlike the other coding units 430a and 430c, or 480a and 480c.

Figure 5:
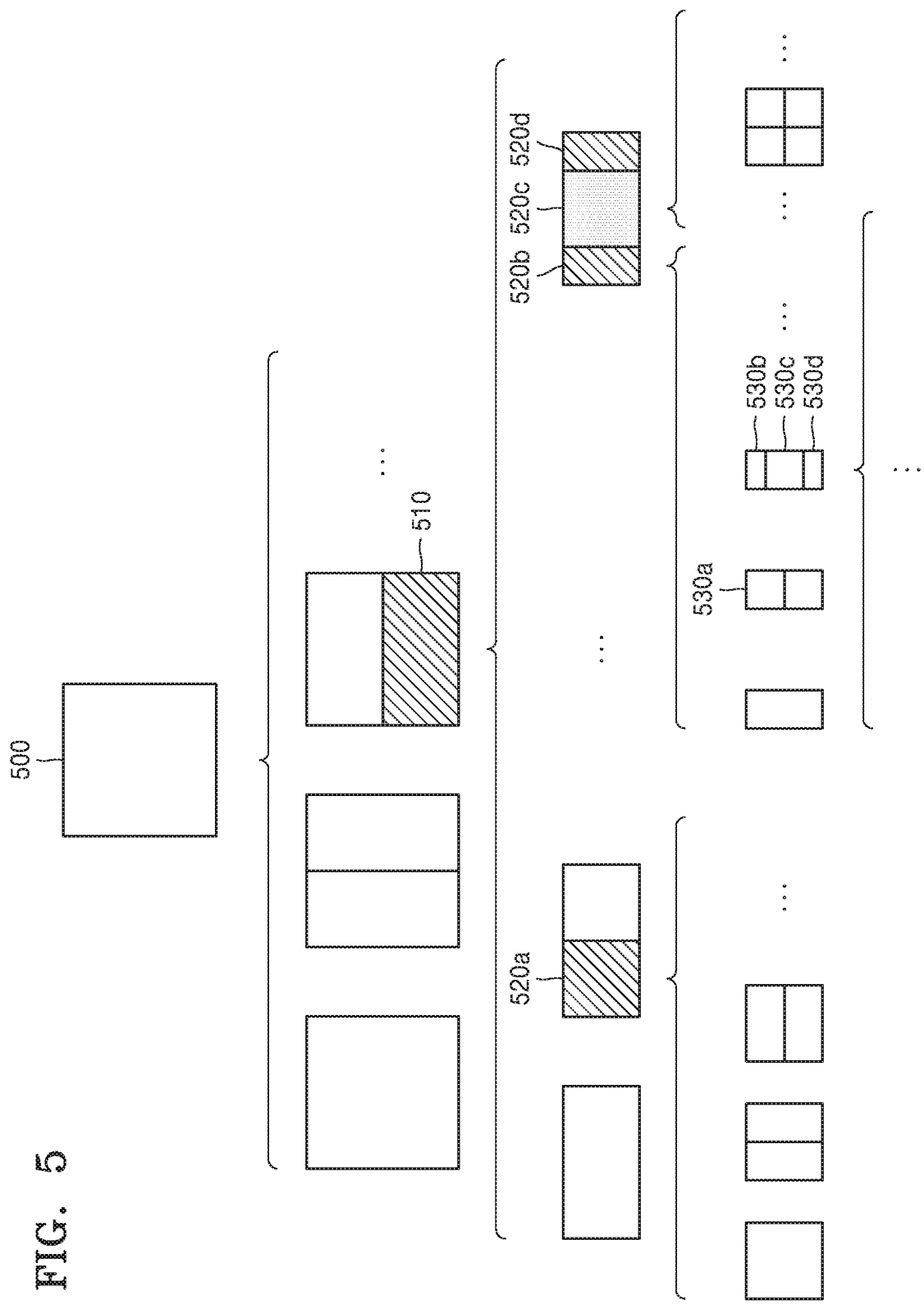
FIG. 5 illustrates a process, performed by an image decoding apparatus, of splitting a coding unit based on at least one of block shape information and split shape mode information, according to an embodiment.

FIG. 5 illustrates a process, performed by the image decoding apparatus 100, of splitting a coding unit based on at least one of block shape information and split shape mode information, according to an embodiment.

According to an embodiment, the image decoding apparatus 100 may determine to split or not to split a square first coding unit 500 into coding units, based on at least one of the block shape information and the split shape mode information. According to an embodiment, when the split shape mode information indicates to split the first coding unit 500 in a horizontal direction, the image decoding apparatus 100 may determine a second coding unit 510 by splitting the first coding unit 500 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit. It will be understood that the structure of the first coding unit, the second coding unit, and the third coding unit follows the above descriptions.

According to an embodiment, the image decoding apparatus 100 may determine to split or not to split the determined second coding unit 510 into coding units, based on the split shape mode information. Referring to FIG. 5, the image decoding apparatus 100 may split the non-square second coding unit 510, which is determined by splitting the first coding unit 500, into one or more third coding units 520a, or 520b, 520c, and 520d based on the split shape mode information, or may not split the non-square second coding unit 510. The image decoding apparatus 100 may obtain the split shape mode information, and determine a plurality of various-shaped second coding units (e.g., 510) by splitting the first coding unit 500, based on the obtained split shape mode information, and the second coding unit 510 may be split by using the splitting method of the first coding unit 500, based on the split shape mode information. According to an embodiment, when the first coding unit 500 is split into the second coding units 510 based on the split shape mode information of the first coding unit 500, the second coding unit 510 may also be split into the third coding units 520a, or 520b, 520c, and 520d based on the split shape mode information of the second coding unit 510. That is, a coding unit may be recursively split based on the split shape mode information of each coding unit. Therefore, a square coding unit may be determined by splitting a non-square coding unit, and a non-square coding unit may be determined by recursively splitting the square coding unit.

Referring to FIG. 5, a predetermined coding unit from among an odd number of third coding units 520b, 520c, and 520d determined by splitting the non-square second coding unit 510 (e.g., a coding unit which is located at a center location or a square coding unit) may be recursively split. According to an embodiment, the square third coding unit 520b from among the odd number of third coding units 520b, 520c, and 520d may be split in a horizontal direction into a plurality of fourth coding units. A non-square fourth coding unit 530b or 530d from among the plurality of fourth coding units 530a, 530b, 530c, and 530d may be split into a plurality of coding units. For example, the non-square fourth coding unit 530d or 530d may be split into an odd number of coding units. A method that may be used to recursively split a coding unit will be described below in relation to various embodiments.

According to an embodiment, the image decoding apparatus 100 may determine to split each of the third coding units 520a, 520b, 520c, and 520d into coding units based on the split shape mode information. Also, the image decoding apparatus 100 may determine not to split the second coding unit 510, based on the split shape mode information. According to an embodiment, the image decoding apparatus 100 may split the non-square second coding unit 510 into the odd number of third coding units 520b, 520c, and 520d. The image decoding apparatus 100 may put a predetermined restriction on a predetermined third coding unit from among the odd number of third coding units 520b, 520c, and 520d. For example, the image decoding apparatus 100 may restrict the third coding unit 520c at a center location from among the odd number of third coding units 520b, 520c, and 520d to be no longer split or to be split a settable number of times.

Referring to FIG. 5, the image decoding apparatus 100 may restrict the third coding unit 520c, which is at the center location from among the odd number of third coding units 520b, 520c, and 520d included in the non-square second coding unit 510, to be no longer split, to be split by using a predetermined splitting method (e.g., split into only four coding units or split by using a splitting method of the second coding unit 510), or to be split only a predetermined number of times (e.g., split only n times (where n>0)). However, the restrictions on the third coding unit 520c at the center location are not limited to the above-described examples, and may include various restrictions for decoding the third coding unit 520c at the center location differently from the other third coding units 520b and 520d.

According to an embodiment, the image decoding apparatus 100 may obtain the split shape mode information, which is used to split a current coding unit, from a predetermined location in the current coding unit.

Figure 6:
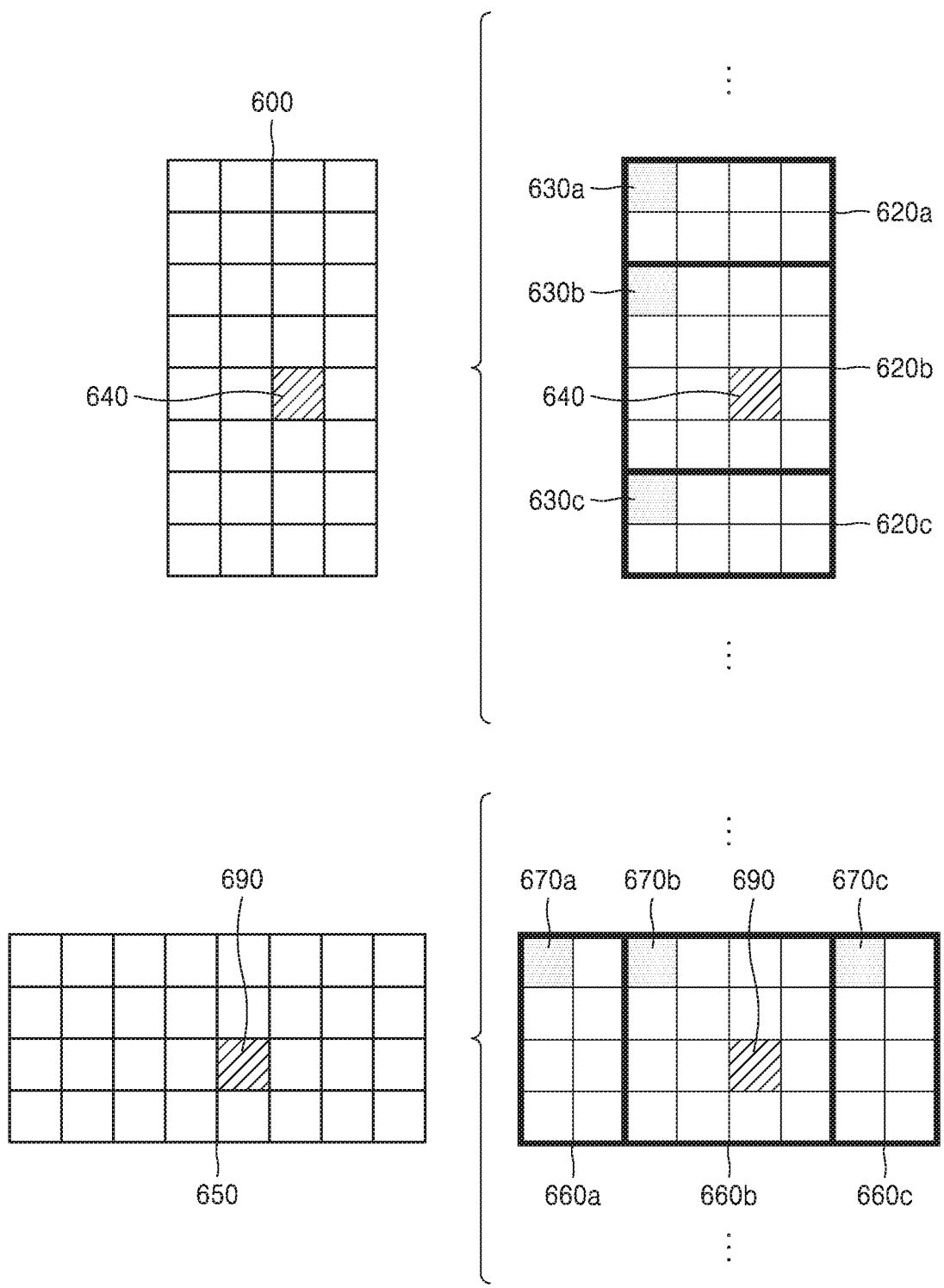
FIG. 6 illustrates a method, performed by an image decoding apparatus, of determining a predetermined coding unit from among an odd number of coding units, according to an embodiment.

FIG. 6 illustrates a method, performed by the image decoding apparatus 100, of determining a predetermined coding unit from among an odd number of coding units, according to an embodiment.

Referring to FIG. 6, split shape mode information of a current coding unit 600 or 650 may be obtained from a sample of a predetermined location from among a plurality of samples included in the current coding unit 600 or 650 (e.g., a sample 640 or 690 of a center location). However, the predetermined location in the current coding unit 600, from which at least one of the split shape mode information may be obtained, is not limited to the center location in FIG. 6, and may include various locations included in the current coding unit 600 (e.g., top, bottom, left, right, top left, bottom left, top right, and bottom right locations). The image decoding apparatus 100 may obtain the split shape mode information from the predetermined location and determine to split or not to split the current coding unit into various-shaped and various-sized coding units.

According to an embodiment, when the current coding unit is split into a predetermined number of coding units, the image decoding apparatus 100 may select one of the coding units. Various methods may be used to select one of a plurality of coding units, as will be described below in relation to various embodiments.

According to an embodiment, the image decoding apparatus 100 may split the current coding unit into a plurality of coding units, and may determine a coding unit at a predetermined location.

According to an embodiment, the image decoding apparatus 100 may use information indicating locations of the odd number of coding units, to determine a coding unit at a center location from among the odd number of coding units. Referring to FIG. 6, the image decoding apparatus 100 may determine an odd number of coding units 620a, 620b, and 620c or an odd number of coding units 660a, 660b, and 660c by splitting the current coding unit 600 or the current coding unit 650. The image decoding apparatus 100 may determine a coding unit 620b at a center location or a coding unit 660b at a center location by using information about locations of the odd number of coding units 620a to 620c or the odd number of coding units 660a to 660c. For example, the image decoding apparatus 100 may determine the coding unit 620b of the center location by determining the locations of the coding units 620a, 620b, and 620c based on information indicating locations of predetermined samples included in the coding units 620a, 620b, and 620c. In detail, the image decoding apparatus 100 may determine the coding unit 620b at the center location by determining the locations of the coding units 620a, 620b, and 620c based on information indicating locations of top left samples 630a, 630b, and 630c of the coding units 620a, 620b, and 620c.

According to an embodiment, the information indicating the locations of the top left samples 630a, 630b, and 630c, which are included in the coding units 620a, 620b, and 620c, respectively, may include information about locations or coordinates of the coding units 620a, 620b, and 620c in a picture. According to an embodiment, the information indicating the locations of the top left samples 630a, 630b, and 630c, which are included in the coding units 620a, 620b, and 620c, respectively, may include information indicating widths or heights of the coding units 620a, 620b, and 620c included in the current coding unit 600, and the widths or heights may correspond to information indicating differences between the coordinates of the coding units 620a, 620b, and 620c in the picture. That is, the image decoding apparatus 100 may determine the coding unit 620b at the center location by directly using the information about the locations or coordinates of the coding units 620a, 620b, and 620c in the picture, or by using the information about the widths or heights of the coding units, which correspond to the difference values between the coordinates.

According to an embodiment, information indicating the location of the top left sample 630a of the upper coding unit 620a may include coordinates (xa, ya), information indicating the location of the top left sample 630b of the middle coding unit 620b may include coordinates (xb, yb), and information indicating the location of the top left sample 630c of the lower coding unit 620c may include coordinates (xc, yc). The image decoding apparatus 100 may determine the middle coding unit 620b by using the coordinates of the top left samples 630a, 630b, and 630c which are included in the coding units 620a, 620b, and 620c, respectively. For example, when the coordinates of the top left samples 630a, 630b, and 630c are sorted in an ascending or descending order, the coding unit 620b including the coordinates (xb, yb) of the sample 630b at a center location may be determined as a coding unit at a center location from among the coding units 620a, 620b, and 620c determined by splitting the current coding unit 600. However, the coordinates indicating the locations of the top left samples 630a, 630b, and 630c may include coordinates indicating absolute locations in the picture, or may use coordinates (dxb, dyb) indicating a relative location of the top left sample 630b of the middle coding unit 620b and coordinates (dxc, dyc) indicating a relative location of the top left sample 630c of the lower coding unit 620c with reference to the location of the top left sample 630a of the upper coding unit 620a. A method of determining a coding unit at a predetermined location by using coordinates of a sample included in the coding unit, as information indicating a location of the sample, is not limited to the above-described method, and may include various arithmetic methods capable of using the coordinates of the sample.

According to an embodiment, the image decoding apparatus 100 may split the current coding unit 600 into a plurality of coding units 620a, 620b, and 620c, and may select one of the coding units 620a, 620b, and 620c based on a predetermined criterion. For example, the image decoding apparatus 100 may select the coding unit 620b, which has a size different from that of the others, from among the coding units 620a, 620b, and 620c.

According to an embodiment, the image decoding apparatus 100 may determine the widths or heights of the coding units 620a, 620b, and 620c by using the coordinates (xa, ya) indicating the location of the top left sample 630a of the upper coding unit 620a, the coordinates (xb, yb) indicating the location of the top left sample 630b of the middle coding unit 620b, and the coordinates (xc, yc) indicating the location of the top left sample 630c of the lower coding unit 620c. The image decoding apparatus 100 may determine the respective sizes of the coding units 620a, 620b, and 620c by using the coordinates (xa, ya), (xb, yb), and (xc, yc) indicating the locations of the coding units 620a, 620b, and 620c. According to an embodiment, the image decoding apparatus 100 may determine the width of the upper coding unit 620a to be a width of the current coding unit 600. According to an embodiment, the image decoding apparatus 100 may determine the height of the upper coding unit 620a to be yb-ya. According to an embodiment, the image decoding apparatus 100 may determine a width of the middle coding unit 620b to be the width of the current coding unit 600. According to an embodiment, the image decoding apparatus 100 may determine the height of the middle coding unit 620b to be yc-yb. According to an embodiment, the image decoding apparatus 100 may determine the width or height of the lower coding unit 620c by using the width or height of the current coding unit 600 or the widths or heights of the upper and middle coding units 620a and 620b. The image decoding apparatus 100 may determine a coding unit, which has a size different from that of the others, based on the determined widths and heights of the coding units 620a to 620c. Referring to FIG. 6, the image decoding apparatus 100 may determine the middle coding unit 620b, which has a size different from the size of the upper and lower coding units 620a and 620c, as the coding unit of the predetermined location. However, the above-described method, performed by the image decoding apparatus 100, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

The image decoding apparatus 100 may determine the widths or heights of the coding units 660a, 660b, and 660c by using the coordinates (xd, yd) indicating a location of a top left sample 670a of the left coding unit 660a, the coordinates (xe, ye) indicating a location of a top left sample 670b of the middle coding unit 660b, and the coordinates (xf, yf) indicating a location of a top left sample 670c of the right coding unit 660c. The image decoding apparatus 100 may determine the respective sizes of the coding units 660a,

660b, and 660c by using the coordinates (xd, yd), (xe, ye), and (xf, yf) indicating the locations of the coding units 660a, 660b, and 660c.

According to an embodiment, the image decoding apparatus 100 may determine the width of the left coding unit 660a to be xe-xd. The image decoding apparatus 100 may determine a height of the left coding unit 660a to be a height of the current coding unit 650. According to an embodiment, the image decoding apparatus 100 may determine the width of the middle coding unit 660b to be xf-xe. The image decoding apparatus 100 may determine a height of the middle coding unit 660b to be the height of the current coding unit 600. According to an embodiment, the image decoding apparatus 100 may determine the width or height of the right coding unit 660c by using the width or height of the current coding unit 650 or the widths or heights of the left and middle coding units 660a and 660b. The image decoding apparatus 100 may determine a coding unit, which has a size different from that of the others, based on the determined widths and heights of the coding units 660a to 660c. Referring to FIG. 6, the image decoding apparatus 100 may determine the middle coding unit 660b, which has a size different from the size of the left and right coding units 660a and 660c, as the coding unit of the predetermined location. However, the above-described method, performed by the image decoding apparatus 100, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

However, locations of samples considered to determine locations of coding units are not limited to the above-described top left locations, and information about arbitrary locations of samples included in the coding units may be used.

According to an embodiment, the image decoding apparatus 100 may select a coding unit at a predetermined location from among an odd number of coding units determined by splitting the current coding unit, considering the shape of the current coding unit. For example, when the current coding unit has a non-square shape, a width of which is longer than a height, the image decoding apparatus 100 may determine the coding unit at the predetermined location in a horizontal direction. That is, the image decoding apparatus 100 may determine one of coding units at different locations in a horizontal direction and put a restriction on the coding unit. When the current coding unit has a non-square shape, a height of which is longer than a width, the image decoding apparatus 100 may determine the coding unit at the predetermined location in a vertical direction. That is, the image decoding apparatus 100 may determine one of coding units at different locations in a vertical direction and may put a restriction on the coding unit.

According to an embodiment, the image decoding apparatus 100 may use information indicating respective locations of an even number of coding units, to determine the coding unit at the predetermined location from among the even number of coding units. The image decoding apparatus 100 may determine an even number of coding units by splitting (binary split) the current coding unit, and may determine the coding unit at the predetermined location by using the information about the locations of the even number of coding units. An operation related thereto may correspond to the operation of determining a coding unit at a predetermined location (e.g., a center location) from among an odd number of coding units, which has been described in detail above in relation to FIG. 6, and thus detailed descriptions thereof are not provided here.

According to an embodiment, when a non-square current coding unit is split into a plurality of coding units, predetermined information about a coding unit at a predetermined location may be used in a splitting operation to determine the coding unit at the predetermined location from among the plurality of coding units. For example, the image decoding apparatus 100 may use at least one of block shape information and split shape mode information, which is stored in a sample included in a coding unit at a center location, in a splitting operation to determine the coding unit at the center location from among the plurality of coding units determined by splitting the current coding unit.

Referring to FIG. 6, the image decoding apparatus 100 may split the current coding unit 600 into a plurality of coding units 620a, 620b, and 620c based on the split shape mode information, and may determine the coding unit 620b at the center location from among the plurality of the coding units 620a, 620b, and 620c. Furthermore, the image decoding apparatus 100 may determine the coding unit 620b at the center location, in consideration of a location from which the split shape mode information is obtained. That is, the split shape mode information of the current coding unit 600 may be obtained from the sample 640 at a center location of the current coding unit 600, and when the current coding unit 600 is split into the plurality of coding units 620a, 620b, and 620c based on the split shape mode information, the coding unit 620b including the sample 640 may be determined as the coding unit at the center location. However, information used to determine the coding unit at the center location is not limited to the split shape mode information, and various types of information may be used to determine the coding unit at the center location.

According to an embodiment, predetermined information for identifying the coding unit at the predetermined location may be obtained from a predetermined sample included in a coding unit to be determined. Referring to FIG. 6, the image decoding apparatus 100 may use the split shape mode information, which is obtained from a sample at a predetermined location in the current coding unit 600 (e.g., a sample at a center location of the current coding unit 600) to determine a coding unit at a predetermined location from among the plurality of the coding units 620a, 620b, and 620c determined by splitting the current coding unit 600 (e.g., a coding unit at a center location from among a plurality of split coding units). That is, the image decoding apparatus 100 may determine the sample at the predetermined location by considering a block shape of the current coding unit 600, determine the coding unit 620b including a sample, from which predetermined information (e.g., the split shape mode information) may be obtained, from among the plurality of coding units 620a, 620b, and 620c determined by splitting the current coding unit 600, and may put a predetermined restriction on the coding unit 620b. Referring to FIG. 6, according to an embodiment, the image decoding apparatus 100 may determine the sample 640 at the center location of the current coding unit 600 as the sample from which the predetermined information may be obtained, and may put a predetermined restriction on the coding unit 620b including the sample 640, in a decoding operation. However, the location of the sample from which the predetermined information may be obtained is not limited to the above-described location, and may include arbitrary locations of samples included in the coding unit 620*b* to be determined for a restriction.

According to an embodiment, the location of the sample from which the predetermined information may be obtained may be determined based on the shape of the current coding unit 600. According to an embodiment, the block shape information may indicate whether the current coding unit has a square or non-square shape, and the location of the sample from which the predetermined information may be obtained may be determined based on the shape. For example, the image decoding apparatus 100 may determine a sample located on a boundary for dividing at least one of a width and height of the current coding unit in half, as the sample from which the predetermined information may be obtained, by using at least one of information about the width of the current coding unit and information about the height of the current coding unit. As another example, when the block shape information of the current coding unit indicates a non-square shape, the image decoding apparatus 100 may determine one of samples adjacent to a boundary for dividing a long side of the current coding unit in half, as the sample from which the predetermined information may be obtained.

According to an embodiment, when the current coding unit is split into a plurality of coding units, the image decoding apparatus 100 may use the split shape mode information to determine a coding unit at a predetermined location from among the plurality of coding units. According to an embodiment, the image decoding apparatus 100 may obtain the split shape mode information from a sample at a predetermined location in a coding unit, and split the plurality of coding units, which are generated by splitting the current coding unit, by using the split shape mode information, which is obtained from the sample of the predetermined location in each of the plurality of coding units. That is, a coding unit may be recursively split based on the split shape mode information, which is obtained from the sample at the predetermined location in each coding unit. An operation of recursively splitting a coding unit has been described above in relation to FIG. 5, and thus detailed descriptions thereof will not be provided here.

According to an embodiment, the image decoding apparatus 100 may determine one or more coding units by splitting the current coding unit, and may determine an order of decoding the one or more coding units, based on a predetermined block (e.g., the current coding unit).

Figure 7:
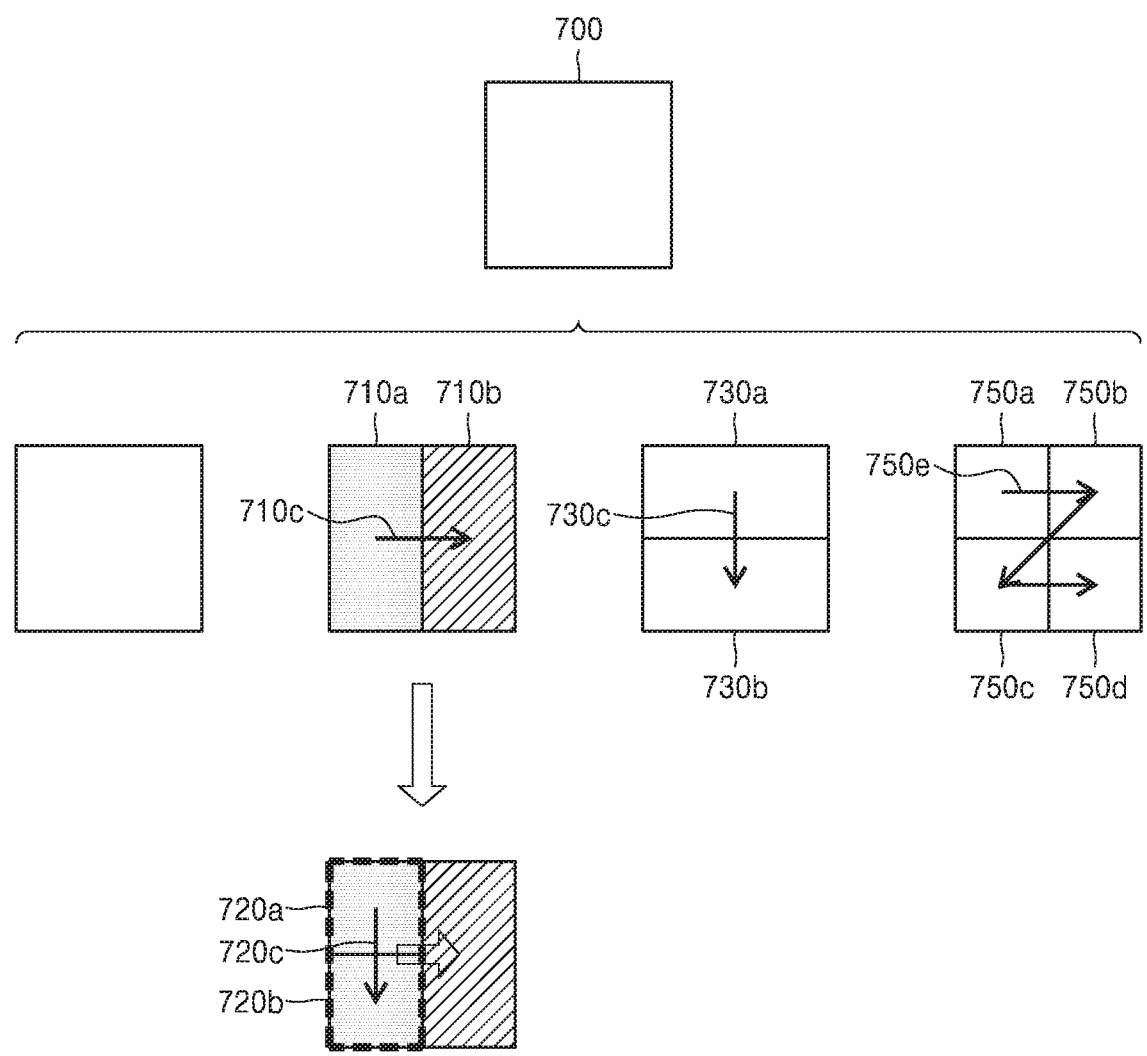
FIG. 7 illustrates an order of processing, performed by an image decoding apparatus, a plurality of coding units when the plurality of coding units are determined by splitting a current coding unit, according to an embodiment.

FIG. 7 illustrates an order of processing a plurality of coding units when the image decoding apparatus 100 determines the plurality of coding units by splitting a current coding unit, according to an embodiment.

According to an embodiment, the image decoding apparatus 100 may determine second coding units 710*a* and 710*b* by splitting a first coding unit 700 in a vertical direction, determine second coding units 730*a* and 730*b* by splitting the first coding unit 700 in a horizontal direction, or determine second coding units 750*a* to 750*d* by splitting the first coding unit 700 in vertical and horizontal directions, based on split shape mode information.

Referring to FIG. 7, the image decoding apparatus 100 may determine to process the second coding units 710*a* and 710*b*, which are determined by splitting the first coding unit 700 in a vertical direction, in a horizontal direction order 710*c*. The image decoding apparatus 100 may determine to process the second coding units 730*a* and 730*b*, which are determined by splitting the first coding unit 700 in a horizontal direction, in a vertical direction order 730*c*. The image decoding apparatus 100 may determine to process the second coding units 750*a* to 750*d*, which are determined by splitting the first coding unit 700 in vertical and horizontal directions, according to a predetermined order (e.g., in a raster scan order or Z-scan order 750*e*) by which coding units in a row are processed and then coding units in a next row are processed.

According to an embodiment, the image decoding apparatus 100 may recursively split coding units. Referring to FIG. 7, the image decoding apparatus 100 may determine a plurality of coding units 710*a*, 710*b*, 730*a*, 730*b*, 750*a*, 750*b*, 750*c*, and 750*d* by splitting the first coding unit 700, and may recursively split each of the determined plurality of coding units 710*a*, 710*b*, 730*a*, 730*b*, 750*a*, 750*b*, 750*c*, and 750*d*. A splitting method of the plurality of coding units 710*a*, 710*b*, 730*a*, 730*b*, 750*a*, 750*b*, 750*c*, and 750*d* may correspond to a splitting method of the first coding unit 700. As such, each of the plurality of coding units 710*a*, 710*b*, 730*a*, 730*b*, 750*a*, 750*b*, 750*c*, and 750*d* may be independently split into a plurality of coding units. Referring to FIG. 7, the image decoding apparatus 100 may determine the second coding units 710*a* and 710*b* by splitting the first coding unit 700 in a vertical direction, and may determine to independently split or not to split each of the second coding units 710*a* and 710*b*.

According to an embodiment, the image decoding apparatus 100 may determine third coding units 720*a* and 720*b* by splitting the left second coding unit 710*a* in a horizontal direction, and may not split the right second coding unit 710*b*.

According to an embodiment, a processing order of coding units may be determined based on an operation of splitting a coding unit. In other words, a processing order of split coding units may be determined based on a processing order of coding units immediately before being split. The image decoding apparatus 100 may determine a processing order of the third coding units 720*a* and 720*b* determined by splitting the left second coding unit 710*a*, independently of the right second coding unit 710*b*. Because the third coding units 720*a* and 720*b* are determined by splitting the left second coding unit 710*a* in a horizontal direction, the third coding units 720*a* and 720*b* may be processed in a vertical direction order 720*c*. Because the left and right second coding units 710*a* and 710*b* are processed in the horizontal direction order 710*c*, the right second coding unit 710*b* may be processed after the third coding units 720*a* and 720*b* included in the left second coding unit 710*a* are processed in the vertical direction order 720*c*. An operation of determining a processing order of coding units based on a coding unit before being split is not limited to the above-described example, and various methods may be used to independently process coding units, which are split and determined to various shapes, in a predetermined order.

Figure 8:
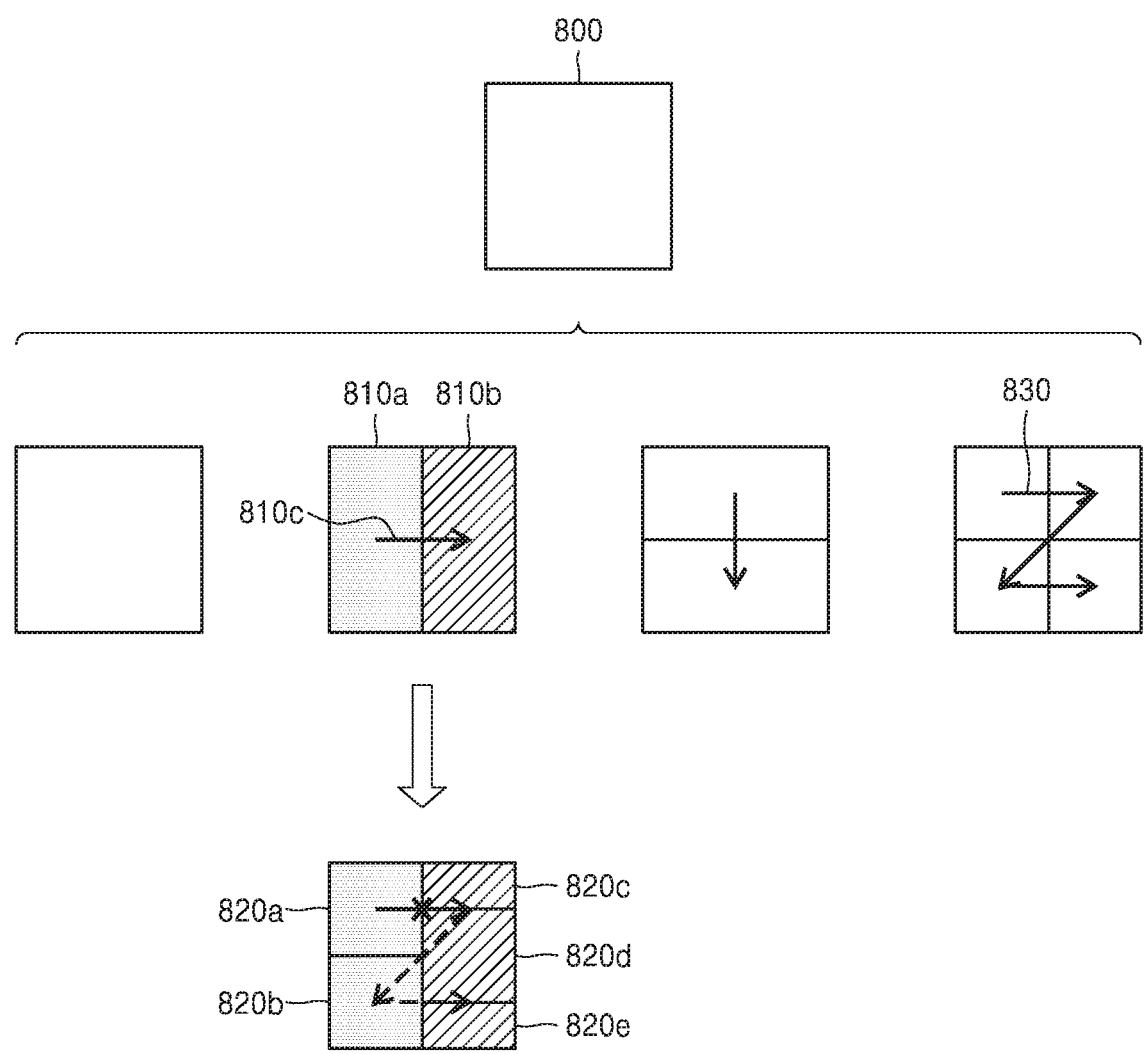
FIG. 8 illustrates a process, performed by an image decoding apparatus, of determining that a current coding unit is to be split into an odd number of coding units, when the coding units are not processable in a predetermined order, according to an embodiment.

FIG. 8 illustrates a process, performed by the image decoding apparatus 100, of determining that a current coding unit is to be split into an odd number of coding units, when the coding units are not processable in a predetermined order, according to an embodiment.

According to an embodiment, the image decoding apparatus 100 may determine whether the current coding unit is split into an odd number of coding units, based on obtained split shape mode information. Referring to FIG. 8, a square first coding unit 800 may be split into non-square second coding units 810*a* and 810*b*, and the second coding units 810*a* and 810*b* may be independently split into third coding units 820*a* and 820*b*, and 820*c* to 820*e*. According to an embodiment, the image decoding apparatus 100 may determine a plurality of third coding units 820a and 820b by splitting the left second coding unit 810a in a horizontal direction, and may split the right second coding unit 810b into an odd number of third coding units 820c to 820e.

According to an embodiment, the image decoding apparatus 100 may determine whether any coding unit is split into an odd number of coding units, by determining whether the third coding units 820a and 820b, and 820c to 820e are processable in a predetermined order. Referring to FIG. 8, the image decoding apparatus 100 may determine the third coding units 820a and 820b, and 820c to 820e by recursively splitting the first coding unit 800. The image decoding apparatus 100 may determine whether any of the first coding unit 800, the second coding units 810a and 810b, and the third coding units 820a and 820b, and 820c, 820d, and 820e are split into an odd number of coding units, based on at least one of block shape information and the split shape mode information. For example, a second coding unit located in the right from among the second coding units 810a and 810b may be split into an odd number of third coding units 820c, 820d, and 820e. A processing order of a plurality of coding units included in the first coding unit 800 may be a predetermined order (e.g., a Z-scan order 830), and the image decoding apparatus 100 may decide whether the third coding units 820c, 820d, and 820e, which are determined by splitting the right second coding unit 810b into an odd number of coding units, satisfy a condition for processing in the predetermined order.

According to an embodiment, the image decoding apparatus 100 may determine whether the third coding units 820a and 820b, and 820c, 820d, and 820e included in the first coding unit 800 satisfy the condition for processing in the predetermined order, and the condition relates to whether at least one of a width and height of the second coding units 810a and 810b is to be split in half along a boundary of the third coding units 820a and 820b, and 820c, 820d, and 820e. For example, the third coding units 820a and 820b determined by dividing the height of the non-square left second coding unit 810a in half may satisfy the condition. Because boundaries of the third coding units 820c, 820d, and 820e determined by splitting the right second coding unit 810b into three coding units do not divide the width or height of the right second coding unit 810b in half, it may be determined that the third coding units 820c, 820d, and 820e do not satisfy the condition. When the condition is not satisfied as described above, the image decoding apparatus 100 may decide disconnection of a scan order, and determine that the right second coding unit 810b is split into an odd number of coding units, based on a result of the decision. According to an embodiment, when a coding unit is split into an odd number of coding units, the image decoding apparatus 100 may put a predetermined restriction on a coding unit at a predetermined location among the split coding units. The restriction or the predetermined location has been described above in relation to various embodiments, and thus detailed descriptions thereof will not be provided here.

Figure 9:
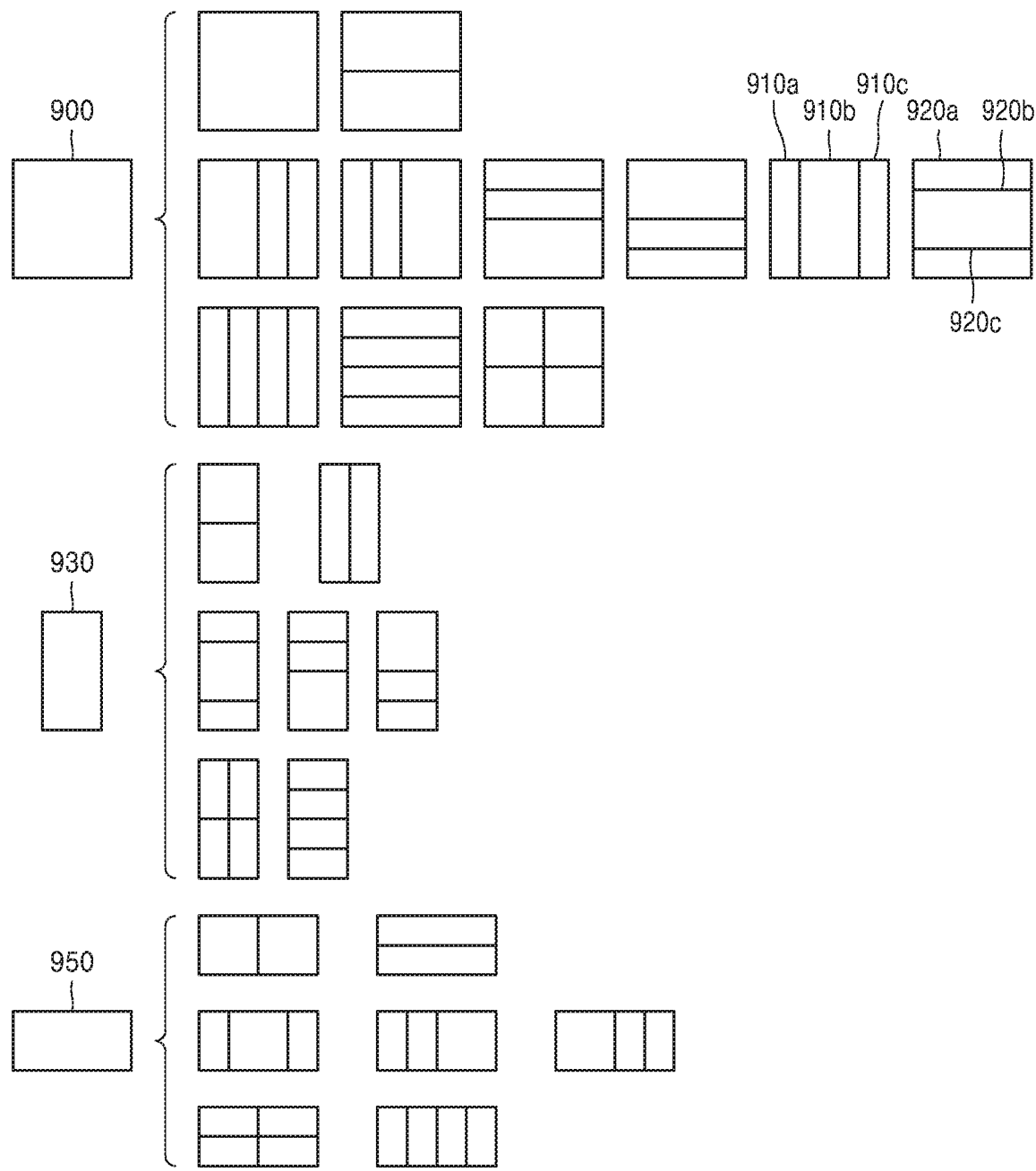
FIG. 9 illustrates a process, performed by an image decoding apparatus, of determining at least one coding unit by splitting a first coding unit, according to an embodiment.

FIG. 9 illustrates a process, performed by the image decoding apparatus 100, of determining at least one coding unit by splitting a first coding unit 900, according to an embodiment.

According to an embodiment, the image decoding apparatus 100 may split the first coding unit 900, based on split shape mode information, which is obtained by a receiver (not shown). The square first coding unit 900 may be split into four square coding units, or may be split into a plurality of non-square coding units. For example, referring to FIG. 9, when the first coding unit 900 has a square shape and the split shape mode information indicates to split the first coding unit 900 into non-square coding units, the image decoding apparatus 100 may split the first coding unit 900 into a plurality of non-square coding units. In detail, when the split shape mode information indicates to determine an odd number of coding units by splitting the first coding unit 900 in a horizontal direction or a vertical direction, the image decoding apparatus 100 may split the square first coding unit 900 into an odd number of coding units, e.g., second coding units 910a, 910b, and 910c determined by splitting the square first coding unit 900 in a vertical direction or second coding units 920a, 920b, and 920c determined by splitting the square first coding unit 900 in a horizontal direction.

According to an embodiment, the image decoding apparatus 100 may determine whether the second coding units 910a, 910b, 910c, 920a, 920b, and 920c included in the first coding unit 900 satisfy a condition for processing in a predetermined order, and the condition relates to whether at least one of a width and height of the first coding unit 900 is to be divided in half along a boundary of the second coding units 910a, 910b, 910c, 920a, 920b, and 920c. Referring to FIG. 9, because boundaries of the second coding units 910a, 910b, and 910c determined by splitting the square first coding unit 900 in a vertical direction do not divide the height of the first coding unit 900 in half, it may be determined that the first coding unit 900 does not satisfy the condition for processing in the predetermined order. In addition, because boundaries of the second coding units 920a, 920b, and 920c determined by splitting the square first coding unit 900 in a horizontal direction do not divide the width of the first coding unit 900 in half, it may be determined that the first coding unit 900 does not satisfy the condition for processing in the predetermined order. When the condition is not satisfied as described above, the image decoding apparatus 100 may decide disconnection of a scan order, and may determine that the first coding unit 900 is to be split into an odd number of coding units, based on a result of the decision. According to an embodiment, when a coding unit is split into an odd number of coding units, the image decoding apparatus 100 may put a predetermined restriction on a coding unit at a predetermined location among the split coding units. The restriction or the predetermined location has been described above in relation to various embodiments, and thus detailed descriptions thereof will not be provided here.

According to an embodiment, the image decoding apparatus 100 may determine various-shaped coding units by splitting a first coding unit.

Referring to FIG. 9, the image decoding apparatus 100 may split the square first coding unit 900 or a non-square first coding unit 930 or 950 into various-shaped coding units.

Figure 10:
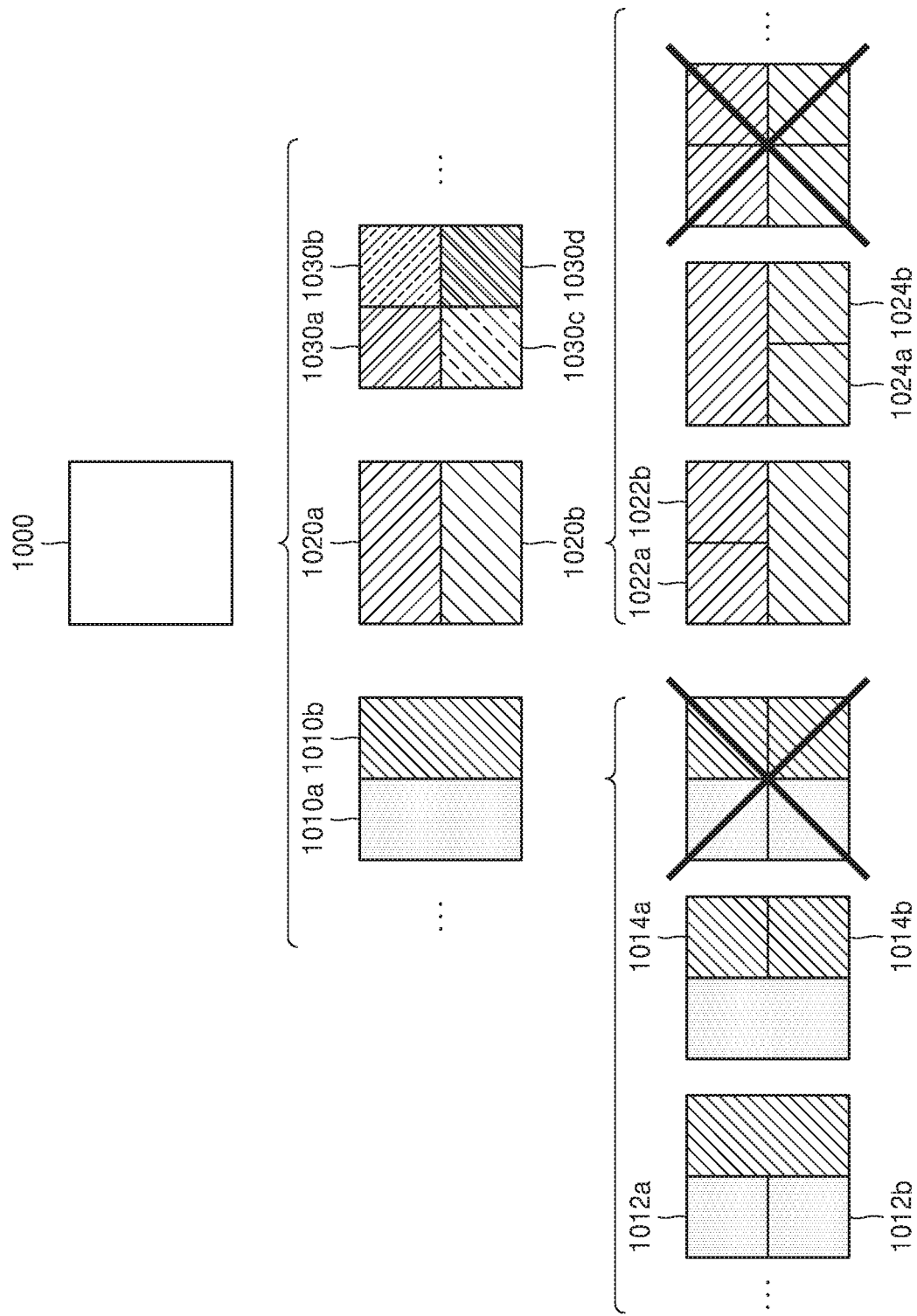
FIG. 10 illustrates that a shape into which a second coding unit is splittable is restricted when the second coding unit having a non-square shape, which is determined by an image decoding apparatus by splitting a first coding unit, satisfies a predetermined condition, according to an embodiment.

FIG. 10 illustrates that a shape into which a second coding unit is splittable by the image decoding apparatus 100 is restricted when the second coding unit having a non-square shape, which is determined by splitting a first coding unit 1000, satisfies a predetermined condition, according to an embodiment.

According to an embodiment, the image decoding apparatus 100 may determine to split the square first coding unit 1000 into non-square second coding units 1010a, 1010b, 1020a, and 1020b, based on split shape mode information, which is obtained by a receiver (not shown). The second coding units 1010a, 1010b, 1020a, and 1020b may be independently split. As such, the image decoding apparatus 100 may determine to split or not to split the first coding unit 1000 into a plurality of coding units, based on the split shape mode information of each of the second coding units 1010a, 1010b, 1020a, and 1020b. According to an embodiment, the image decoding apparatus 100 may determine third coding units 1012a and 1012b by splitting the non-square left second coding unit 1010a, which is determined by splitting the first coding unit 1000 in a vertical direction, in a horizontal direction. However, when the left second coding unit 1010a is split in a horizontal direction, the image decoding apparatus 100 may restrict the right second coding unit 1010b to not be split in a horizontal direction in which the left second coding unit 1010a is split. When third coding units 1014a and 1014b are determined by splitting the right second coding unit 1010b in a same direction, because the left and right second coding units 1010a and 1010b are independently split in a horizontal direction, the third coding units 1012a, 1012b, 1014a, and 1014b may be determined. However, this case serves equally as a case in which the image decoding apparatus 100 splits the first coding unit 1000 into four square second coding units 1030a, 1030b, 1030c, and 1030d, based on the split shape mode information, and may be inefficient in terms of image decoding.

According to an embodiment, the image decoding apparatus 100 may determine third coding units 1022a, 1022b, 1024a, and 1024b by splitting the non-square second coding unit 1020a or 1020b, which is determined by splitting the first coding unit 1000 in a horizontal direction, in a vertical direction. However, when a second coding unit (e.g., the upper second coding unit 1020a) is split in a vertical direction, for the above-described reason, the image decoding apparatus 100 may restrict the other second coding unit (e.g., the lower second coding unit 1020b) to not be split in a vertical direction in which the upper second coding unit 1020a is split.

FIG. 11 illustrates a process, performed by the image decoding apparatus 100, of splitting a square coding unit when split shape mode information indicates that the square coding unit is not to be split into four square coding units, according to an embodiment.

According to an embodiment, the image decoding apparatus 100 may determine second coding units 1110a, 1110b, 1120a, 1120b, etc. by splitting a first coding unit 1100, based on the split shape mode information. The split shape mode information may include information about various methods of splitting a coding unit, but the information about various splitting methods may not include information for splitting a coding unit into four square coding units. According to such split shape mode information, the image decoding apparatus 100 may not split the first square coding unit 1100 into four square second coding units 1130a, 1130b, 1130c, and 1130d. The image decoding apparatus 100 may determine the non-square second coding units 1110a, 1110b, 110a, 1120b, etc., based on the split shape mode information.

According to an embodiment, the image decoding apparatus 100 may independently split the non-square second coding units 1110a, 1110b, 1120a, 1120b, etc. Each of the second coding units 1110a, 1110b, 1120a, 1120b, etc. may be recursively split in a predetermined order, and this splitting method may correspond to a method of splitting the first coding unit 1100, based on the split shape mode information.

For example, the image decoding apparatus 100 may determine square third coding units 1112a and 1112b by splitting the left second coding unit 1110a in a horizontal direction, and may determine square third coding units 1114a and 1114b by splitting the right second coding unit 1110b in a horizontal direction. Furthermore, the image decoding apparatus 100 may determine square third coding units 1116a, 1116b, 1116c, and 1116d by splitting both of the left and right second coding units 1110a and 1110b in a horizontal direction. In this case, coding units having the same shape as the four square second coding units 1130a, 1130b, 1130c, and 1130d split from the first coding unit 1100 may be determined.

As another example, the image decoding apparatus 100 may determine square third coding units 1122a and 1122b by splitting the upper second coding unit 1120a in a vertical direction, and may determine square third coding units 1124a and 1124b by splitting the lower second coding unit 1120b in a vertical direction. Furthermore, the image decoding apparatus 100 may determine square third coding units 1126a, 1126b, 1126c, and 1126d by splitting both of the upper and lower second coding units 1120a and 1120b in a vertical direction. In this case, coding units having the same shape as the four square second coding units 1130a, 1130b, 1130c, and 1130d split from the first coding unit 1100 may be determined.

Figure 12:
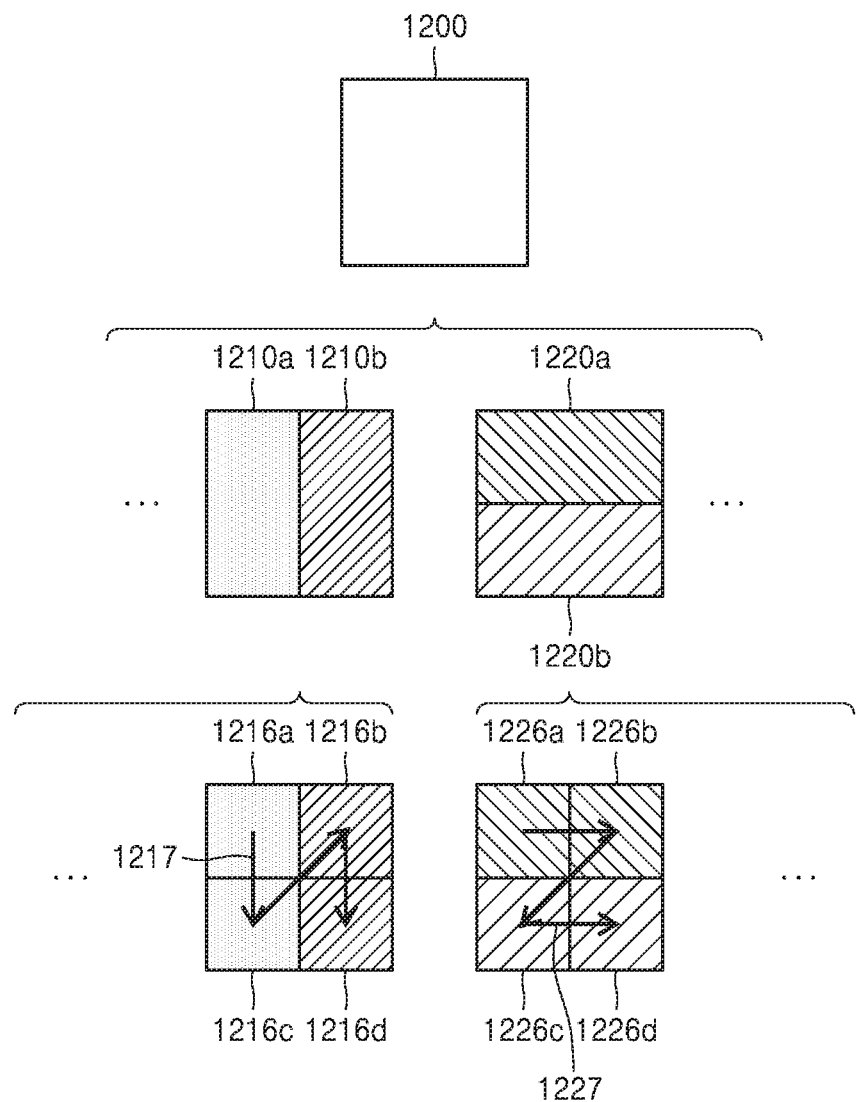
FIG. 12 illustrates that a processing order between a plurality of coding units may be changed depending on a process of splitting a coding unit, according to an embodiment.

FIG. 12 illustrates that a processing order between a plurality of coding units may be changed depending on a process of splitting a coding unit, according to an embodiment.

According to an embodiment, the image decoding apparatus 100 may split a first coding unit 1200, based on split shape mode information. When a block shape is a square shape and the split shape mode information indicates to split the first coding unit 1200 in at least one of horizontal and vertical directions, the image decoding apparatus 100 may determine second coding units 1210a, 1210b, 1220a, 1220b, etc. by splitting the first coding unit 1200. Referring to FIG. 12, the non-square second coding units 1210a, 1210b, 1220a, and 1220b determined by splitting the first coding unit 1200 in only a horizontal direction or vertical direction may be independently split based on the split shape mode information of each coding unit. For example, the image decoding apparatus 100 may determine third coding units 1216a, 1216b, 1216c, and 1216d by splitting the second coding units 1210a and 1210b, which are generated by splitting the first coding unit 1200 in a vertical direction, in a horizontal direction, and may determine third coding units 1226a, 1226b, 1226c, and 1226d by splitting the second coding units 1220a and 1220b, which are generated by splitting the first coding unit 1200 in a horizontal direction, in a vertical direction. An operation of splitting the second coding units 1210a, 1210b, 1220a, and 1220b has been described above in relation to FIG. 11, and thus detailed descriptions thereof will not be provided herein.

According to an embodiment, the image decoding apparatus 100 may process coding units in a predetermined order. An operation of processing coding units in a predetermined order has been described above in relation to FIG. 7, and thus detailed descriptions thereof will not be provided herein. Referring to FIG. 12, the image decoding apparatus 100 may determine four square third coding units 1216a, 1216b, 1216c, and 1216d, and 1226a, 1226b, 1226c, and 1226d by splitting the square first coding unit 1200. According to an embodiment, the image decoding apparatus 100 may determine processing orders of the third coding units 1216a, 1216b, 1216c, and 1216d, and 1226a, 1226b, 1226c, and 1226d based on a splitting method of the first coding unit 1200.

According to an embodiment, the image decoding apparatus 100 may determine the third coding units 1216a, 1216b, 1216c, and 1216d by splitting the second coding units 1210a and 1210b generated by splitting the first coding unit 1200 in a vertical direction, in a horizontal direction, and may process the third coding units 1216a, 1216b, 1216c, and 1216d in a processing order 1217 for initially processing the third coding units 1216a and 1216c, which are included in the left second coding unit 1210a, in a vertical direction, and then processing the third coding unit 1216b and 1216d, which are included in the right second coding unit 1210b, in a vertical direction.

According to an embodiment, the image decoding apparatus 100 may determine the third coding units 1226a, 1226b, 1226c, and 1226d by splitting the second coding units 1220a and 1220b generated by splitting the first coding unit 1200 in a horizontal direction, in a vertical direction, and may process the third coding units 1226a, 1226b, 1226c, and 1226d in a processing order 1227 for initially processing the third coding units 1226a and 1226b, which are included in the upper second coding unit 1220a, in a horizontal direction, and then processing the third coding unit 1226c and 1226d, which are included in the lower second coding unit 1220b, in a horizontal direction.

Referring to FIG. 12, the square third coding units 1216a, 1216b, 1216c, and 1216d, and 1226a, 1226b, 1226c, and 1226d may be determined by splitting the second coding units 1210a, 1210b, 1220a, and 1220b, respectively. Although the second coding units 1210a and 1210b are determined by splitting the first coding unit 1200 in a vertical direction differently from the second coding units 1220a and 1220b which are determined by splitting the first coding unit 1200 in a horizontal direction, the third coding units 1216a, 1216b, 1216c, and 1216d, and 1226a, 1226b, 1226c, and 1226d split therefrom eventually show same-shaped coding units split from the first coding unit 1200. As such, by recursively splitting a coding unit in different manners based on the split shape mode information, the image decoding apparatus 100 may process a plurality of coding units in different orders even when the coding units are eventually determined to be the same shape.

FIG. 13 illustrates a process of determining a depth of a coding unit as a shape and size of the coding unit change, when the coding unit is recursively split such that a plurality of coding units are determined, according to an embodiment.

According to an embodiment, the image decoding apparatus 100 may determine the depth of the coding unit, based on a predetermined criterion. For example, the predetermined criterion may be the length of a long side of the coding unit. When the length of a long side of a coding unit before being split is 2n times (n>0) the length of a long side of a split current coding unit, the image decoding apparatus 100 may determine that a depth of the current coding unit is increased from a depth of the coding unit before being split, by n. In the following description, a coding unit having an increased depth is expressed as a coding unit of a deeper depth.

Referring to FIG. 13, according to an embodiment, the image decoding apparatus 100 may determine a second coding unit 1302 and a third coding unit 1304 of deeper depths by splitting a square first coding unit 1300 based on block shape information indicating a square shape (for example, the block shape information may be expressed as '0: SQUARE'). Assuming that the size of the square first coding unit 1300 is 2N×2N, the second coding unit 1302 determined by dividing a width and height of the first coding unit 1300 to ½ may have a size of N×N. Furthermore, the third coding unit 1304 determined by dividing a width and height of the second coding unit 1302 to ½ may have a size of N/2×N/2. In this case, a width and height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment, the image decoding apparatus 100 may determine a second coding unit 1312 or 1322 and a third coding unit 1314 or 1324 of deeper depths by splitting a non-square first coding unit 1310 or 1320 based on block shape information indicating a non-square shape (for example, the block shape information may be expressed as '1: NS_VER' indicating a non-square shape, a height of which is longer than a width, or as '2: NS_HOR' indicating a non-square shape, a width of which is longer than a height).

The image decoding apparatus 100 may determine a second coding unit 1302, 1312, or 1322 by dividing at least one of a width and height of the first coding unit 1310 having a size of N×2N. That is, the image decoding apparatus 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment, the image decoding apparatus 100 may determine the second coding unit 1302, 1312, or 1322 by dividing at least one of a width and height of the first coding unit 1320 having a size of 2N×N. That is, the image decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment, the image decoding apparatus 100 may determine a third coding unit 1304, 1314, or 1324 by dividing at least one of a width and height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the image decoding apparatus 100 may determine the third coding unit 1304, 1314, or 1324 by dividing at least one of a width and height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the image decoding apparatus 100 may determine the third coding unit 1304, 1314, or 1324 by dividing at least one of a width and height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the image decoding apparatus 100 may split the square coding unit 1300, 1302, or 1304 in a horizontal or vertical direction. For example, the image decoding apparatus 100 may determine the first coding unit 1310 having a size of N×2N by splitting the first coding unit 1300 having a size of 2N×2N, in a vertical direction, or may determine the first coding unit 1320 having a size of 2N×N by splitting the first coding unit 1300, in a horizontal direction. According to an embodiment, when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to an embodiment, a width and height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

Figure 14:
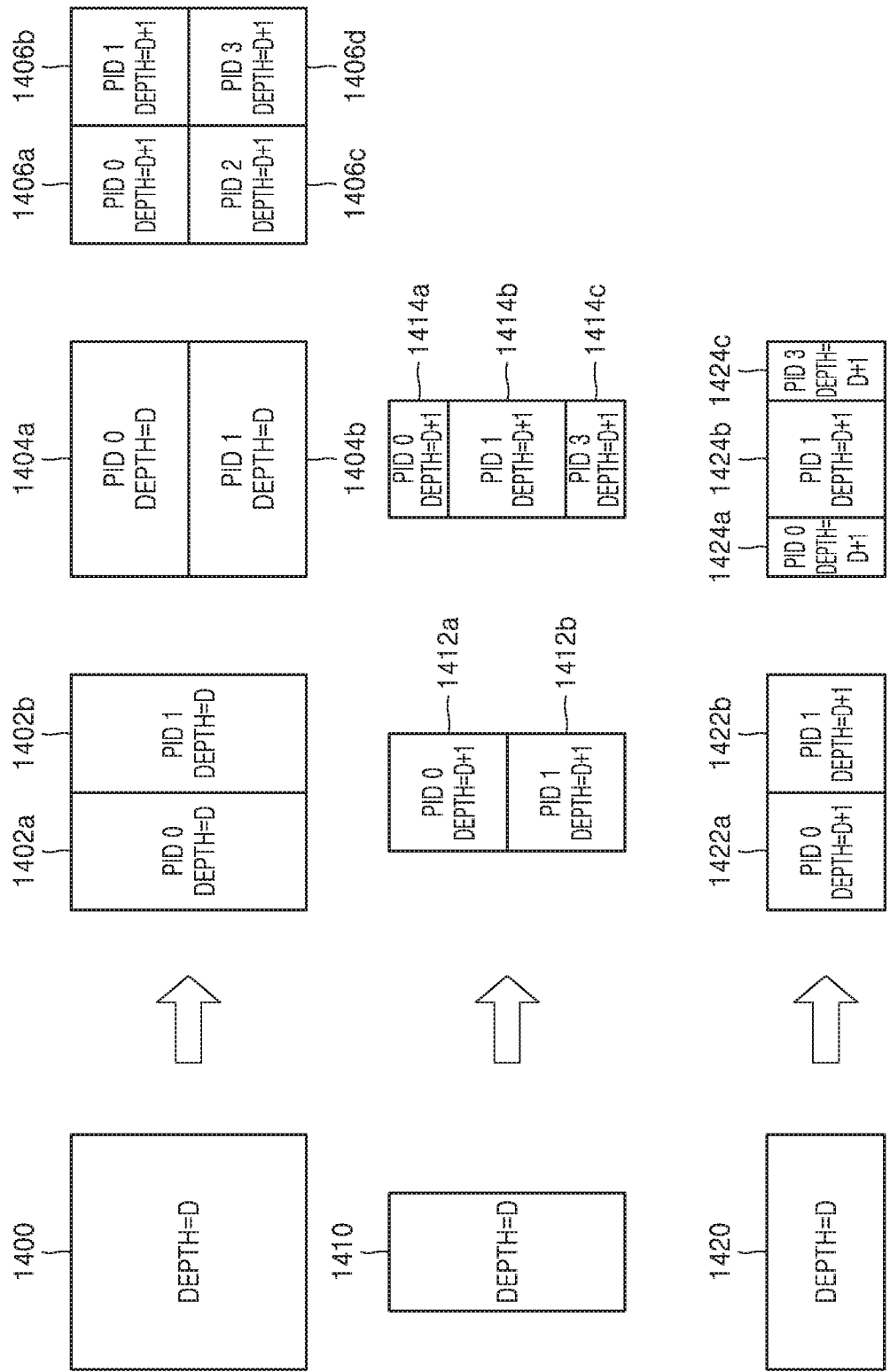
FIG. 14 illustrates depths that are determinable based on shapes and sizes of coding units, and part indexes (PIDs) that are for distinguishing the coding units, according to an embodiment.

FIG. 14 illustrates depths that are determinable based on shapes and sizes of coding units, and part indexes (PIDs) that are for distinguishing the coding units, according to an embodiment.

According to an embodiment, the image decoding apparatus 100 may determine various-shaped second coding units by splitting a square first coding unit 1400. Referring to FIG. 14, the image decoding apparatus 100 may determine second coding units 1402a and 1402b, 1404a and 1404b, and 1406a, 1406b, 1406c, and 1406d by splitting the first coding unit 1400 in at least one of vertical and horizontal directions based on split shape mode information. That is, the image decoding apparatus 100 may determine the second coding units 1402a and 1402b, 1404a and 1404b, and 1406a, 1406b, 1406c, and 1406d, based on the split shape mode information of the first coding unit 1400.

According to an embodiment, a depth of the second coding units 1402a and 1402b, 1404a and 1404b, and 1406a, 1406b, 1406c, and 1406d, which are determined based on the split shape mode information of the square first coding unit 1400, may be determined based on the length of a long side thereof. For example, because the length of a side of the square first coding unit 1400 equals the length of a long side of the non-square second coding units 1402a and 1402b, and 1404a and 1404b, the first coding unit 1400 and the non-square second coding units 1402a and 1402b, and 1404a and 1404b may have the same depth, e.g., D. However, when the image decoding apparatus 100 splits the first coding unit 1400 into the four square second coding units 1406a, 1406b, 1406c, and 1406d based on the split shape mode information, because the length of a side of the square second coding units 1406a, 1406b, 1406c, and 1406d is ½ times the length of a side of the first coding unit 1400, a depth of the second coding units 1406a, 1406b, 1406c, and 1406d may be D+1 which is deeper than the depth D of the first coding unit 1400 by 1.

According to an embodiment, the image decoding apparatus 100 may determine a plurality of second coding units 1412a and 1412b, and 1414a, 1414b, and 1414c by splitting a first coding unit 1410, a height of which is longer than a width, in a horizontal direction based on the split shape mode information. According to an embodiment, the image decoding apparatus 100 may determine a plurality of second coding units 1422a and 1422b, and 1424a, 1424b, and 1424c by splitting a first coding unit 1420, a width of which is longer than a height, in a vertical direction based on the split shape mode information.

According to an embodiment, a depth of the second coding units 1412a and 1412b, 1414a, 1414b, and 1414c, 1422a, 1422b, 1424a, 1424b, and 1424c, which are determined based on the split shape mode information of the non-square first coding unit 1410 or 1420, may be determined based on the length of a long side thereof. For example, because the length of a side of the square second coding units 1412a and 1412b is ½ times the length of a long side of the first coding unit 1410 having a non-square shape, a height of which is longer than a width, a depth of the square second coding units 1412a and 1412b is D+1 which is deeper than the depth D of the non-square first coding unit 1410 by 1.

Furthermore, the image decoding apparatus 100 may split the non-square first coding unit 1410 into an odd number of second coding units 1414a, 1414b, and 1414c based on the split shape mode information. The odd number of second coding units 1414a, 1414b, and 1414c may include the non-square second coding units 1414a and 1414c and the square second coding unit 1414b. In this case, because the length of a long side of the non-square second coding units 1414a and 1414c and the length of a side of the square second coding unit 1414b are ½ times the length of a long side of the first coding unit 1410, a depth of the second coding units 1414a, 1414b, and 1414c may be D+1 which is deeper than the depth D of the non-square first coding unit 1410 by 1. The image decoding apparatus 100 may determine depths of coding units split from the first coding unit 1420 having a non-square shape, a width of which is longer than a height, by using the above-described method of determining depths of coding units split from the first coding unit 1410.

According to an embodiment, the image decoding apparatus 100 may determine PIDs for identifying split coding units, based on a size ratio between the coding units when an odd number of split coding units do not have equal sizes. Referring to FIG. 14, a coding unit 1414b of a center location among an odd number of split coding units 1414a, 1414b, and 1414c may have a width equal to that of the other coding units 1414a and 1414c and a height which is two times that of the other coding units 1414a and 1414c. That is, in this case, the coding unit 1414b at the center location may include two of the other coding unit 1414a or 1414c. Therefore, when a PID of the coding unit 1414b at the center location is 1 based on a scan order, a PID of the coding unit 1414c located next to the coding unit 1414b may be increased by 2 and thus may be 3. That is, discontinuity in PID values may be present. According to an embodiment, the image decoding apparatus 100 may determine whether an odd number of split coding units do not have equal sizes, based on whether discontinuity is present in PIDs for identifying the split coding units.

According to an embodiment, the image decoding apparatus 100 may determine whether to use a specific splitting method, based on PID values for identifying a plurality of coding units determined by splitting a current coding unit. Referring to FIG. 14, the image decoding apparatus 100 may determine an even number of coding units 1412a and 1412b or an odd number of coding units 1414a, 1414b, and 1414c by splitting the first coding unit 1410 having a rectangular shape, a height of which is longer than a width. The image decoding apparatus 100 may use PIDs to identify respective coding units. According to an embodiment, the PID may be obtained from a sample of a predetermined location of each coding unit (e.g., a top left sample).

According to an embodiment, the image decoding apparatus 100 may determine a coding unit at a predetermined location from among the split coding units, by using the PIDs for distinguishing the coding units. According to an embodiment, when the split shape mode information of the first coding unit 1410 having a rectangular shape, a height of which is longer than a width, indicates to split a coding unit into three coding units, the image decoding apparatus 100 may split the first coding unit 1410 into three coding units 1414*a*, 1414*b*, and 1414*c*. The image decoding apparatus 100 may assign a PID to each of the three coding units 1414*a*, 1414*b*, and 1414*c*. The image decoding apparatus 100 may compare PIDs of an odd number of split coding units to determine a coding unit at a center location from among the coding units. The image decoding apparatus 100 may determine the coding unit 1414*b* having a PID corresponding to a middle value among the PIDs of the coding units, as the coding unit at the center location from among the coding units determined by splitting the first coding unit 1410. According to an embodiment, the image decoding apparatus 100 may determine PIDs for distinguishing split coding units, based on a size ratio between the coding units when the split coding units do not have equal sizes. Referring to FIG. 14, the coding unit 1414*b* generated by splitting the first coding unit 1410 may have a width equal to that of the other coding units 1414*a* and 1414*c* and a height which is two times that of the other coding units 1414*a* and 1414*c*. In this case, when the PID of the coding unit 1414*b* at the center location is 1, the PID of the coding unit 1414*c* located next to the coding unit 1414*b* may be increased by 2 and thus may be 3. When the PID is not uniformly increased as described above, the image decoding apparatus 100 may determine that a coding unit is split into a plurality of coding units including a coding unit having a size different from that of the other coding units. According to an embodiment, when the split shape mode information indicates to split a coding unit into an odd number of coding units, the image decoding apparatus 100 may split a current coding unit in such a manner that a coding unit of a predetermined location among an odd number of coding units (e.g., a coding unit of a centre location) has a size different from that of the other coding units. In this case, the image decoding apparatus 100 may determine the coding unit of the centre location, which has a different size, by using PIDs of the coding units. However, the PIDs and the size or location of the coding unit of the predetermined location are not limited to the above-described examples, and various PIDs and various locations and sizes of coding units may be used.

According to an embodiment, the image decoding apparatus 100 may use a predetermined data unit where a coding unit starts to be recursively split.

Figure 15:
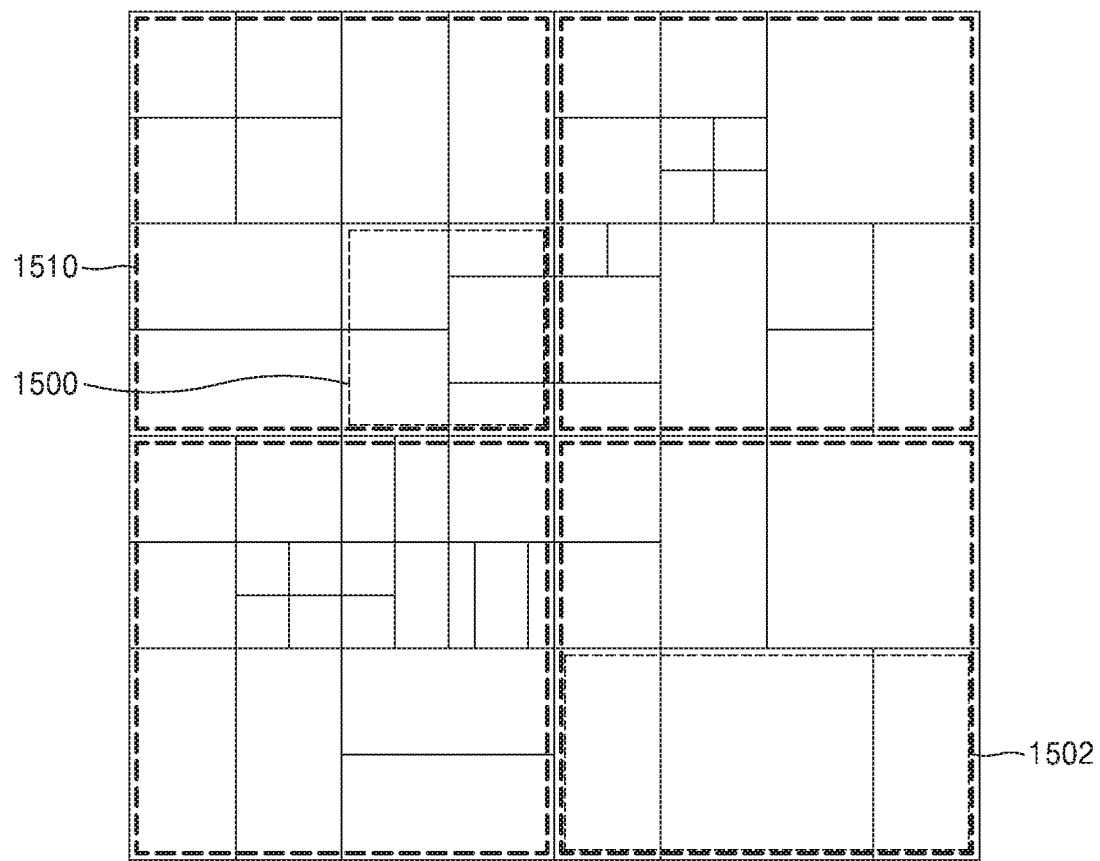
FIG. 15 illustrates that a plurality of coding units are determined based on a plurality of predetermined data units included in a picture, according to an embodiment.

FIG. 15 illustrates that a plurality of coding units are determined based on a plurality of predetermined data units included in a picture, according to an embodiment.

According to an embodiment, a predetermined data unit may be defined as a data unit where a coding unit starts to be recursively split by using split shape mode information. That is, the predetermined data unit may correspond to a coding unit of an uppermost depth, which is used to determine a plurality of coding units split from a current picture. In the following descriptions, for convenience of explanation, the predetermined data unit is referred to as a reference data unit.

According to an embodiment, the reference data unit may have a predetermined size and a predetermined size shape.

According to an embodiment, a reference coding unit may include M×N samples. Herein, M and N may be equal to each other, and may be integers expressed as powers of 2. That is, the reference data unit may have a square or non-square shape, and may be split into an integer number of coding units.

According to an embodiment, the image decoding apparatus 100 may split the current picture into a plurality of reference data units. According to an embodiment, the image decoding apparatus 100 may split the plurality of reference data units, which are split from the current picture, by using split shape mode information about each reference data unit. The operation of splitting the reference data unit may correspond to a splitting operation using a quadtree structure.

According to an embodiment, the image decoding apparatus 100 may previously determine the minimum size allowed for the reference data units included in the current picture. Accordingly, the image decoding apparatus 100 may determine various reference data units having sizes equal to or greater than the minimum size, and may determine one or more coding units by using the split shape mode information with reference to the determined reference data unit.

Referring to FIG. 15, the image decoding apparatus 100 may use a square reference coding unit 1500 or a non-square reference coding unit 1502. According to an embodiment, the shape and size of reference coding units may be determined based on various data units capable of including one or more reference coding units (e.g., sequences, pictures, slices, slice segments, coding tree units, or the like).

According to an embodiment, the receiver (not shown) of the image decoding apparatus 100 may obtain, from a bitstream, at least one of reference coding unit shape information and reference coding unit size information with respect to each of the various data units. An operation of splitting the square reference coding unit 1500 into one or more coding units has been described above in relation to the operation of splitting the current coding unit 300 of FIG. 3, and an operation of splitting the non-square reference coding unit 1502 into one or more coding units has been described above in relation to the operation of splitting the current coding unit 400 or 450 of FIG. 4. Thus, detailed descriptions thereof will not be provided herein.

According to an embodiment, the image decoding apparatus 100 may use a PID for identifying the size and shape of reference coding units, to determine the size and shape of reference coding units according to some data units previously determined based on a predetermined condition. That is, the receiver (not shown) may obtain, from the bitstream, only the PID for identifying the size and shape of reference coding units with respect to each slice, slice segment, or coding tree unit which is a data unit satisfying a predetermined condition (e.g., a data unit having a size equal to or smaller than a slice) among the various data units (e.g., sequences, pictures, slices, slice segments, coding tree units, or the like). The image decoding apparatus 100 may determine the size and shape of reference data units with respect to each data unit, which satisfies the predetermined condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image decoding apparatus 100 may determine at least one of the size and shape of reference coding units included in a data unit serving as a unit for obtaining the PID, by selecting the previously determined at least one of the size and shape of reference coding units based on the PID.

According to an embodiment, the image decoding apparatus 100 may use one or more reference coding units included in a coding tree unit. That is, a coding tree unit split from a picture may include one or more reference coding units, and coding units may be determined by recursively splitting each reference coding unit. According to an embodiment, at least one of a width and height of the coding tree unit may be integer times at least one of the width and height of the reference coding units. According to an embodiment, the size of reference coding units may be obtained by splitting the coding tree unit n times based on a quadtree structure. That is, the image decoding apparatus 100 may determine the reference coding units by splitting the coding tree unit n times based on a quadtree structure, and may split the reference coding unit based on at least one of the block shape information and the split shape mode information according to various embodiments.

Figure 16:
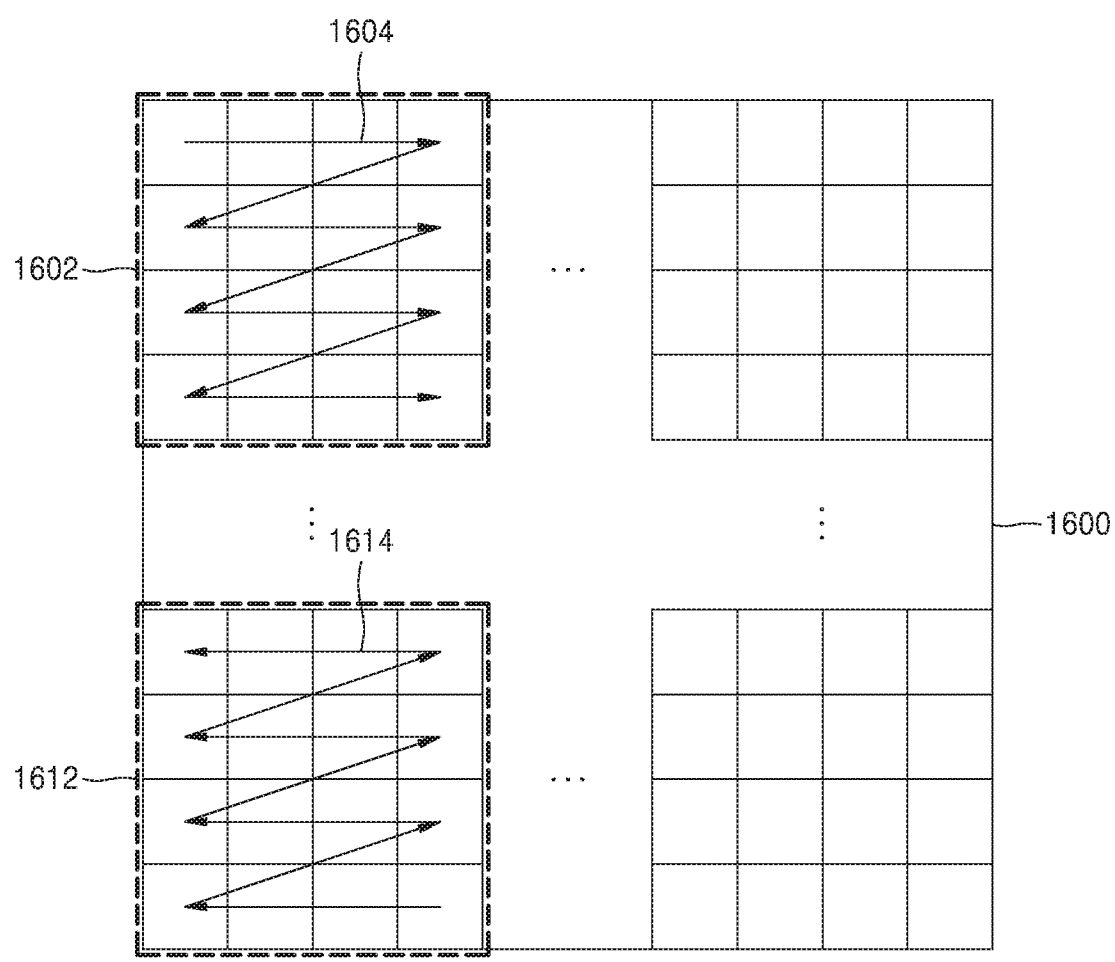
FIG. 16 illustrates a processing block serving as a unit for determining a determination order of reference coding units included in a picture, according to an embodiment.

FIG. 16 illustrates a processing block serving as a unit for determining a determination order of reference coding units included in a picture 1600, according to an embodiment.

According to an embodiment, the image decoding apparatus 100 may determine one or more processing blocks split from a picture. The processing block is a data unit including one or more reference coding units split from a picture, and the one or more reference coding units included in the processing block may be determined according to a specific order. That is, a determination order of one or more reference coding units determined in each processing block may correspond to one of various types of orders for determining reference coding units, and may vary depending on the processing block. The determination order of reference coding units, which is determined with respect to each processing block, may be one of various orders, e.g., raster scan order, Z-scan, N-scan, up-right diagonal scan, horizontal scan, and vertical scan, but is not limited to the above-mentioned scan orders.

According to an embodiment, the image decoding apparatus 100 may obtain processing block size information and may determine the size of one or more processing blocks included in the picture. The image decoding apparatus 100 may obtain the processing block size information from a bitstream and may determine the size of one or more processing blocks included in the picture. The size of processing blocks may be a predetermined size of data units, which is indicated by the processing block size information.

According to an embodiment, the receiver (not shown) of the image decoding apparatus 100 may obtain the processing block size information from the bitstream according to each specific data unit. For example, the processing block size information may be obtained from the bitstream in a data unit such as an image, sequence, picture, slice, or slice segment. That is, the receiver (not shown) may obtain the processing block size information from the bitstream according to each of the various data units, and the image decoding apparatus 100 may determine the size of one or more processing blocks, which are split from the picture, by using the obtained processing block size information. The size of the processing blocks may be integer times that of the reference coding units.

According to an embodiment, the image decoding apparatus 100 may determine the size of processing blocks 1602 and 1612 included in the picture 1600. For example, the image decoding apparatus 100 may determine the size of processing blocks based on the processing block size information obtained from the bitstream. Referring to FIG. 16, according to an embodiment, the image decoding apparatus 100 may determine a width of the processing blocks 1602 and 1612 to be four times the width of the reference coding units, and may determine a height of the processing blocks 1602 and 1612 to be four times the height of the reference coding units. The image decoding apparatus 100 may determine a determination order of one or more reference coding units in one or more processing blocks.

According to an embodiment, the image decoding apparatus 100 may determine the processing blocks 1602 and 1612, which are included in the picture 1600, based on the size of processing blocks, and may determine a determination order of one or more reference coding units in the processing blocks 1602 and 1612. According to an embodiment, determination of reference coding units may include determination of the size of the reference coding units.

According to an embodiment, the image decoding apparatus 100 may obtain, from the bitstream, determination order information of one or more reference coding units included in one or more processing blocks, and may determine a determination order with respect to one or more reference coding units based on the obtained determination order information. The determination order information may be defined as an order or direction for determining the reference coding units in the processing block. That is, the determination order of reference coding units may be independently determined with respect to each processing block.

According to an embodiment, the image decoding apparatus 100 may obtain, from the bitstream, the determination order information of reference coding units according to each specific data unit. For example, the receiver (not shown) may obtain the determination order information of reference coding units from the bitstream according to each data unit such as an image, sequence, picture, slice, slice segment, or processing block. Because the determination order information of reference coding units indicates an order for determining reference coding units in a processing block, the determination order information may be obtained with respect to each specific data unit including an integer number of processing blocks.

According to an embodiment, the image decoding apparatus 100 may determine one or more reference coding units based on the determined determination order.

According to an embodiment, the receiver (not shown) may obtain the determination order information of reference coding units from the bitstream as information related to the processing blocks 1602 and 1612, and the image decoding apparatus 100 may determine a determination order of one or more reference coding units included in the processing blocks 1602 and 1612 and determine one or more reference coding units, which are included in the picture 1600, based on the determination order. Referring to FIG. 16, the image decoding apparatus 100 may determine determination orders 1604 and 1614 of one or more reference coding units in the processing blocks 1602 and 1612, respectively. For example, when the determination order information of reference coding units is obtained with respect to each processing block, different types of the determination order information of reference coding units may be obtained for the processing blocks 1602 and 1612. When the determination order 1604 of reference coding units in the processing block 1602 is a raster scan order, reference coding units included in the processing block 1602 may be determined according to a raster scan order. On the contrary, when the determination order 1614 of reference coding units in the other processing block 1612 is a backward raster scan order, reference coding units included in the processing block 1612 may be determined according to the backward raster scan order.

According to an embodiment, the image decoding apparatus 100 may decode the determined one or more reference coding units. The image decoding apparatus 100 may decode an image, based on the reference coding units determined as described above. A method of decoding the reference coding units may include various image decoding methods.

According to an embodiment, the image decoding apparatus 100 may obtain block shape information indicating the shape of a current coding unit or split shape mode information indicating a splitting method of the current coding unit, from the bitstream, and may use the obtained information. The split shape mode information may be included in the bitstream related to various data units. For example, the image decoding apparatus 100 may use the block shape information or the split shape mode information included in a sequence parameter set, a picture parameter set, a video parameter set, a slice header, or a slice segment header. Furthermore, the image decoding apparatus 100 may obtain, from the bitstream, a syntax element corresponding to the block shape information or the split shape mode information according to each coding tree unit, each reference coding unit, or each processing block, and may use the obtained syntax element.

Hereinafter, a method of determining a splitting rule according to an embodiment of the present disclosure will be described in detail.

The image decoding apparatus 100 may determine a splitting rule for images. The splitting rule may be previously determined between the image decoding apparatus 100 and the image encoding apparatus 150. The image decoding apparatus 100 may determine a splitting rule of images based on information obtained from a bitstream. The image decoding apparatus 100 may determine a splitting rule based on information obtained from at least one of a sequence parameter set, a picture parameter set, a video parameter set, a slice header, or a slice segment header. The image decoding apparatus 100 may determine different splitting rules according to a frame, a slice, a temporal layer, a coding tree unit or a coding unit.

The image decoding apparatus 100 may determine a splitting rule based on a block shape of a coding unit. The block shape may include a size, shape, a ratio between a width and a height, and a direction of a coding unit. The image encoding apparatus 150 and the image decoding apparatus 100 may previously determine to determine a splitting rule based on a block shape of a coding unit. However, the disclosure is not limited thereto. The image decoding apparatus 100 may determine a splitting rule based on information obtained from a bitstream received from the image encoding apparatus 150.

A shape of a coding unit may include a square and a non-square. When a width and a height of a coding unit have an equal length, the image decoding apparatus 100 may determine a shape of the coding unit to be a square. In addition, when lengths of a width and a height of a coding unit are not equal, the image decoding apparatus 100 may determine a shape of the coding unit to be a non-square.

A size of a coding unit may include various sizes such as 4×4, 8×4, 4×8, 8×8, 16×4, 16×8, . . . , 256×256. The size of the coding unit may be classified according to the length of the long side, the length or the width of the short side of the coding unit. The image decoding apparatus 100 may apply the same splitting rule to coding units classified into the same group. For example, the image decoding apparatus 100 may classify coding units having the same long side length into the same size. Also, the image decoding apparatus 100 may apply the same splitting rule to coding units having the same long side length.

The ratio of the width and height of a coding unit may include 1:2, 2:1, 1:4, 4:1, 1:8, 8:1, 1:16, or 16:1. In addition, a direction of a coding unit may include a horizontal direction and a vertical direction. A horizontal direction may represent a case where a length of a width of a coding unit is longer than a length of a height thereof. A vertical direction may represent a case where a length of a width of a coding unit is shorter than a length of a height thereof.

The image decoding apparatus 100 may adaptively determine a splitting rule based on a size of a coding unit. The image decoding apparatus 100 may differently determine an allowable splitting shape mode based on a size of a coding unit. For example, the image decoding apparatus 100 may determine whether splitting is allowed based on a size of a coding unit. The image decoding apparatus 100 may determine a split direction according to a size of a coding unit. The image decoding apparatus 100 may determine an allowable split type according to a size of a coding unit.

The determination of the splitting rule based on the size of the coding unit may be a splitting rule that is previously determined between the image encoding apparatus 150 and the image decoding apparatus 100 Also, the image decoding apparatus 100 may determine a splitting rule based on information obtained from a bitstream.

The image decoding apparatus 100 may adaptively determine a splitting rule based on a position of a coding unit. The image decoding apparatus 100 may adaptively determine a splitting rule based on a position of a coding unit in an image.

In addition, the image decoding apparatus 100 may determine a splitting rule such that coding units generated by different splitting paths do not have the same block shape. However, the disclosure is not limited thereto, and coding units generated by different splitting paths may also have the same block shape. Coding units generated by different splitting paths may have different decoding processing orders. As the decoding processing orders have been described with reference to FIG. 12, detailed description thereof will be omitted.

Hereinafter, with reference to FIGS. 17 through 29, an image encoding/decoding method and apparatus for determining a filtering reference sample to be filtered and a weight of a filter and adaptively performing intra prediction based on the filtering reference sample and the weight of the filter will be described in detail.

Figure 17:
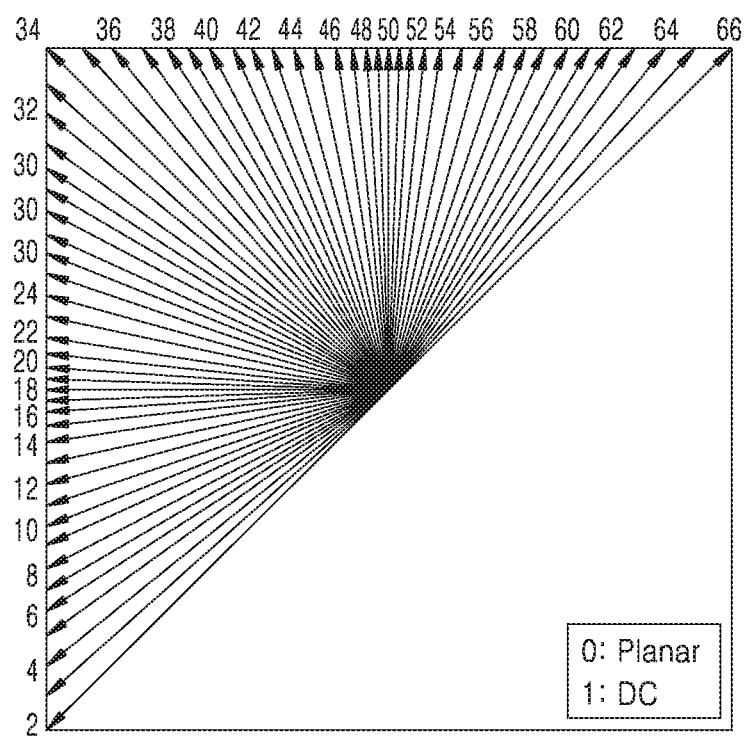
FIG. 17 is a diagram for describing intra prediction modes according to an embodiment.

FIG. 17 is a diagram for describing intra prediction modes according to an embodiment.

Referring to FIG. 17, intra prediction modes according to an embodiment may include a planar mode (mode No. 0), a DC mode (mode No. 1). In addition, the intra prediction modes may include angular modes having a prediction direction (modes Nos. 2 to 66). The angular modes may include a diagonal mode (mode No. 2 or 66), a horizontal mode (mode No. 18), and a vertical mode (mode No. 50).

While intra prediction modes according to an embodiment are described with reference to FIG. 17, the disclosure is not limited thereto, various forms of intra prediction modes may be provided by adding a new intra prediction mode or removing a previous intra prediction mode, and the mode number of each intra prediction mode may vary as is obvious to one of ordinary skill in the art.

Figure 18:
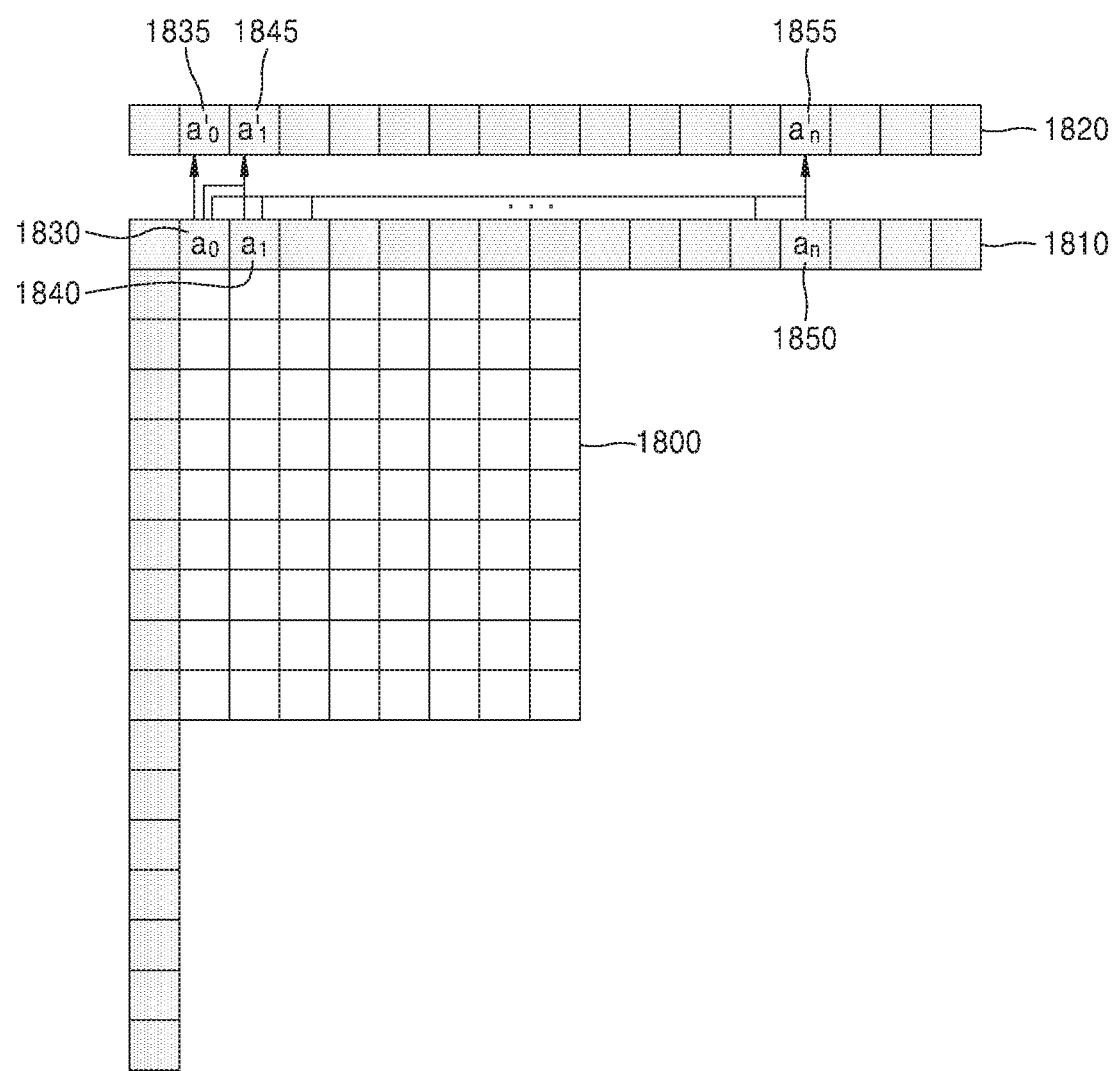
FIG. 18 is a diagram for describing a method, performed by an image decoding apparatus, of generating a sample reconstructed using original reference samples, according to an embodiment of the present disclosure.

FIG. 18 is a diagram for describing a method, performed by an image decoding apparatus, of generating a sample reconstructed using original reference samples, according to an embodiment of the present disclosure.

Referring to FIG. 18, to perform intra prediction on a current block 1800, the image decoding apparatus 100 may generate samples 1820 reconstructed using original reference samples 1810.

For example, the image decoding apparatus 100 may generate a reconstructed reference sample 1835 corresponding to a position of an original reference sample, by using an original reference sample 1830. The image decoding apparatus 100 may generate a reconstructed reference sample 1845 corresponding to a position of an original reference sample 1840 by using the original reference sample 1830 and the original reference sample 1840. In a similar manner to the above, the image decoding apparatus 100 may generate a reconstructed reference sample 1855 at a position corresponding to an original reference sample 1850. Here, a reconstructed reference sample 1855 may be generated using the original reference sample 1850 and original reference samples at the left side of the original reference sample 1850, from among the original reference samples 1810. That is, the image decoding apparatus 100 may generate a reconstructed reference sample $a'_n$ based on Equation 1 as below.

$$a'_n = \Sigma_{i=0}^{n} w_i a_i (\Sigma_{i=0}^{n} w_i = 1) \qquad \text{[Equation 1]}$$

Here, $a'_n$ may denote a reference sample that is away by n from a reconstructed reference sample that is at the leftmost side from among reconstructed reference samples of an upper adjacent line of a current block. $a_i$ may denote a reference sample that is away by i from an original reference sample that is at the leftmost side from among the original reference samples of the upper adjacent line. $W_i$ may denote a filter weight applied to a sample $a_i$.

A reconstructed reference sample may be generated by performing filtering on at least one original reference sample as described above.

Referring to FIG. 18, while an example of generating a reconstructed reference sample is described above, the disclosure is not limited thereto, and a reconstructed reference sample may be generated by performing filtering by using the same weight and a filter of the same number of filter tabs. For example, a reconstructed reference sample may be generated by performing filtering by using a [1, 4] filter.

Alternatively, the image decoding apparatus 100 may adaptively determine a weight of a filter and a number of filter tabs according to a position of an original reference sample or an intra prediction mode of a current block, and a reconstructed reference sample may be generated by performing filtering based on the weight of the filter and the number of filter tabs. Alternatively, a reconstructed reference sample may be generated by adaptively determining a weight of a filter and a number of filter tabs according to a size of a current block and performing filtering based on the weight of the filter and the number of filter tabs.

Figure 19A:
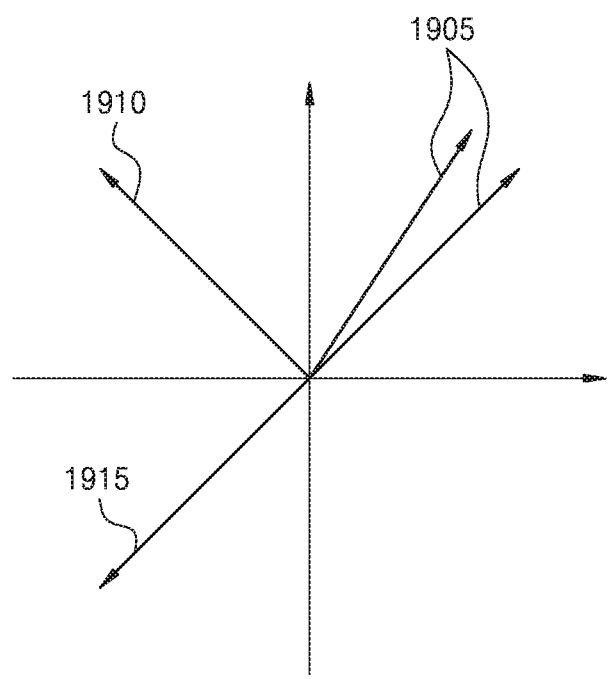
FIGS. 19A and 19B are diagrams for describing a method, performed by an image decoding apparatus, of generating a sample reconstructed using original reference samples in a prediction direction of an intra prediction mode of a current block, according to an embodiment of the present disclosure.
Figure 19B:
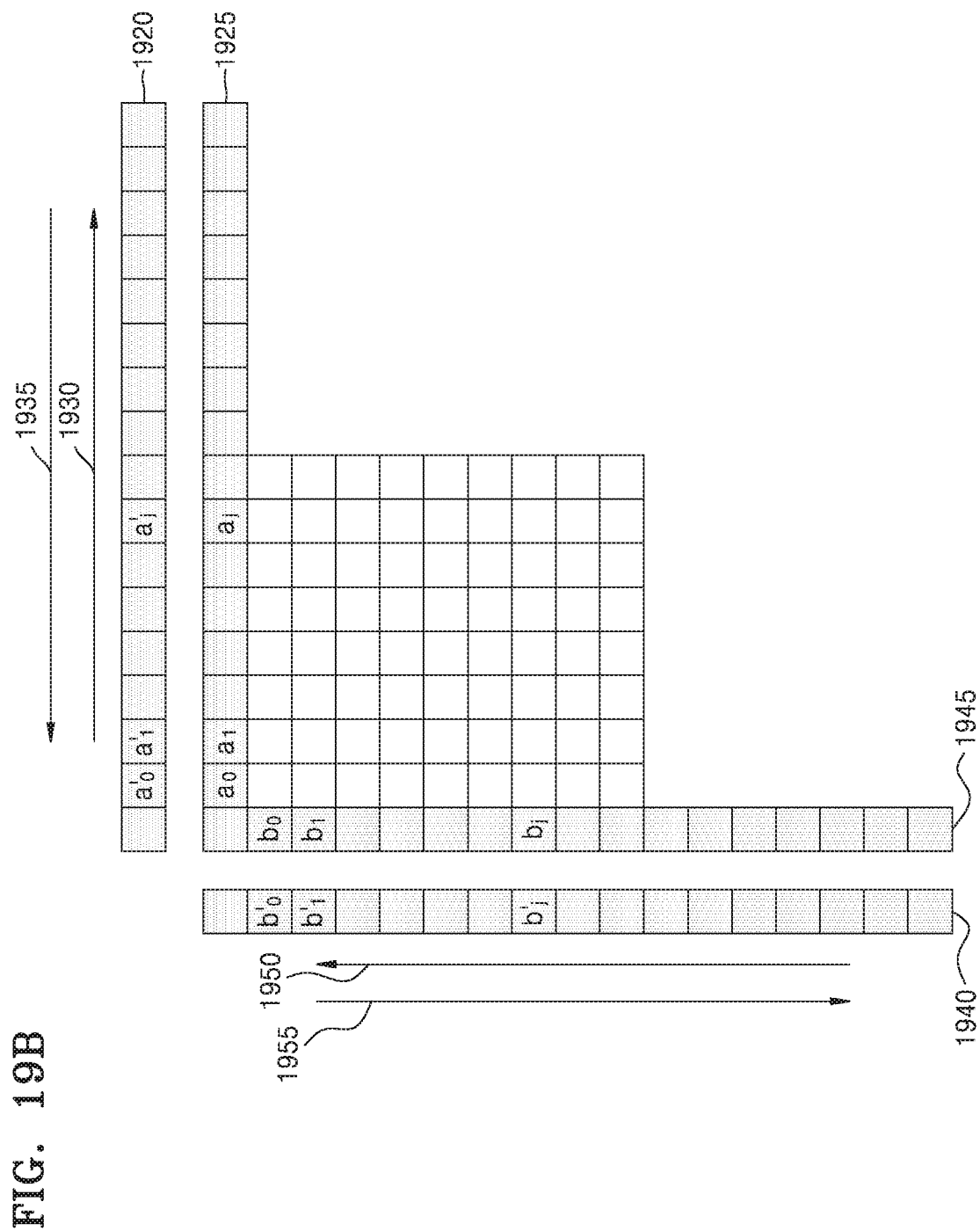

FIGS. 19A and 19B are diagrams for describing a method, performed by the image decoding apparatus 100, of generating a sample reconstructed using original reference samples in a prediction direction of an intra prediction mode of a current block, according to an embodiment of the present disclosure.

Referring to FIGS. 19A and 19B, when a direction of an intra prediction mode of a current block is a prediction direction 1905, the image decoding apparatus 100 may determine original reference samples 1925 of an upper adjacent line on which filtering is to be performed to generate reconstructed reference samples 1920 of the upper adjacent line, based on an x-axis direction 1930 of the prediction direction 1905. For example, when a direction of an intra prediction mode of a current block is the prediction direction 1905, the image decoding apparatus 100 may generate a reconstructed sample $a'_j$ according to Equation 2 as below.

$$a'_j = \Sigma_{i=0}^{j} w_i a_i (\Sigma_{i=0}^{j} w_i = 1) \qquad \text{[Equation 2]}$$

Here, $a'_j$ may denote a reference sample that is away by j from a reconstructed reference sample that is at the leftmost side from among the reconstructed reference samples of an upper adjacent line of a current block. $a_i$ may denote an original reference sample that is away by i from an original reference sample that is at the leftmost side from among the original reference samples of the upper adjacent line of the current block. $W_i$ may denote a filter weight applied to a sample $a_i$.

When a direction of an intra prediction mode of the current block is a prediction direction 1910, the image decoding apparatus 100 may determine the original reference samples 1925 of the upper adjacent line, on which filtering is to be performed to generate the reconstructed reference samples 1920 of the upper adjacent line, based on an x-axis direction 1935 of the prediction direction 1910. When a direction of the intra prediction mode of the current block is the prediction direction 1910, the image decoding apparatus 100 may generate a reconstructed sample $a'_j$ according to Equation 3 as below.

$$a'_j = \Sigma_{i=N}^{j} w_i a_i (\Sigma_{i=N}^{j} w_i = 1) \qquad \text{[Equation 3]}$$

Here, $a'_j$ may denote an original reference sample that is away by j from a reconstructed reference sample that is at the leftmost side from among the reconstructed reference samples of the upper adjacent line of the current block. $a_i$ may denote an original reference sample that is away by i from an original reference sample that is at the leftmost side from among the original reference samples of the upper adjacent line of the current block, and N may denote a distance of a sample that is farthest from a reconstructed reference sample located at the leftmost side.

When a direction of the intra prediction mode of the current block is a prediction direction 1915, the image decoding apparatus 100 may determine the original reference samples 1925 of the upper adjacent line, on which filtering is to be performed to generate the reconstructed reference samples 1920 of the upper adjacent line, based on the x-axis direction 1935 of the prediction direction 1915. When a direction of the intra prediction mode of the current block is the prediction direction 1915, the image decoding apparatus 100 may generate a reconstructed sample $a'_j$ according to Equation 4 as below.

$$a'_j = \Sigma_{i=N}^{j} w_i a_i (\Sigma_{i=N}^{j} w_i = 1) \qquad \text{[Equation 4]}$$

Here, $a'_j$ may denote an original reference sample that is away by j from a reconstructed reference sample that is at the leftmost side from among the reconstructed reference samples of the upper adjacent line the of a current block. $a_i$ may denote an original reference sample that is away by i from an original reference sample that is at the leftmost side from among the original reference samples of the upper adjacent line of the current block, and N may denote a distance of a sample that is farthest from a reconstructed reference sample located at the leftmost side.

The image decoding apparatus 100 may generate reconstructed reference samples of a left adjacent line in a similar manner to generating of the reconstructed reference samples of the upper adjacent line.

When a direction of the intra prediction mode of the current block is a prediction direction 1905, the image decoding apparatus 100 may determine original reference samples 1945 of the left adjacent line, on which filtering is to be performed to generate reconstructed reference samples 1940 of the left adjacent line, based on an y-axis direction 1950 of the prediction direction 1905.

When a direction of the intra prediction mode of the current block is the prediction direction 1910, the image decoding apparatus 100 may determine the original reference samples 1945 of the left adjacent line, on which filtering is to be performed to generate the reconstructed reference samples 1940 of the left adjacent line, based on the y-axis direction 1950 of the prediction direction 1910.

When a direction of the intra prediction mode of the current block is the prediction direction 1915, the image decoding apparatus 100 may determine the original reference samples 1945 of the left adjacent line, on which filtering is to be performed to generate the reconstructed reference samples 1940 of the left adjacent line, based on a y-axis direction 1955 of the prediction direction 1915.

Figure 20:
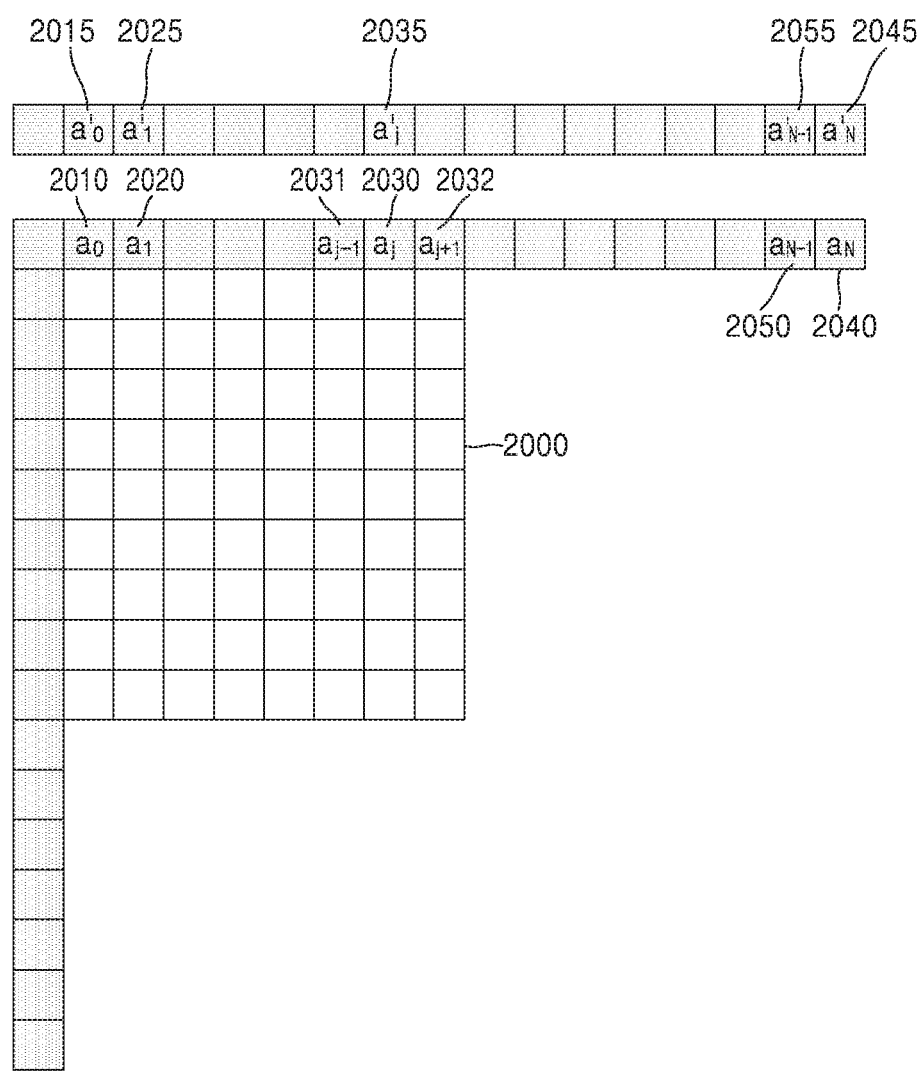
FIG. 20 is a diagram for describing a method, performed by an image decoding apparatus, of generating a sample reconstructed using original reference samples, according to an embodiment of the present disclosure.

FIG. 20 is a diagram for describing a method, performed by an image decoding apparatus, of generating a sample reconstructed using original reference samples, according to an embodiment of the present disclosure.

Referring to FIG. 20, to perform intra prediction on a current block 2000, the image decoding apparatus 100 may generate samples $a'_0, \ldots, a'_N$ reconstructed using original reference samples $a_0, \ldots, a_N$.

When a prediction direction of an intra prediction mode of the current block 2000 is from the left to the right (that is, when the prediction direction is a direction located in a first quadrant of FIG. 19A), the image decoding apparatus 100 may generate a reconstructed reference sample 2015 corresponding to a position of an original reference sample 2010 by using the original reference sample 2010. The image decoding apparatus 100 may generate a reconstructed reference sample 2025 corresponding to a position of an original reference sample 2020 by using the original reference sample 2010 and the original reference sample 2020. In a similar manner to the above, the image decoding apparatus 100 may generate a reconstructed reference sample 2035 at a position corresponding to an original reference sample 2030. Here, from among the original reference samples, the reconstructed reference sample 2035 may be generated using the original reference sample 2030 and an original reference sample 2031 immediately adjacent on the left thereof. That is, the image decoding apparatus 100 may generate a reconstructed reference sample $a'_j$ based on Equation 5 as below.

$$a_j' = \tfrac{1}{4}(a_{j-1} + 3a_j) \qquad \text{[Equation 5]}$$

Here, $a'_j$ may denote a reconstructed reference sample that is away by j from a reconstructed reference sample that is at the leftmost side from among the reconstructed reference samples of an upper adjacent line of a current block, and $a_j$ or $a_{j-1}$ may denote an original reference sample that is away by j or j−1 from an original reference sample that is at the leftmost side from among the original reference samples of the upper adjacent line of the current block.

When a prediction direction of an intra prediction mode of the current block 2000 is from the right to the left (that is, when the prediction direction is a direction located in a second quadrant or a third quadrant of FIG. 19A), the image decoding apparatus 100 may generate a reference sample 2045 corresponding to a position of an original reference sample 2040 by using the original reference sample 2040. The image decoding apparatus 100 may generate a reconstructed reference sample 2055 corresponding to a position of an original reference sample 2050 by using the original reference sample 2040 and the original reference sample 2050. In a similar manner to the above, the image decoding apparatus 100 may generate the reconstructed reference sample 2035 at a position corresponding to the original reference sample 2030. Here, from among the original reference samples, the reconstructed reference sample 2035 may be generated using the original reference sample 2030 and an original reference sample 2032 immediately adjacent on the right thereof. That is, the image decoding apparatus 100 may generate a reconstructed reference sample $a'_j$ based on Equation 6 as below.

$$a_j' = \tfrac{1}{4}(a_{j-1} + 3a_{j+1}) \qquad \text{[Equation 6]}$$

Here, $a'_j$ may denote a reconstructed reference sample that is away by j from a reconstructed reference sample that is at the leftmost side from among the reconstructed reference samples of the upper adjacent line of the current block, and $a_j$ or $a_{j+1}$ may denote an original reference sample that is away by j or j+1 from an original reference sample that is at the leftmost side from among the original reference samples of the upper adjacent line of the current block.

The image decoding apparatus 100 may generate reconstructed reference samples of a left adjacent line in a similar manner to generating of the reconstructed reference samples of the upper adjacent line. When a y-axis direction of a prediction direction of an intra prediction mode of a current block is from bottom to top (that is, when the prediction direction is a direction located in the first quadrant or the second quadrant of FIG. 19A), the image decoding apparatus 100 may generate reconstructed reference samples of the left adjacent line in a similar manner as when generating reconstructed reference samples of the upper adjacent line when the x-axis direction is from the right to the left.

The image decoding apparatus 100 may generate reconstructed reference samples of the left adjacent line in a similar manner to generating of the reconstructed reference samples of the upper adjacent line. When a y-axis direction of the prediction direction of the intra prediction mode of the current block is from top to bottom (that is, when the prediction direction is a direction located in the third quadrant of FIG. 19A), the image decoding apparatus 100 may generate reference samples of the left adjacent line in a similar manner as when generating the reconstructed reference samples of the upper adjacent line when the x-axis direction is from the left to the right.

In a DC mode without directivity, a planar mode, or a vertical mode having only a vertical direction component or a horizontal mode having only a horizontal direction component, the image decoding apparatus 100 may generate a reconstructed reference sample $a'_j$ of the left or upper adjacent line based on Equation 7 as below.

$$a_j' = \tfrac{1}{8}(a_{j-1} + 6a_j + a_{j+1}) \qquad \text{[Equation 7]}$$

Here, $a'_j$ may denote a reference sample that is away by j from a reconstructed reference sample that is at the leftmost side from among the reconstructed reference samples of the upper adjacent line of the current block, and $a_{j-1}$, $a_j$ or $a_{j+1}$ may denote an original reference sample that is away by j−1, j, or j+1 from an original reference sample that is at the leftmost side from among the original reference samples of the upper adjacent line of the current block.

The image decoding apparatus 100 may generate reconstructed samples by performing filtering on an original reference sample, and may perform intra prediction on a current block by using the reconstructed samples, thereby obtaining the effect of performing intra prediction by referring to more diverse reference samples than when performing intra prediction by using an original reference sample.

Figure 21:
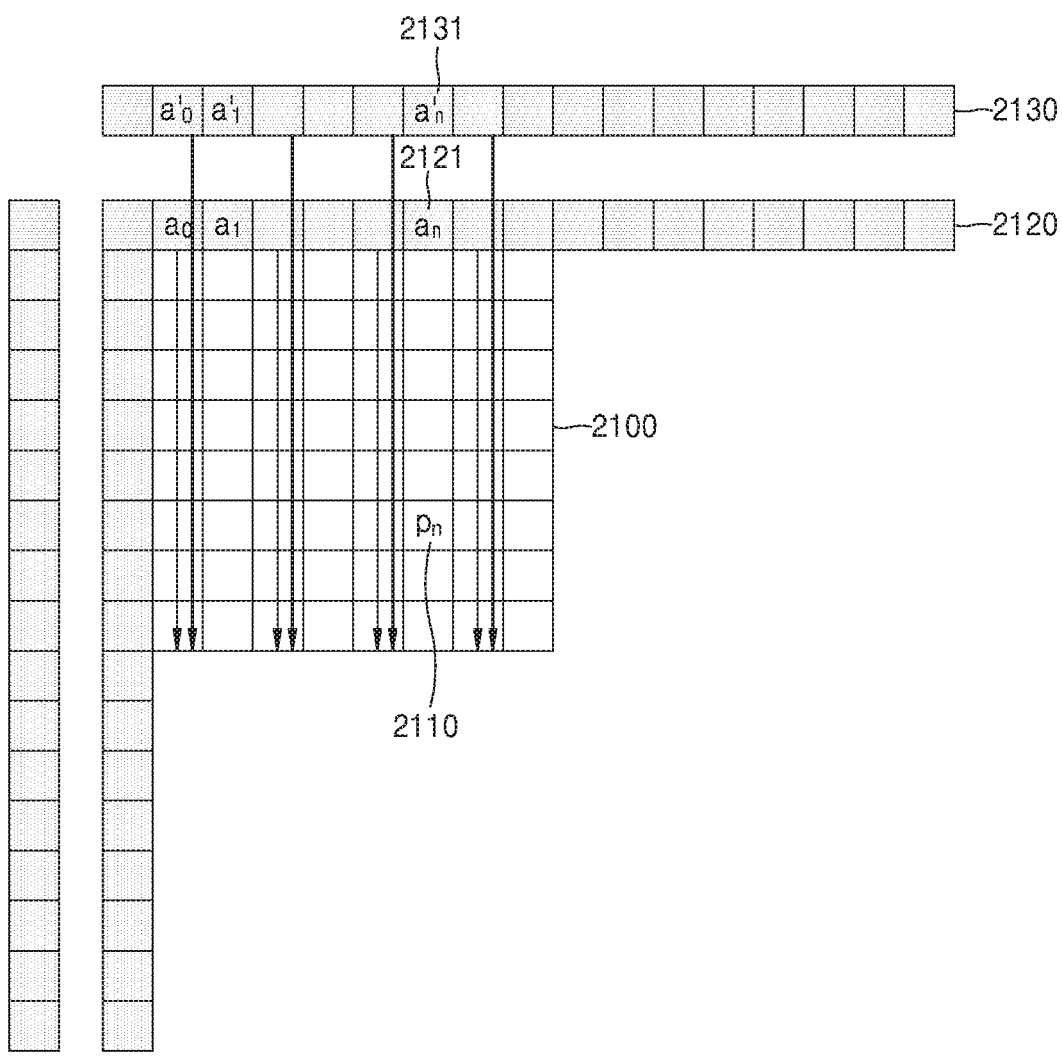
FIG. 21 is a diagram for describing a process, performed by an image decoding apparatus, of performing intra prediction on a current block by using original reference samples and a reconstructed sample, according to an embodiment of the present disclosure.

FIG. 21 is a diagram for describing a process, performed by an image decoding apparatus, of performing intra prediction on a current block by using original reference samples and a reconstructed sample, according to an embodiment of the present disclosure.

The image decoding apparatus 100 may generate a prediction value of a current sample of a current block by using original reference samples and reconstructed reference samples. For example, when an intra prediction mode of a current block 2100 is a vertical mode, the image decoding apparatus 100 may generate a prediction value of a current sample 2110 by using an original reference sample 2121 that is above the current sample 2110 and a reconstructed reference sample 2131. For example, the image decoding apparatus 100 may generate a prediction value $p_n$ of the current sample based on Equation 9.

$$p_n = (wf(a_n) + (1-w)f(a_n')) \quad \text{[Equation 9]}$$

Here, $p_n$ may denote a prediction value of the current sample, and $a_n$ may denote an original reference sample used in prediction of the current sample, and $a'_n$ may denote a reconstructed reference sample used in prediction of the current sample, and w may denote a weight and have a value between 0 and 1. Also, f may denote a prediction function of a 4-tab filter or the like. Here, w may be a fixed value, but is not limited thereto, and may vary for each sample of the current block, and may be a value based on a distance from an original reference sample or a reconstructed reference sample.

While generation of a prediction value $p_n$ of the current sample at once by the image decoding apparatus 100 based on Equation 9 is described above, the disclosure is not limited thereto, and the image decoding apparatus 100 may generate an initial prediction value by performing intra prediction by using an original reference sample as in the related art and generate a final prediction value $p'_n$ of the current sample by performing filtering by using the initial prediction value and a reconstructed reference sample.

Referring to FIG. 21, while performing of intra prediction on a current block, by the image decoding apparatus 100, by using both original reference samples and reconstructed reference samples, is described, the disclosure is not limited thereto, and the image decoding apparatus 100 may also perform intra prediction on a current block by using only original reference samples. Alternatively, the image decoding apparatus 100 may perform intra prediction on a current block by using only reconstructed reference samples.

Referring to FIG. 21, while the above description is based on the assumption that a first intra prediction mode of a current block for determining an original reference sample used in intra prediction from among the original reference samples is identical to a second intra prediction mode for determining a reconstructed reference sample used in intra prediction from among reconstructed reference samples, the disclosure is not limited thereto, and the second intra prediction mode may be determined separately from the first intra prediction mode. For example, an intra prediction mode for a reconstructed reference sample may be determined for each block or for each intra prediction mode of a current block for determining an original reference sample used in intra prediction from among the original reference samples. Alternatively, a second intra prediction mode may be determined in units of pictures.

Figure 22:
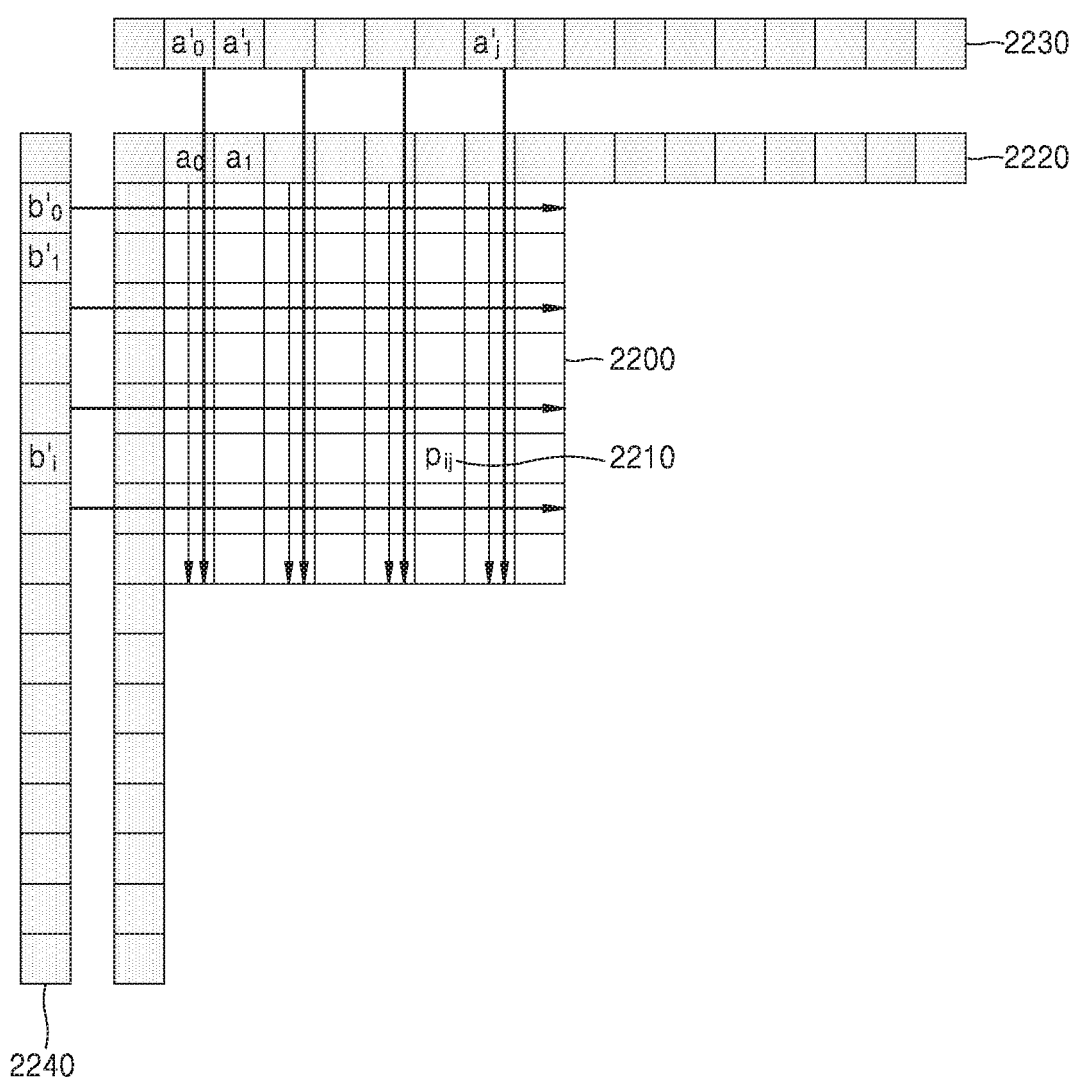
FIG. 22 is a diagram for describing a process, performed by an image decoding apparatus, of performing weighted prediction by using an original reference sample and reconstructed reference samples of a left adjacent line and an upper adjacent line.

FIG. 22 is a diagram for describing a process, performed by an image decoding apparatus, of performing weighted prediction by using an original reference sample and reconstructed reference samples of a left adjacent line and an upper adjacent line.

The image decoding apparatus 100 may determine an original reference sample to be used in intra prediction, from among the original reference prediction samples based on an intra prediction mode of a current block 2200, and determine a reconstructed sample of a left adjacent line of the current block 2200 and a reconstructed sample of an upper adjacent line of the current block 2200 that are to be used in intra prediction, regardless of an intra prediction mode of the current block 2200, and generate a prediction value with respect to a current sample 2210 by performing weighted prediction on the current sample 2210 by using the original reference sample and the reconstructed reference samples.

For example, referring to FIG. 22, when an intra prediction mode of a current block is a vertical mode, the image decoding apparatus 100 may determine an original reference sample $a_j$ located in a vertical direction of the current sample 2210 from among original reference samples 2220 of the upper adjacent line. The image decoding apparatus 100 may determine a reconstructed reference sample $a'_j$ located in the vertical direction of the current sample 2210. Also, the image decoding apparatus 100 may determine a reconstructed reference sample $b'_i$ located in a horizontal direction of the current sample 2210. The image decoding apparatus 100 may generate a prediction value of the current sample 2210 by using the determined original reference sample $a_j$ and the reconstructed reference samples $a'_j$ and $b'_i$. That is, the image decoding apparatus 100 may generate a prediction value $p_{ij}$ of the current sample based on Equation 10 below.

$$p_{ij} = w_1 f(a_j') + w_2 f(b_i') + w_3 f(a_j) \quad \text{[Equation 10]}$$

Here, $p_{ij}$ may denote a prediction value of a current sample at a position (i,j), $a_j$ may denote the original reference sample used for prediction of the current sample, and $a'_j$ may denote the reconstructed reference sample of the upper adjacent line used in prediction of the current sample, and $b'_i$ may denote the reconstructed reference sample of the left adjacent line used in prediction of the current sample. Also, f may denote a prediction function of a 4-tab filter or the like. Here, $w_1$, $w_2$, and $w_3$ may be determined for each sample, and may be determined based on a distance between an original reference sample or a reconstructed reference sample and a current sample.

While a process in which the image decoding apparatus 100 performs weighted prediction by using an original reference sample and a reconstructed reference sample of a left adjacent line located in a horizontal direction of a current sample and a reconstructed reference sample of an upper adjacent line located in a vertical direction of the current sample is described with reference to FIG. 22, the disclosure is not limited thereto, and the image decoding apparatus 100 may determine a prediction direction for selecting a reconstructed reference sample with respect to the current sample by considering a change in a gradient of a reference sample.

That is, the image decoding apparatus 100 may determine a gradient direction of a reference sample that has the same change tendency as a gradient value of the reference sample to be a prediction direction for selecting a reconstructed reference sample with respect to a current sample.

FIG. 23 is a diagram for describing a process, performed by an image decoding apparatus, of performing weighted prediction by using a prediction value generated by performing intra prediction using an original reference sample and reconstructed reference samples of a left adjacent line and an upper adjacent line.

The image decoding apparatus 100 may generate an intermediate prediction value with respect to a current sample in a current block by performing intra prediction based on an original reference prediction sample based on an intra prediction mode of a current block 2300. The image decoding apparatus 100 may determine at least one reference sample from among reconstructed reference samples of the left adjacent line and at least one reference sample from among reconstructed reference samples of the upper adjacent line, regardless of the intra prediction mode of the current block 2300. The image decoding apparatus 100 may generate a final prediction value with respect to a current sample in the current block 2300 by using an intermediate prediction value with respect to the current sample in the current block 2300, the reconstructed reference sample of the left adjacent line, and the reconstructed reference sample of the upper adjacent line.

The image decoding apparatus 100 may generate a final prediction value $p'_{ij}$ of the current sample in the current block based on Equation 11.

$$p_{ij}'+C_{ij}\times[a_i'p_{ij}a_j']=[Ca_i'[i,j]Cp_{ij}Ca_j'[i,j]]\times[a_i'p_{ij}a_j'] \quad \text{[Equation 11]}$$

Here, $p_{ij}$ may denote an intermediate prediction value of a sample located at (i,j) in the current block generated by performing intra prediction by using original reference samples according to the intra prediction mode of the current block 2300. $C_{ij}$ denotes a matrix including filter coefficients applied to $p_{ij}$, $a'_i$, and $a'_j$. $Ca'_i[i,j]$ may be a two-dimensional matrix including a filter coefficient applied to $a'_j$. $Ca'_j[i,j]$ may be a two-dimensional matrix including a filter coefficient applied to $a'_j$. $Cp_{ij}[i,j]$ may denote a two-dimensional matrix including a filter coefficient applied to $p_{ij}$.

For example, referring to FIG. 23, the image decoding apparatus may generate a final prediction value of the current sample in the current block 2300 by using $Ca_i'[i,j]$ (2310), $Ca_j'[i,j]$ (2320), and $Cp_{ij}[i,j]$ (2330). However, while the filter coefficients disclosed in FIG. 23 are non-normalized coefficients, it will be obvious to one of ordinary skill in the art that, when the image decoding apparatus 100 actually uses the filter coefficients disclosed in FIG. 23, a coefficient generated by performing normalization (that is, performing an operation corresponding to an operation of division of filter coefficients by 16) may be finally used.

That is, the image decoding apparatus 100 may generate a final prediction value $p'_{ij}$ of the current sample based on Equation 12 as below.

$$p'_{ij} = [Ca[i,j] \; Cp[i,j] \; Ca[i,j]] * [a'_i p_{ij} a'_j], \quad \text{[Equation 12]}$$

where $Ca[i,j] = \begin{bmatrix} 1 & 2 & 1 \\ 5 & 1 & 1 \\ 5 & 3 & 1 \end{bmatrix}$ $Cp[i,j] = \begin{bmatrix} 2 & 9 & 10 \\ 9 & 6 & 12 \\ 10 & 12 & 14 \end{bmatrix}$ if i or j ≥ 3, coefficient for i = 3 or j = 3 is used.

Here, $p_{ij}$ may denote an intermediate prediction value of a sample located at (i,j) in the current block generated by performing intra prediction by using original reference samples according to the intra prediction mode of the current block 2300. Ca [i,j] may be a two-dimensional matrix including a filter coefficient applied to $a'_i$ and $a'_j$. Cp[i,j] may denote a two-dimensional metric including a filter coefficient applied to $P_{ij}$.

Meanwhile, while a process in which the image decoding apparatus 100 performs weighted prediction by using a prediction value generated by performing intra prediction by using an original reference sample and a reconstructed reference sample of a left adjacent line located in a horizontal direction of a current sample and reconstructed reference samples of an upper adjacent line in a vertical direction of the current sample is described with reference to FIG. 23, the disclosure is not limited thereto, and it will be obvious to one of ordinary skill in the art that weighted prediction may be performed by using, instead of the reconstructed reference sample, an original reference sample of the left adjacent line located in the horizontal direction of the current sample and the original reference samples of the upper adjacent line in the vertical direction of the current sample.

Figure 24:
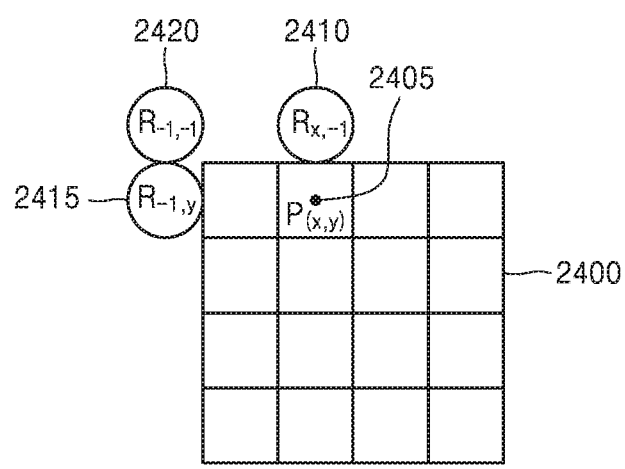
FIG. 24 is a diagram for describing a process, performed by an image decoding apparatus, of performing position-based intra prediction on a current sample when an intra prediction mode of a current block is one of a DC mode, a planar mode, and a vertical mode.

FIG. 24 is a diagram for describing a process, performed by an image decoding apparatus, of performing position-based intra prediction on a current sample when an intra prediction mode of a current block is one of a DC mode, a planar mode, and a vertical mode.

Referring to FIG. 24, the image decoding apparatus 100 may determine a final prediction value P'(x,y) of a current sample 2405 by using an intermediate prediction sample value P(x,y) of the current sample 2405 in a current block 2400, a sample value $R_{-1,y}$ of a left adjacent reference sample 2415 of the current sample 2405, a sample value $R_{-1,-1}$ of a top left adjacent reference sample 2420 of the current block 2400, and a sample value $R_{x,-1}$ of an upper adjacent reference sample 2410 of the current sample 2405.

Here, the image decoding apparatus 100 may determine an intermediate prediction sample value P(x,y) of the current sample 2405 based on intra prediction according to an intra prediction mode of a current block according to the related art.

For example, the image decoding apparatus 100 may determine a final prediction sample value P'(x,y) of the current sample based on Equation 13 as below.

$$P'(x,y)=(wL\times R_{-1,y}+wT\times R_{x,-1}-wTL\times R_{-1,-1}+ \\ (64-wL-wT+wTL)\times P(x,y)+32)\gg 6 \quad \text{[Equation 13]}$$

Here, when an intra prediction mode of a current block is one of a DC mode, a planar mode, a horizontal mode or a vertical mode, wT, wL, and wTL may be determined according to Equation 14 as below. Here, width and height may respectively denote a width and a height of the current block.

$$wT=32\gg((y\ll 1)\gg\text{shift}), wL=32\gg((x\ll 1)\gg\text{shift}), \quad \text{[Equation 14]}$$

$$wTL=(\text{predModeIntra}==\text{INTRA\_DC})? \\ (wL\gg 4)+(wT\gg 4):0$$

$$\text{shift}=(\log_2(\text{width})-2+\log_2(\text{height})-2+2)\gg 2$$

predModeIntra may denote an intra prediction mode of the current block, and INTRA_DC may denote a DC mode.

Figure 25:
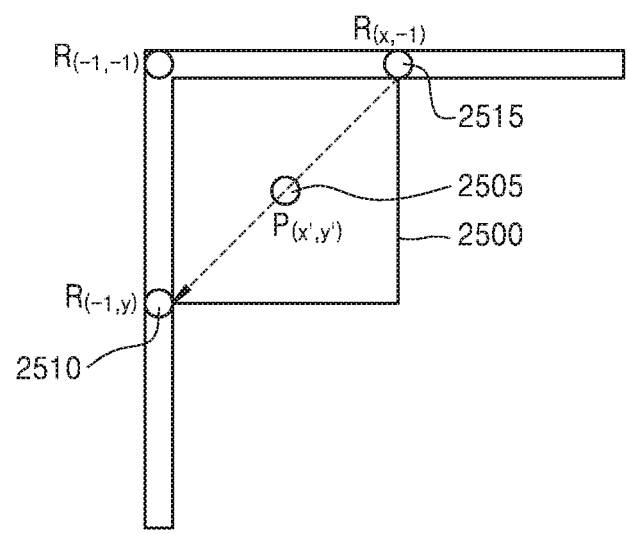
FIG. 25 is a diagram for describing a process, performed by an image decoding apparatus, of performing position-based intra prediction on a current sample when an intra prediction mode of a current block is a diagonal mode in a bottom left direction.

FIG. 25 is a diagram for describing a process, performed by an image decoding apparatus, of performing position-based intra prediction on a current sample when an intra prediction mode of a current block is a diagonal mode in a bottom left direction.

Referring to FIG. 25, the image decoding apparatus 100 may generate a prediction value P(x', y') of a current sample 2505 by using an intermediate prediction value P(x', y') of the current sample 2505, a sample value $R_{(-1,y')}$ of a sample 2510 located on a line in a bottom left diagonal direction from the current sample 2505, and a sample value $R_{(x,-1)}$ of a sample 2515 located on a line opposite to the line in the bottom left diagonal direction from the current sample 2505.

Here, the image decoding apparatus 100 may determine the intermediate prediction sample value P(x', y') of the current sample 2505 based on intra prediction according to an intra prediction mode of a current block according to the related art (a diagonal mode in the bottom left direction). The diagonal mode in the bottom left direction may be mode No. 2.

For example, the image decoding apparatus 100 may determine a final prediction sample value P'(x',y') of the current sample based on Equations 15 and 16 as below.

$$P'(x',y')=(wL \times R_{-1,y'}+wT \times R_{x,-1}-wTL \times R_{-1,-1}+(64-wL-wT+wTL) \times P(x',y')+32) \gg 6 \quad \text{[Equation 15]}$$

$$wT=16 \gg ((y' \ll 1) \gg \text{shift}), wL=16 \gg ((x' \ll 1) \gg \text{shift}), wTL=0$$

$$x=x'+y'+1, y=x'+y'+1 \quad \text{[Equation 16]}$$

Figure 26:
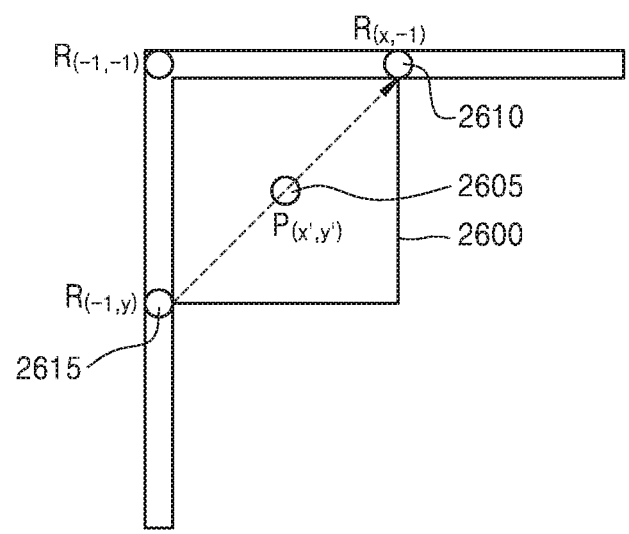
FIG. 26 is a diagram for describing a process, performed by an image decoding apparatus, of performing position-based intra prediction on a current sample when an intra prediction mode of a current block is a diagonal mode in a top right direction.

FIG. 26 is a diagram for describing a process, performed by an image decoding apparatus, of performing position-based intra prediction on a current sample when an intra prediction mode of a current block is a diagonal mode in a top right direction.

Referring to FIG. 26, the image decoding apparatus 100 may generate a prediction value P'(x',y') of a current sample 2605 by using an intermediate prediction value P(x',y') of the current sample 2605, a sample value $R_{(x,-1)}$ of a sample 2610 on a line in a top right diagonal direction from the current sample 2605, and a sample value $R_{(-1,y')}$ of a sample 2615 located on a line opposite to the line in the top right diagonal direction from the current sample 2605.

Here, the image decoding apparatus 100 may determine an intermediate prediction sample value P(x',y') of the current sample 2605 based on intra prediction according to an intra prediction mode of a current block according to the related art (a diagonal mode in the top right direction). The diagonal mode in the top right direction may be mode No. 66.

For example, the image decoding apparatus 100 may determine a final prediction sample value P'(x',y') of the current sample based on Equations 17 and 18 as below.

$$P'(x',y')=(wL \times R_{-1,y'}+wT \times R_{x,-1}-wTL \times R_{-1,-1}+(64-wL-wT+wTL) \times P(x',y')+32) \gg 6 \quad \text{[Equation 17]}$$

$$wT=16 \gg ((y' \ll 1) \gg \text{shift}), wL=16 \gg ((x' \ll 1) \gg \text{shift}), wTL=0 x=x'+y'+1, y=x'+y'+1 \quad \text{[Equation 18]}$$

Figure 27:
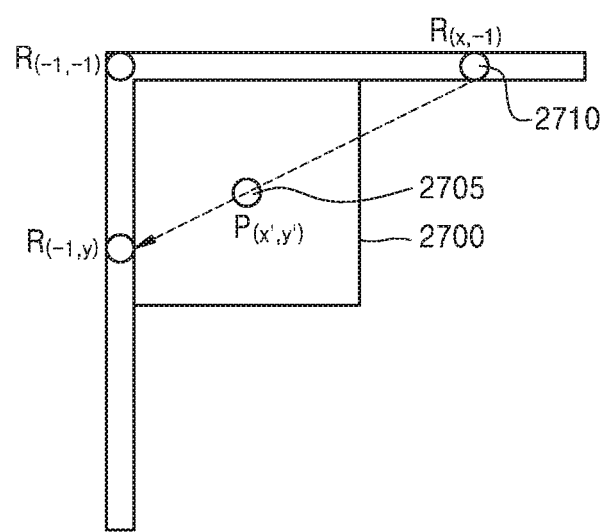
FIG. 27 is a diagram for describing a process, performed by an image decoding apparatus, of performing position-based intra prediction on a current sample when an intra prediction mode of a current block is an angular mode adjacent to a diagonal mode in a bottom left direction.

FIG. 27 is a diagram for describing a process, performed by an image decoding apparatus, of performing position-based intra prediction on a current sample when an intra prediction mode of a current block is an angular mode adjacent to a diagonal mode in a bottom left direction.

Referring to FIG. 27, the image decoding apparatus 100 may generate a prediction value of a current sample 2705 by using an intermediate prediction value P(x',y') of the current sample 2705 in a current block 2700 and a sample value $R_{(x,-1)}$ of a sample 2710 located in an opposite direction to a line in a bottom left direction according to an angular mode, from the current sample 2705. An angular mode adjacent to a diagonal mode in the bottom left direction may be one of modes Nos. 3 to 10.

Here, the image decoding apparatus 100 may determine an intermediate prediction sample value P(x',y') of the current sample 2705 based on intra prediction according to an intra prediction mode of a current block according to the related art (an angular mode in the bottom left direction).

For example, the image decoding apparatus 100 may determine a final prediction sample value P'(x',y') of the current sample based on Equations 19 and 20 as below.

$$P'(x',y')=(wL \times R_{-1,y'}+wT \times R_{x,-1}-wTL \times R_{-1,-1}+(64-wL-wT+wTL) \times P(x',y')+32) \gg 6 \quad \text{[Equation 19]}$$

$$wT=32 \gg ((y' \ll 1) \gg \text{shift}), wL=0, wTL=0 \quad \text{[Equation 20]}$$

When a coordinate x indicates a fractional sample position of, a sample value of $R_{x,-1}$ may be determined based on sample values of two adjacent integer samples and a distance between the coordinate x and an integer sample adjacent to the coordinate x.

Figure 28:
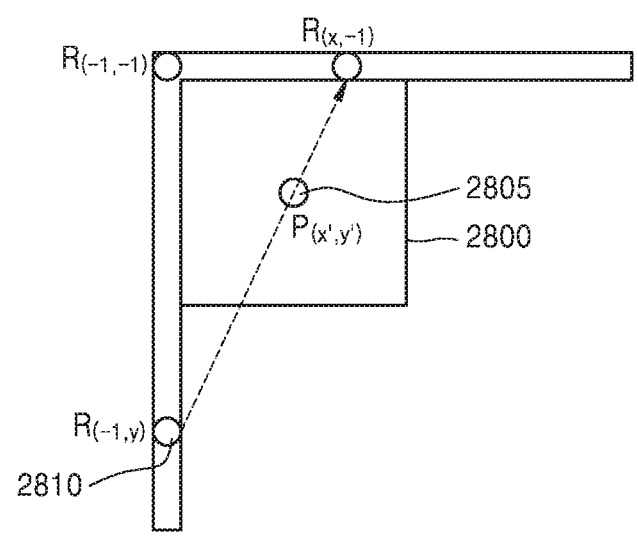
FIG. 28 is a diagram for describing a process, performed by an image decoding apparatus, of performing position-based intra prediction on a current sample when an intra prediction mode of a current block is an angular mode adjacent to a diagonal mode in a top right direction.

FIG. 28 is a diagram for describing a process, performed by an image decoding apparatus, of performing position-based intra prediction on a current sample when an intra prediction mode of a current block is an angular mode adjacent to a diagonal mode in a top right direction.

Referring to FIG. 28, the image decoding apparatus 100 may generate a prediction value of a current sample 2805 by using an intermediate prediction value P(x',y') of the current sample 2805 and a sample value $R_{(-1,y')}$ of a sample 2810 located in an opposite direction to a line in a top right direction according to an angular mode, from the current sample 2805. An angular mode adjacent to a diagonal mode in the top right direction may be one of modes Nos. 58 to 65.

Here, the image decoding apparatus 100 may determine an intermediate prediction sample value P(x',y') of the current sample 2805 based on intra prediction according to an intra prediction mode of a current block according to the related art (an angular mode in the top right direction).

For example, the image decoding apparatus 100 may determine a final prediction sample value P'(x',y') of the current sample based on Equations 21 and 22 as below.

$$P'(x',y')=(wL \times R_{-1,y'}+wT \times R_{x,-1}-wTL \times R_{-1,-1}+(64-wL-wT+wTL) \times P(x',y')+32) \gg 6 \quad \text{[Equation 21]}$$

$$wL=32 \gg ((x' \ll 1) \gg \text{shift}), wT=0, wTL=0 \quad \text{[Equation 22]}$$

When a coordinate y indicates a fractional position sample, a sample value of $R_{-1,y}$ may be determined based on sample values of two adjacent integer samples and a distance between the coordinate y and an integer sample adjacent to the coordinate y.

The method and apparatus for determining a filtering reference sample and a weight of a filter based on the assumption that a current block is a square and for adaptively performing intra prediction based on the filtering reference sample and the weight of the filter are described above with reference to FIGS. 17 through 28. However, it will be obvious to one of ordinary skill in the art that, also when a current block is a rectangle, the image decoding apparatus 100 may similarly determine a filtering reference sample to be filtered and a weight of a filter and adaptively perform intra prediction based on the filtering reference sample and the weight of the filter. Here, when a current block is a rectangle having a W×H size (W is a width, and H is a height), the number of samples of an upper adjacent reference line of the current block may be 2W, and the number of samples of a left adjacent reference line may be 2H. However, the disclosure is not limited thereto, and when a current block is a rectangle having a W×H size (W is a width, and H is a height), the number of reference samples of an upper adjacent reference line of the current block may be W+H, and the number of reference samples of a left adjacent reference line may be W+H.

Figure 29:
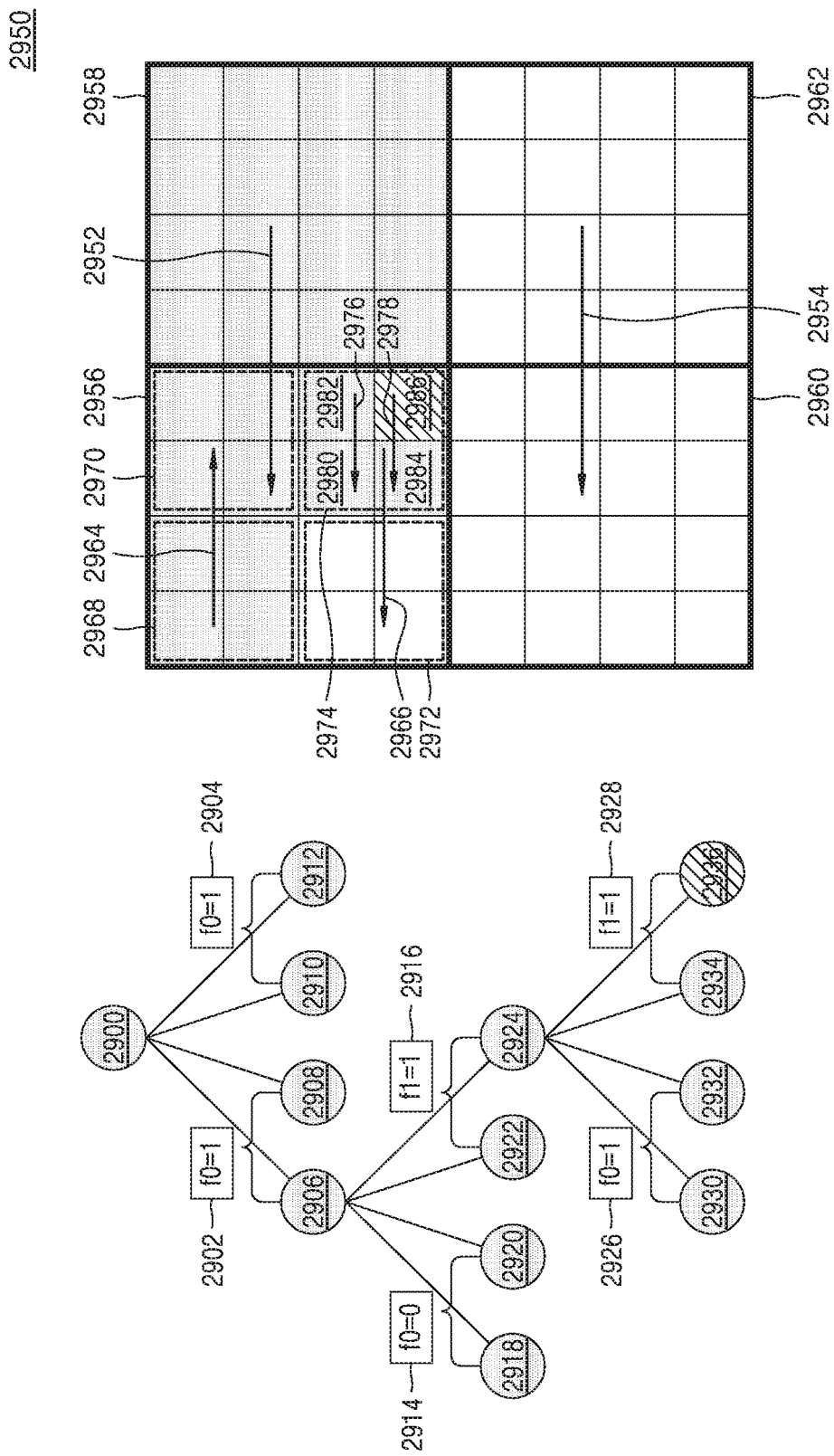
FIG. 29 is a diagram for describing that an encoding (decoding) order among coding units is determined to be in a forward or backward direction based on an encoding order flag and that a right or upper reference line may be used for intra prediction according to the determined encoding (decoding), according to an embodiment of the present disclosure.

FIG. 29 is a diagram for describing that an encoding (decoding) order among coding units is determined to be in a forward or backward direction based on an encoding order flag and that a right or upper reference line may be used for intra prediction according to the determined encoding (decoding) order, according to an embodiment of the present disclosure.

Referring to FIG. 29, a coding tree unit 2950 is split into a plurality of coding units 2956, 2958, 2960, 2962, 2968, 2970, 2972, 2974, 2980, 2982, 2984, and 2986. The coding tree unit 2950 corresponds to a top level node 2900 of a tree structure. Also, the plurality of coding units 2956, 2958, 2960, 2962, 2968, 2970, 2972, 2974, 2980, 2982, 2984, and 2986 respectively correspond to a plurality of nodes 2906, 2908, 2910, 2912, 2918, 2920, 2922, 2924, 2930, 2932, 2934, and 2936. Top encoding order flags 2902, 2914, and 2926 indicating a coding order in a tree structure respectively correspond to arrows 2952, 2964, and 2976, and top encoding order flags 2904, 2916, and 2928 respectively correspond to arrows 2954, 2966, and 2978.

The top encoding order flags indicate an encoding order of two coding units at top ends from among coding units of an identical depth. When a top encoding order flag is 0, encoding is performed in a forward direction. In contrast, when a top encoding order flag is 1, encoding is performed in a backward direction.

Likewise, bottom encoding order flags indicate an encoding order of two coding units at bottom ends from among for coding units of an identical depth. When a bottom encoding order flag is 0, encoding is performed in a forward direction. In contrast, when a bottom encoding order flag is 1, encoding is performed in a backward direction.

For example, as the top encoding order flag 2914 is 0, an encoding order between the coding units 2968 and 2970 is determined to be from the left to the right, which is a forward direction. Also, as the bottom encoding order flag 2916 is 1, an encoding order between the coding units 2972 and 2974 is determined from the right to the left, which is a backward direction.

According to an embodiment, a top encoding order flag and a bottom encoding order flag may be set to have an equal value. For example, when the top encoding order flag 2902 is determined to be 1, the bottom encoding order flag 2904 corresponding to the top encoding order flag 2902 may also be determined to be 1. As values of the top encoding order flag and the bottom encoding order flag are determined to be 1 bit, an information amount of encoding order information is reduced.

According to an embodiment, a top encoding order flag and a bottom encoding order flag of a current coding unit may be determined by referring to at least one of a top encoding order flag and a bottom encoding order flag that are applied to a coding unit having a deeper depth than the current coding unit. For example, the top encoding order flag 2926 and the bottom encoding order flag 2928 applied to the coding units 2980, 2982, 2984, and 2986 may be determined based on the bottom encoding order flag 2916 applied to the coding units 2972 and 2974. Accordingly, the top encoding order flag 2926 and the bottom encoding order flag 2928 may be determined to have an equal value to that of the encoding order flag 2916. As values of the top encoding order flag and the bottom encoding order flag are determined from an upper coding unit of the current coding unit, encoding order information is not obtained from a bitstream. Accordingly, an information amount of encoding order information is reduced.

Here, as data of samples included in the right adjacent coding unit 2958 decoded earlier than the current coding unit 2986 and data of samples included in the upper adjacent coding units 2980 and 2982 are available, the image decoding apparatus 100 may perform prediction according to an embodiment of the present disclosure by using the data of the samples included in the right adjacent coding unit 2958 (right reference line) and the data of the samples included in the upper adjacent coding units 2980 and 2982 (upper reference line).

While a method and apparatus for determining a filtering reference sample to be filtered and a weight of a filter and for adaptively performing intra prediction based on the filtering reference sample and the weight of the filter, and performing of intra prediction based on original reference samples adjacent to an upper or left corner of a current block by assuming performing encoding and decoding according to an encoding or decoding order of a coding unit according to the related art, are described with reference to FIGS. 17 through 28, the disclosure is not limited thereto, and it will be obvious to one of ordinary skill in the art that intra prediction may be performed based on original reference samples adjacent to an upper or right corner of the current block when an encoding/decoding order among some adjacent coding units is in a backward order as in FIG. 29.

According to the various embodiments of the present disclosure, as information of reference samples which are not used in intra prediction according to the related art is used, prediction accuracy may be improved, and also, the effect of reference smoothing is applied to reconstructed reference samples in a process of reconstructing an original reference sample, and thus, prediction accuracy may be improved. In addition, as various prediction blocks may be generated by selectively using a reconstructed reference sample and an original reference sample, a more efficient prediction block may be selected, thereby improving prediction accuracy. Also, according to various embodiments of the present disclosure, a prediction block having a natural pattern is generated, and thus, an abrupt prediction error may be corrected, thereby improving the transform efficiency.

This disclosure has been particularly shown and described with reference to embodiments thereof. It will be understood by those of ordinary skill in the art that various changes in form and details may be made therein without departing from the spirit and scope of the present disclosure as defined by the appended claims. Thus, the disclosed embodiments should be considered in a descriptive sense only and not for purposes of limitation. The scope of the present disclosure is defined not by the detailed description of the disclosure but by the appended claims, and all differences within the scope will be construed as being included in the present disclosure.

The embodiments of the present disclosure described above may be written as computer programs and can be implemented in general-use digital computers that execute the programs using a computer-readable recording medium. Examples of the computer-readable recording medium include storage media such as magnetic storage media (e.g., read-only memories, floppy disks, or hard disks), optical recording media (e.g., CD-ROMs or DVDs), etc.

The invention claimed is:
1. An image decoding method comprising:
obtaining, from a bitstream, information about a transform coefficient of a current block;
obtaining an intra prediction sample of a current sample in the current block based on an intra prediction mode of the current block;

when the intra prediction mode of the current block is an angular mode with one among left prediction directions including a lower-left prediction direction, determining a first reference sample to be used in filtering, among a plurality of reference samples in an upper side of the current block based on a position of the current sample and the intra prediction mode of the current block and determining a first weight for the first reference sample based on a Y-coordinate of the position of the current sample;

obtaining a modified intra prediction sample of the current sample based on the first reference sample to be used in filtering, the intra prediction sample of the current sample, the first weight for the first reference sample to be used in filtering, and a second weight for the intra prediction sample of the current sample;

generating a prediction block of the current block, the prediction block including the modified intra prediction sample of the current sample;

obtaining a residual sample of the current sample using the information about the transform coefficient of the current block; and reconstructing the current block using the modified intra prediction sample of the current sample and the residual sample of the current sample, wherein based on the intra prediction mode of the current block being a first angular mode, the first reference sample to be used in filtering is determined among the plurality of reference samples in the upper side of the current block based on the position of the current sample and the first angular mode, and the first weight for the first reference sample to be used in filtering is determined based on the Y-coordinate of the position of the current sample, wherein based on the intra prediction mode of the current block being a second angular mode, the first reference sample to be used in filtering is determined among a plurality of reference samples in a left side of the current block based on the position of the current sample and the second angular mode, and the first weight for the first reference sample to be used in filtering is determined based on a X-coordinate of the position of the current sample, and wherein the obtaining of the intra prediction sample of the current sample in the current block based on the intra prediction mode of the current block comprises:

determining a second reference sample corresponding to the current sample based on the position of the current sample and the intra prediction mode of the current block; and obtaining the intra prediction sample of the current sample based on the second reference sample.

2. The image decoding method of claim 1, wherein the first weight for the first reference sample is determined based on a distance between the first reference sample and the current sample.

3. The image decoding method of claim 2, wherein the first weight for the first reference sample is determined based on the distance between the first reference sample and the current sample, compared to a size of the current block.

4. The image decoding method of claim 2, wherein the greater the distance between the first reference sample and the current sample, the smaller the first weight for the first reference sample.

5. The image decoding method of claim 1, wherein the first reference sample includes at least one of an original reference sample located in a horizontal direction of the current sample and an original reference sample located in a vertical direction of the current sample.

6. The image decoding method of claim 1, wherein the determining, based on the position of the current sample in the current block, of the first reference sample to be used in filtering, the first weight for the first reference sample to be used in filtering and the second weight for the intra prediction sample of the current sample, and the obtaining of the modified intra prediction sample of the current sample based on the first reference sample to be used in filtering, the intra prediction sample of the current sample, the first weight for the first reference sample to be used in filtering, and the second weight for the intra prediction sample of the current sample comprise:

determining at least one second intra prediction mode; and by using the determined at least one second intra prediction mode, determining, based on the position of the current sample in the current block, a sample value of at least one filtering reference sample to be used in filtering, a first weight for the at least one filtering reference sample, and a second weight for the intra prediction sample of the current sample, and generating a filtered prediction sample value of the current sample based on the first reference sample to be used in filtering, the intra prediction sample of the current sample, the first weight for the first reference sample to be used in filtering, and the second weight for the intra prediction sample of the current sample.

7. The image decoding method of claim 6, wherein the at least one second intra prediction mode is determined in units of pictures or in units of blocks.

8. The image decoding method of claim 1, wherein the at least one second intra prediction mode is determined to be at least one of the intra prediction mode, an intra prediction mode indicating an opposite direction to a prediction direction indicated by the intra prediction mode, a horizontal mode, and a vertical mode.

9. The image decoding method of claim 1, wherein the first weight and the second weight are normalized values.

10. The image decoding method of claim 1, wherein the determining, based on the position of the current sample in the current block, of the first reference sample to be used in filtering, the first weight for the first reference sample to be used in filtering, and the second weight for the intra prediction sample of the current sample, and the obtaining of the modified intra prediction sample of the current sample based on the first reference sample to be used in filtering, the intra prediction sample of the current sample, the first weight for the first reference sample to be used in filtering, and the second weight for the intra prediction sample of the current sample comprise:

when the intra prediction mode is a predetermined intra prediction mode, determining, based on the position of the current sample in the current block, a sample value of at least one filtering reference sample to be used in filtering, a first weight for the at least one filtering reference sample, and a second weight for the intra prediction sample of the current sample, and generating a filtered prediction sample value of the current sample based on the first reference sample to be used in filtering, the intra prediction sample of the current sample, the first weight for the first reference sample to be used in filtering, and the second weight for the intra prediction sample of the current sample.

* * * * *